United States Patent
Kaneko et al.

(10) Patent No.: US 8,728,687 B2
(45) Date of Patent: *May 20, 2014

(54) RESIN, PIGMENT DISPERSION, COLORED CURABLE COMPOSITION, COLOR FILTER PRODUCED USING THE SAME, AND METHOD FOR PRODUCING THE SAME

(75) Inventors: Yushi Kaneko, Haibara-gun (JP); Wataru Kikuchi, Haibara-gun (JP); Kazuhiro Fujimaki, Haibara-gun (JP); Shigekazu Suzuki, Haibara-gun (JP); Shuichiro Osada, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 578 days.

This patent is subject to a terminal disclaimer.

(21) Appl. No.: 12/865,683

(22) PCT Filed: Jan. 29, 2009

(86) PCT No.: PCT/JP2009/051430
§ 371 (c)(1),
(2), (4) Date: Jul. 30, 2010

(87) PCT Pub. No.: WO2009/096452
PCT Pub. Date: Aug. 6, 2009

(65) Prior Publication Data
US 2011/0003241 A1    Jan. 6, 2011

(30) Foreign Application Priority Data

Jan. 31, 2008   (JP) ................................ 2008-021457

(51) Int. Cl.
*G02B 5/20*   (2006.01)
*G03F 7/032*   (2006.01)

(52) U.S. Cl.
USPC .................... 430/7; 430/281.1; 430/286.1

(58) Field of Classification Search
None
See application file for complete search history.

(56) References Cited

U.S. PATENT DOCUMENTS

| | | | | |
|---|---|---|---|---|
| 2002/0169251 | A1* | 11/2002 | He | 524/599 |
| 2006/0183815 | A1 | 8/2006 | Alzer et al. | |
| 2008/0020300 | A1* | 1/2008 | Lee et al. | 430/7 |
| 2010/0248095 | A1 | 9/2010 | Aoyagi | |

FOREIGN PATENT DOCUMENTS

| | | | |
|---|---|---|---|
| EP | 0 768 321 | A | 4/1997 |
| EP | 0 930 540 | A | 7/1999 |
| EP | 1 174 765 | A | 1/2002 |
| EP | 1 935 652 | * | 6/2008 |
| JP | 63-030057 | B2 | 6/1988 |
| JP | 5-127382 | A | 5/1993 |
| JP | 7-207012 | A | 8/1995 |
| JP | 9-157374 | A | 6/1997 |
| JP | 9-157592 | A | 6/1997 |
| JP | 9-169821 | A | 6/1997 |
| JP | 9-176511 | A | 7/1997 |
| JP | 2001-059906 | A | 3/2001 |
| JP | 2001-272524 | A | 10/2001 |
| JP | 2002-226587 | A | 8/2002 |
| JP | 2004-037986 | A | 2/2004 |
| JP | 2005-316012 | A | 11/2005 |
| JP | 2006-030541 | A | 2/2006 |
| JP | 2006-045262 | A | 2/2006 |
| JP | 2006-206902 | A | 8/2006 |
| JP | 2008-015393 | A * | 1/2008 |
| WO | 02/072639 | A2 | 9/2002 |
| WO | 2006/113258 | A2 | 10/2006 |
| WO | 2009/025297 | A | 2/2009 |

OTHER PUBLICATIONS

Computer-generated translation of JP 2008-015393 (Jan. 2008).*
Partial Search Report dated Nov. 3, 2010 in European Application No. 10157507.4.
Extended European Search Report dated Feb. 9, 2011 in European Application No. 10157507.4.
Extended European Search Report dated Nov. 25, 2013 in European Patent Application No. 09706745.8.
Office Action dated Dec. 11, 2013 in Taiwan Application No. 098102826.

* cited by examiner

*Primary Examiner* — John A. McPherson

(74) *Attorney, Agent, or Firm* — Sughrue Mion, PLLC

(57) ABSTRACT

A resin including (i) a main chain portion containing a nitrogen atom, (ii) a group X that has a functional group having a pKa of 14 or less and is bonded to a nitrogen atom present in the main chain portion, and (iii) an oligomer chain or polymer chain Y having a number average molecular weight of from 500 to 1,000,000 in a side chain.

13 Claims, No Drawings

RESIN, PIGMENT DISPERSION, COLORED CURABLE COMPOSITION, COLOR FILTER PRODUCED USING THE SAME, AND METHOD FOR PRODUCING THE SAME

TECHNICAL FIELD

The present invention relates to a novel resin useful for a pigment dispersant or the like, a method for producing the same, a pigment dispersion containing the resin, a colored curable composition suitable for preparation of a color filter used in a liquid crystal display device (LCD), a solid-state image pick-up device (CCD, CMOS, or the like), or the like, a color filter having a colored region formed by the colored curable composition, and a method for producing the same.

BACKGROUND ART

A color filter is an essential constituent part for a liquid crystal display or a solid-state image pick-up device. The color filter is prepared using a curable composition containing a colorant (a pigment or a dye). In the case where the colorant is a pigment, it is necessary to add a dispersant to secure the dispersibility/dispersion stability. In particular, as a dispersant having excellent dispersibility/dispersion stability, a polymeric dispersant is being developed (see, for example, Japanese Patent Application Publication (JP-B) No. 63-30057 and Japanese Patent Application Laid-Open (JP-A) No. 9-169821). Such a polymeric dispersant is being used for a color filter of a liquid crystal display or the like (see, for example, Japanese Patent Application Laid-Open No. 9-176511 and Japanese Patent Application Laid-Open No. 2001-272524).

On the other hand, recently, in the liquid crystal displays, a higher image quality has been required as compared with conventional ones for a TV/monitor, and accordingly, improvements in contrast and color purity are required.

With respect to a curable composition for use in the production of a color filter, there is an attempt to improve the contrast by using a finer particle size of a pigment (see, for example, Japanese Patent Application Laid-Open No. 2006-30541).

However, if a pigment having a smaller particle size is used, there has been a problem that since the surface area of the pigment is increased, the dispersibility/storage stability is deteriorated. If the addition amount of a dispersant is increased to secure the dispersibility/storage stability, there occurs a problem that since the developability is reduced, it is hard to form a good pattern. On the other hand, if the addition amount of an alkali-soluble resin is increased to improve the developability, there occurs a problem that dispersibility/storage stability is deteriorated. That is, in the existing dispersants, it has been very difficult to simultaneously satisfy the dispersibility/storage stability/developability.

Furthermore, it has been recently essential to reduce a pixel size (reduction in the pattern width or the film thickness) in response to improvement of the pixel number in a solid-state image pick-up device. Accordingly, it is required to increase the pigment concentration in the curable composition. However, if the pigment concentration is increased, there occurs a problem that since the content of the dispersion resin/alkali-soluble resin in the curable composition should be reduced, the dispersibility/dispersion stability/developability are deteriorated, and a result, it is difficult to form a pattern.

That is, recently, there have been difficulties in producing a color filter having good color characteristics with a high contrast corresponding to a high-performance solid-state image pick-up device/liquid crystal display using a curable composition containing a conventional dispersant, and there is a demand for a dispersant which can satisfy dispersibility/storage stability and developability simultaneously.

DISCLOSURE OF INVENTION

Problems to be Solved by the Invention

It is an object of the present invention to provide a novel resin useful as a dispersion resin for a fine pigment, a method for producing the same, and a pigment dispersion having excellent dispersibility/dispersion stability even in the case of using a fine pigment by using the resin as a dispersant.

It is another object of the present invention to provide a colored curable composition having excellent dispersion uniformity of a pigment in a cured film and superior removability of an uncured region, even in the case in which a large amount of a fine pigment is contained.

It is a further object of the present invention to provide a color filter having a colored pattern having good color characteristics with high resolution, formed by a colored curable composition having good dispersion stability of a pigment and developability, and a method for producing the color filter with excellent productivity.

Means for Solving Problems

The present inventors have made extensive studies in view of the above-described circumstances, and as a result, they have found a resin having a specific structure of the present invention and the fact that a pigment dispersion containing the same provides unexpected improvements in dispersibility/dispersion stability, thereby completing the present invention.

That is, the objects of the present invention are accomplished by the means as described below.

<1> A resin comprising (i) a main chain portion containing a nitrogen atom, (ii) a group X that has a functional group having a pKa of 14 or less and is bonded to a nitrogen atom present in the main chain portion, and (iii) an oligomer chain or polymer chain Y having a number average molecular weight of from 500 to 1,000,000 in a side chain.

<2> The resin of <1>, wherein the (i) main chain portion containing a nitrogen atom of the resin includes an oligomer or polymer having an amino group.

<3> The resin of <1> or <2>, wherein the (i) main chain portion containing a nitrogen atom of the resin includes one or more selected from a poly(lower alkylene imine), a polyallylamine, a polydiallylamine, a metaxylenediamine-epichlorohydrin polycondensate, a polyvinylamine, a 3-dialkylaminopropyl(meth)acrylic acid amide copolymer, or a 2-dialkylaminoethyl(meth)acrylate copolymer.

<4> The resin of any one of <1> to <3>, wherein the functional group having a pKa of 14 or less of the resin is a functional group selected from a carboxylic acid, a sulfonic acid, or —COCH$_2$CO—.

<5> The resin of any one of <1> to <4>, wherein the resin includes a repeating unit represented by general formula (I-1) and a repeating unit represented by general formula (I-2):

General Formula (I-1)

-continued

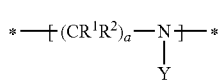
General Formula (I-2)

wherein in the general formulae (I-1) and (I-2), $R^1$s and $R^2$s each independently represent a hydrogen atom, a halogen atom, or an alkyl group; a's each independently represent an integer of 1 to 5; * represents a linking portion between the repeating units; X represents the group containing a functional group having a pKa of 14 or less; and Y represents the oligomer chain or polymer chain having a number average molecular weight of from 500 to 1,000,000.

<6> The resin of any one of <1> to <4>, wherein the resin includes a repeating unit represented by general formula (II-1) and a repeating unit represented by general formula (II-2):

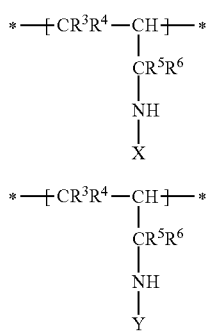

General Formula (II-1)

General Formula (II-2)

wherein in the general formulae (II-1) and (II-2), $R^3$s, $R^4$s, $R^5$s, and $R^6$s each independently represent a hydrogen atom, a halogen atom, or an alkyl group; * represents a linking portion between the repeating units; X represents the group containing a functional group having a pKa of 14 or less; and Y represents the oligomer chain or polymer chain having a number average molecular weight of from 500 to 1,000,000.

<7> The resin of any one of <1> to <6>, wherein the (iii) oligomer chain or polymer chain Y having a number average molecular weight of 500 to 1,000,000 of the resin is represented by the following general formula (III-1):

General Formula (III-1)

wherein in the general formula (III-1), Z is a polymer or oligomer having a polyester chain as a partial structure, and represents a residue formed by removal of a carboxyl group from a polyester having a free carboxyl group represented by the following general formula (IV):

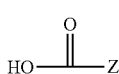

General Formula (IV)

wherein in the general formula (IV), Z has the same definition as Z in the general formula (III-1).

<8> The resin of any one of <1> to <7>, wherein the resin is a resin formed by reacting a resin having a primary or secondary amino group in a main chain portion with a precursor x of the group X having a functional group having a pKa of 14 or less and a precursor y of the oligomer chain or polymer chain Y having a number average molecular weight of from 500 to 1,000,000.

<9> A method for producing the resin of any one of <1> to <8>, comprising synthesizing a resin having a primary or secondary amino group in a main chain portion, and then reacting the resin with a precursor x of the group X having a functional group having a pKa of 14 or less and a precursor y of the oligomer chain or polymer chain Y having a number average molecular weight of 500 to 1,000,000.

<10> A pigment dispersion comprising (A) the resin of any one of <1> to <8>, (B) a pigment, and (C) a solvent.

<11> A colored curable composition comprising (A) the resin of any one of <1> to <8>, (B) a pigment, (C) a solvent, (D) a photopolymerization initiator, and (E) a compound containing an ethylenically unsaturated double bond.

<12> The colored curable composition of <11>, further comprising (F) an alkali-soluble resin.

<13> A color filter having a colored pattern formed by the colored curable composition of <11> or <12> on a support.

<14> A method for producing a color filter, comprising applying the colored curable composition of <11> or <12> on a support to form a colored layer made of the curable composition, pattern-exposing the colored layer via a mask, and developing the colored layer after the exposure to form a colored pattern.

The dispersibility/dispersion stability of a fine pigment, which has been hard to accomplish, can be accomplished by the resin of the present invention, and a pigment dispersion containing the same. Moreover, developability/pattern formability can be drastically improved by the colored curable composition of the present invention. As a result of this, a colored region formed by the colored curable composition of the present invention has high color purity with high resolution. As a result, by using such a colored curable composition, a color filter having a high contrast with a high resolution, a solid-state image pick-up device containing the color filter, a liquid crystal display having a high contrast ratio, and the like can be obtained.

The colored region as used in the present invention encompasses a colored pixel (colored pattern) region and a region having a light-shielding film formed thereon in a color filter.

Effects of Invention

According to the present invention, there can be provided a novel resin having a specific structure useful as a dispersion resin for a fine pigment, a method for producing the same, and a pigment dispersion having excellent dispersibility/dispersion stability by using the resin as a dispersant even in the case of the use of a fine pigment.

Further, according to the present invention, there can be provided a novel resin which allows provision of a colored curable composition having excellent dispersion uniformity of a pigment in a cured film and superior removability of an uncured region even in the case where a large amount of a fine pigment is contained, a color filter having a colored pattern having good color characteristics with high resolution formed by the colored curable composition having good dispersion stability of a pigment and developability, and a method for producing the same with good productivity.

Particularly, by using the resin of the present invention in a pigment dispersion/photoresist, there can be provided a pigment dispersion having highly excellent dispersibility/dispersion stability and a colored curable composition exhibiting high developability.

Further, according to the present invention, there can be provided a color filter having a colored pattern having good color characteristics with high resolution, a method for producing the same with excellent productivity, and a liquid crystal display or solid-state image pick-up device including the color filter.

BEST MODE FOR CARRYING OUT THE INVENTION

Hereinbelow, best modes for carrying out the present invention will be described in detail. With regard to the expressions of the groups (atomic groups) as used in the present specification, the expressions having no description of substitution or non-substitution mean that the groups encompass those with a substituent and those without a substituent. For example, an expression "alkyl group" encompasses an alkyl group having no substituent (unsubstituted alkyl group) as well as an alkyl group having a substituent (substituted alkyl group).

The resin of the present invention (hereinafter appropriately referred to as a "specific resin") has (i) a main chain portion containing a nitrogen atom, (ii) a group X having a functional group with a pKa of 14 or less and bonded to a nitrogen atom present in the main chain portion, and (iii) an oligomer chain or polymer chain Y having a number average molecular weight of 500 to 1,000,000 in a side chain. Specific resins according to the present invention will be specifically described.

(i) Main Chain Portion Containing Nitrogen Atom

The specific resin according to the present invention has (i) a main chain portion containing a nitrogen atom. This allows improvement in adsorption force onto a pigment surface and reduction in interaction between the pigments.

The specific resin preferably has a main chain portion including an oligomer or polymer containing a known amino group, more preferably a primary or secondary amino group. More specifically, the oligomer or polymer containing an amino group is preferably a main chain structure selected from a poly(lower alkylene imine), a polyallylamine, a poly-diallylamine, a metaxylenediamine-epichlorohydrin polycondensate, a polyvinylamine, a 3-dialkylaminopropyl (meth)acrylic acid amide copolymer, a 2-dialkylaminoethyl (meth)acrylate copolymer, and the like, and most preferably a main chain structure selected from a poly(lower alkylene imine), a polyallylamine, and a 2-dialkylaminoethyl(meth)acrylate copolymer.

The poly(lower alkylene imine) may be in a chain shape or a mesh form, but particularly one in a mesh form has enhanced dispersion stability and material availability.

In the specific resin of the present invention, the number average molecular weight of the main chain portion is preferably from 100 to 10,000, more preferably from 200 to 5,000, further preferably from 300 to 2,000, but particularly, the number average molecular weight in a range of 500 to 1500 is most preferable from the viewpoint of compatibility between dispersion stability and developability. The molecular weight of the main chain portion can be determined from a ratio of integration values of hydrogen atoms of the terminal groups and the main chain portion as measured by means of nuclear magnetic resonance spectroscopy, or determined by measurement of the molecular weight of the oligomer or polymer containing an amino group, which is a raw material.

The main chain portion of the specific resin preferably includes, in particular, poly(lower alkylene imine) or a polyallylamine backbone. In the present invention, the term lower as used for the poly(lower alkylene imine) means that the number of carbon atoms is from 1 to 5, and the lower alkylene imine refers to an alkylene imine having 1 to 5 carbon atoms.

To be specific for this structure, the specific resin of the present invention preferably has a structure containing a repeating unit represented by general formula (I-1) and a repeating unit represented by general formula (I-2), or a structure containing a repeating unit represented by general formula (II-1) and a repeating unit represented by general formula (II-2).

<Repeating Unit Represented by General Formula (I-1) and Repeating Unit Represented by General Formula (I-2)>

The repeating unit represented by general formula (I-1) and the repeating unit represented by general formula (I-2), which are preferable constituents of the specific resin of the present invention, will be described in detail.

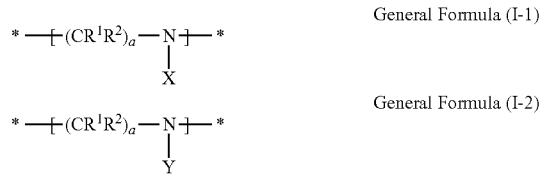

General Formula (I-1)

General Formula (I-2)

In general formulae (I-1) and (I-2), $R^1$ and $R^2$ represent a hydrogen atom, a halogen atom, or an alkyl group. a's each independently represent an integer of 1 to 5. * represents a linking portion between the repeating units. X represents a group containing a functional group having a pKa of 14 or less. Y represents an oligomer chain or polymer chain having a number average molecular weight of 500 to 1,000,000.

It is preferable that the resin of the present invention further has a repeating unit represented by general formula (I-3) as a copolymerization component, in addition to the repeating unit represented by general formula (I-1) or general formula (I-2). By using such the repeating units in combination, dispersibility is further improved when the resin is used as a fine particle dispersant for a pigment or the like.

General Formula (I-3)

In general formula (I-3), $R^1$, $R^2$, and a have the same definitions as in general formula (I-1). $(Y')^-$ represents an oligomer chain or polymer chain having an anion group, which has a number average molecular weight of 500 to 1,000,000. It is possible to form the repeating unit represented by general formula (I-3) by performing a reaction by adding an oligomer or polymer having a group which reacts with an amine to form a salt to a resin having a primary or secondary amino group in its main chain portion. Here, the anion group is preferably $CO_2^-$ or $SO_3^-$, and most preferably $CO_2$—. The anion group is preferably present at an end of the oligomer chain or polymer chain contained in $(Y')^-$.

In general formula (I-1), general formula (I-2) and general formula (I-3), $R^1$ and $R^2$ are particularly preferably a hydrogen atom. a is preferably 2 from the viewpoint of raw material availability.

The resin of the present invention may contain a lower alkylene imine containing a primary or tertiary amino group as a repeating unit, in addition to the repeating units represented by general formula (I-1), general formula (I-2), and general formula (I-3). Furthermore, to the nitrogen atom in such a lower alkylene imine repeating unit, the group represented by X, Y, or (Y')$^-$ may be further bonded. A resin which contains both of the repeating unit having a group represented by X bonded thereto and the repeating unit having Y bonded thereto in the main chain structure is also encompassed in the specific resin of the present invention.

The repeating unit represented by general formula (I-1) is a repeating unit which has a group X containing a functional group having a pKa of 14 or less, and the repeating unit is preferably contained at 1 to 80% by mole, and most preferably at 3 to 50% by mole, with respect to the total repeating units contained in the resin of the present invention, from the viewpoint of storage stability/developability.

The repeating unit represented by general formula (I-2) is a repeating unit which has an oligomer chain or polymer chain Y having a number average molecular weight of 500 to 1,000,000, and the repeating unit is preferably contained at 10 to 90% by mole, and most preferably at 30 to 70% by mole, with respect to the total repeating units contained in the resin of the present invention, from the viewpoint of storage stability.

Upon reviewing the content ratio of both, the molar ratio of the repeating units (I-1):(I-2) is preferably in a range of 10:1 to 1:100, and more preferably in a range of 1:1 to 1:10, from the viewpoint of dispersion stability and balance of hydrophilicity/hydrophobicity.

Furthermore, the repeating unit represented by general formula (I-3) which is used in combination, if desired, is one in which a partial structure containing an oligomer chain or polymer chain having a number average molecular weight of 500 to 1,000,000 is ionically bonded to a nitrogen atom of the main chain, and is preferably contained at 0.5 to 20% by mole, and most preferably at 1 to 10% by mole, with respect to the total repeating units of the resin of the present invention, from the viewpoint of the effect.

Furthermore, the ionic bond of the polymer chain Y can be confirmed by infrared spectroscopy, acid value titration, or base titration.

<Repeating Unit Represented by General Formula (II-1) and Repeating Unit Represented by General Formula (II-2)>

The repeating unit represented by general formula (II-1) and the repeating unit represented by general formula (II-2), which are other preferable constituents of the specific resin of the present invention, will be described in detail.

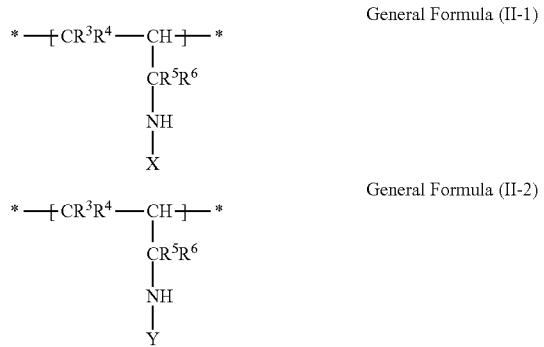

General Formula (II-1)

General Formula (II-2)

In general formulae (II-1) and (II-2), $R^3$, $R^4$, $R^5$, and $R^6$ each independently represent a hydrogen atom, a halogen atom, or an alkyl group. *, X, and Y have the same definitions as *, X, and Y in general formulae (I-1) and (I-2).

It is preferable that the resin of the present invention further has a repeating unit represented by general formula (II-3) as a copolymerization component, in addition to the repeating unit represented by general formula (II-1) and the repeating unit represented by general formula (II-2). By using the repeating unit in combination, dispersibility is further improved when the resin is used as a fine particle dispersant for a pigment or the like.

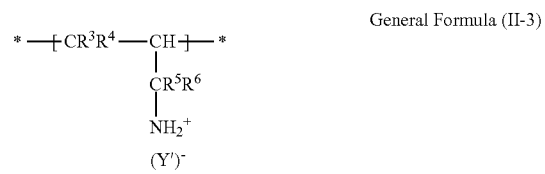

General Formula (II-3)

In general formula (II-3), $R^3$, $R^4$, $R^5$, and $R^6$ have the same definitions as in general formula (II-1). (Y')$^-$ has the same definition as (Y')$^-$ in general formula (I-3).

In general formulae (II-1), (II-2), and (II-3), $R^3$, $R^4$, $R^5$ and $R^6$ are preferably hydrogen atoms from the viewpoint of availability of raw materials.

General formula (II-1) is a repeating unit having a group containing a functional group X having a pKa of 14 or less, and the repeating unit is preferably contained at 1 to 80% by mole, and most preferably at 3 to 50% by mole, with respect to the total repeating units contained in the resin of the present invention, from the viewpoint of storage stability/developability.

The repeating unit represented by general formula (II-2) is a repeating unit which has an oligomer chain or polymer chain Y having a number average molecular weight of 500 to 1,000,000, and the repeating unit is preferably contained at 10 to 90% by mole, and most preferably at 30 to 70% by mole, with respect to the total repeating units contained in the resin of the present invention, from the viewpoint of storage stability.

Upon reviewing the content ratio of both, the molar ratio of the repeating units (II-1):(II-2) is preferably in a range of 10:1 to 1:100, and more preferably in a range of 1:1 to 1:10, from the viewpoint of dispersion stability and balance of hydrophilicity/hydrophobicity.

Furthermore, the repeating unit represented by general formula (II-3) which is used in combination, if desired, is preferably contained at 0.5 to 20% by mole, and most preferably at 1 to 10% by mole, with respect to the total repeating units of the resin of the present invention.

In addition, particularly, the specific resin of the present invention most preferably contains both of the repeating unit represented by general formula (I-1) and the repeating unit represented by general formula (I-2) from the viewpoint of dispersibility.

(ii) Group X Containing Functional Group Having pKa of 14 or Less

X represents a group containing a functional group having a pKa of 14 or less at a water temperature of 25° C. The "pKa" as mentioned herein is as defined in Chemical Handbook (II) (4$^{th}$ Revised Edition, 1993, edited by The Chemical Society of Japan, Maruzen).

The "functional group having a pKa of 14 or less" is not limited in its structures as long as it satisfies this condition, and examples thereof include known functional groups having a pKa in the above-described range, specifically, such as carboxylic acid (pKa about 3 to 5), sulfonic acid (pKa about −3 to −2), phosphoric acid (pKa about 2), —COCH$_2$CO— (pKa about 8 to 10), —COCH$_2$CN (pKa about 8 to 11), —CONHCO—, a phenolic hydroxyl group, —R$_F$CH$_2$OH or —(R$_F$)$_2$CHOH (pKa about 9 to 11, wherein R$_F$ represents a perfluoroalkyl group), a sulfonamide group (pKa about 9 to 11), and the like, and particularly preferably carboxylic acid (pKa about 3 to 5), sulfonic acid (pKa about −3 to −2), and —COCH$_2$CO— (pKa about 8 to 10).

The group X containing a functional group having a pKa of 14 or less is usually one which is directly bonded to a nitrogen atom contained in the main chain structure, but the nitrogen atom of the main chain portion of the specific resin and X may be linked through covalent bonding or through ionic bonding to form a salt. Further, the resin of the present invention may have two or more different X's in the molecule.

The molecular weight of the group X containing a functional group having a pKa of 14 or less is preferably from 50 to 1000, and most preferably from 50 to 500. With the molecular weight in this range; developability/dispersibility is improved.

The group X containing a functional group having a pKa of 14 or less in the present invention particularly preferably has a structure represented by general formula (V-1), general formula (V-2), or general formula (V-3).

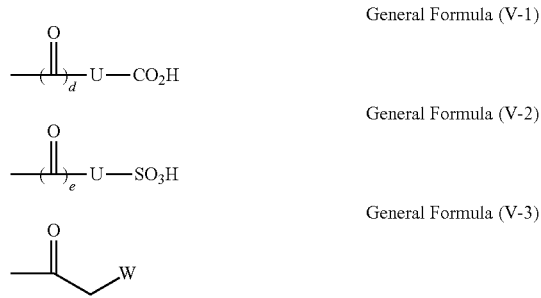

General Formula (V-1)

General Formula (V-2)

General Formula (V-3)

In general formula (V-1) and general formula (V-2), U represents a single bond or a divalent linking group. d and e each independently represent 0 or 1. In general formula (V-3), W represents an acyl group or an alkoxycarbonyl group.

Examples of the divalent linking group represented by U include alkylene (more specifically, for example, —CH$_2$—, —CH$_2$CH$_2$—, —CH$_2$CHMe-, —(CH$_2$)$_5$—, —CH$_2$CH(n-C$_{10}$H$_{21}$)—, and the like), oxygen-containing alkylene (more specifically, for example, —CH$_2$OCH$_2$—, —CH$_2$CH$_2$OCH$_2$CH$_2$—, and the like), a cycloalkylene group (for example, cyclobutylene, cyclopentylene, cyclohexylene, cyclooctylene, and the like), an arylene group (for example, phenylene, tolylene, biphenylene, naphthylene, furanylene, pyrrolylene, and the like), alkyleneoxy (for example, ethyleneoxy, propyleneoxy, phenyleneoxy, and the like), and the like, but particularly preferably an alkylene group having 1 to 30 carbon atoms, a cycloalkylene group having 5 to 20 carbon atoms, or an arylene group having 6 to 20 carbon atoms, and most preferably an alkylene group having 1 to 20 carbon atoms, a cycloalkylene group having 5 to 10 carbon atoms, or an arylene group having 6 to 15 carbon atoms. Further, from the viewpoint of productivity, d is preferably 1, and e is preferably 0.

W represents an acyl group or an alkoxycarbonyl group. As the acyl group in W, an acyl group having 1 to 30 carbon atoms (for example, formyl, acetyl, n-propanoyl, benzoyl, and the like) is preferable, and acetyl is particularly preferable. As W, an acyl group is particularly preferable, and an acetyl group is preferable from the viewpoint of easy production/availability of raw materials (precursor X' of X).

The X of the present invention is characterized in that it is bonded to a nitrogen atom of the main chain portion. Thereby, the dispersibility/dispersion stability of the pigment is drastically improved. The reason is not clear, but it is thought as follows. That is, the nitrogen atom of the main chain portion exists in the structure of an amino group, an ammonium group, or an amide group, which has an interaction, such as hydrogen bonding, ionic bonding, and the like, with an acidic part on the pigment surface, for adsorption. In addition, the X of the present invention can function as an acid group, and thus can interact with a basic part (a nitrogen atom and the like) or a metal atom (copper of copper phthalocyanine, and the like) of the pigment. That is, since the resin of the present invention can adsorb to both of the basic part and the acidic part of the pigment with the nitrogen atom and X, it has an improved adsorbing ability, and thus, the dispersibility/storage stability is drastically improved.

Moreover, since the X contains a functional group having a pKa of 14 or less as a partial structure, it can also function as an alkali-soluble group. Thereby, it is thought that in the case where the resin is used in a curable composition or the like so as to impart an energy on the coating film and partially cure it, and dissolve the unexposed part to remove it and form a pattern, the developability into an alkali development solution in the uncured region is improved, and dispersibility/dispersion stability/developability can be simultaneously satisfied in a colored curable composition using a pigment dispersion containing an ultrafine pigment, and a pigment dispersion and a colored curable composition, each having a high pigment content.

Further, generally, a dispersion resin containing a polycaprolactone chain has high crystallinity as described in Japanese Patent Application Laid-Open No. 2007-63472, and thus, it is precipitated from a solvent at a low temperature. However, the dispersion resin containing a polycaprolactone chain of the present invention unexpectedly has high solubility in a solvent and is not precipitated from a solvent even at a low temperature. The reason is not clear, but it is thought that the partial structure represented by X in the resin has affinity with the solvent, and accordingly the solubility in the solvent is improved.

The content of the functional group having a pKa of 14 or less in X is not particularly limited, but it is preferably from 0.01 to 5 mmol based on 1 g of the specific resin of the present invention, and most preferably from 0.05 to 1 mmol. Within this range, the dispersibility and dispersion stability of the pigment is improved, and further, when the resin is used in a curable composition, the developability in the uncured part becomes excellent. In addition, as for an acid value, the functional group is preferably contained in an amount such that the acid value of the specific resin is from about 5 to 50 mg KOH/g from the viewpoint of developability when the specific resin of the present invention is used in the curable composition having a pattern forming property.

The acid value titration can be carried out by a known method, and for example, an indicator method (a method of determining a neutralization point by an indicator), a method of measuring a potential difference, or the like can be used. Further, a commercially available aqueous sodium hydroxide solution can be used as a titration solution used for the acid value titration, but in the case where it is difficult to measure the acid value by an aqueous sodium hydroxide solution, as in the case where an acid value titration of a functional group having a relatively high pKa (for example, —COCH$_2$CO—, a phenolic hydroxyl group, and the like) is carried out, it is possible that a non-aqueous titration solution such as a sodium methoxide-dioxane solution and the like is prepared, and the acid value is measured in the non-aqueous solvent system.

(iii) Oligomer Chain or Polymer Chain Y Having Number Average Molecular Weight of 500 to 1,000,000

Y represents an oligomer chain or polymer chain having a number average molecular weight of 500 to 1,000,000. Examples of Y include known polymer chains such as a polyester, a polyamide, a polyimide, a poly(meth)acrylic acid ester, and the like, which can be linked to the main chain portion of the specific resin. The linking portion to the specific resin of Y is preferably an end. Furthermore, the resin of the present invention may have two or more Ys (oligomer chains, polymer chains) having different structures in the molecule.

Y is preferably bonded to a nitrogen atom of the main chain portion. The bonding mode between Y and the main chain portion is covalent bonding, ionic bonding, or a combination of covalent bonding and ionic bonding. The ratio of the bonding modes of Y and the main chain portion is in the range of covalent bonding:ionic bonding=100:0 to 0:100, preferably 95:5 to 5:95, more preferably 90:10 to 10:90, and most preferably 95:5 to 80:20. By setting the bonding modes of the covalent bonding and the ionic bonding in this preferred range, dispersibility/dispersion stability is improved, and further, the solubility in a solvent is improved.

To a nitrogen atom of the main chain portion, Y is preferably amide-bonded, or ionically bonded as a carboxylate salt.

The number average molecular weight of Y can be measured by a GPC method using a polystyrene as a standard. The number average molecular weight of Y is particularly preferably from 1,000 to 50,000, and most preferably from 1,000 to 30,000, from the viewpoint of dispersibility/dispersion stability/developability.

Preferably two or more, and most preferably five or more of the side chain structures represented by Y are bonded to the main chain of one molecule of the resin.

Particularly, Y preferably has a structure represented by general formula (III-1).

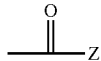

General Formula (III-1)

In general formula (III-1), Z is a polymer or oligomer having a polyester chain as a partial structure, and represents a residue formed by removal of the carboxyl group from a polyester having a free carboxyl group represented by the following general formula (IV).

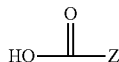

General Formula (IV)

In general formula (IV), Z has the same definition as Z in general formula (III-1).

In the case where the specific resin contains the repeating unit represented by general formula (I-3) or (II-3), (Y')⁻ is preferably represented by general formula (III-2).

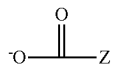

General Formula (III-2)

In general formula (III-2), Z has the same definition as Z in general formula (III-1).

A polyester having a carboxyl group at one end (polyester represented by general formula (IV)) can be obtained by polycondensation (IV-1) of a carboxylic acid and a lactone, polycondensation (IV-2) of hydroxy group-containing carboxylic acid, or polycondensation (N-3) of a dihydric alcohol and a divalent carboxylic acid (or a cyclic acid anhydride).

The carboxylic acid used in the polycondensation reaction (IV-1) of a carboxylic acid and a lactone may be an aliphatic carboxylic acid (preferably those having 1 to 30 carbon atoms and being linear or branched, such as formic acid, acetic acid, propionic acid, butyric acid, valeric acid, n-hexanoic acid, n-octanoic acid, n-decanoic acid, n-dodecanoic acid, palmitic acid, 2-ethylhexanoic acid, cyclohexanoic acid, and the like), or a hydroxy group-containing carboxylic acid (preferably a hydroxy group-containing carboxylic acid having 1 to 30 carbon atoms and being linear or branched, such as glycolic acid, lactic acid, 3-hydroxypropionic acid, 4-hydroxydodecanoic acid, 5-hydroxydodecanoic acid, ricinoleic acid, 12-hydroxydodecanoic acid, 12-hydroxystearic acid, 2,2-bis(hydroxymethyl)butyric acid, and the like), and particularly preferably a linear aliphatic carboxylic acid having 6 to 20 carbon atoms or a hydroxy group-containing carboxylic acid having 1 to 20 carbon atoms. These carboxylic acids may be used in a mixture. As the lactone, a known lactone can be used, and examples thereof include β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, and the like, and particularly preferably ε-caprolactone from the viewpoint of reactivity/availability.

These lactones may be used in a mixture of plural kinds thereof.

The feed ratio of the carboxylic acid and the lactone at a time of the reaction depends on the molecular weight of a desired polyester chain, and thus it cannot be exclusively determined, but carboxylic acid:lactone=1:1 to 1:1,000 is preferable, and 1:3 to 1:500 is most preferable.

The hydroxy group-containing carboxylic acid in the polycondensation (IV-2) of the hydroxy group-containing carboxylic acid is the same as the hydroxy group-containing carboxylic acid in (IV-1), and its preferred range is also the same.

The dihydric alcohol of the polycondensation reaction (IV-3) of the dihydric alcohol and divalent carboxylic acid (or cyclic acid anhydride) may be a linear or branched aliphatic diol (preferably a diol having 2 to 30 carbon atoms, such as ethylene glycol, diethylene glycol, triethylene glycol, dipropylene glycol, 1,2-propanediol, 1,3-propanediol, 1,5-pentanediol, 1,6-hexanediol, 1,8-octanediol, and the like), and particularly preferably an aliphatic diol having 2 to 20 carbon atoms.

Examples of the divalent carboxylic acid include a linear or branched, divalent aliphatic carboxylic acid (preferably a divalent aliphatic carboxylic acid having 1 to 30 carbon atoms, such as succinic acid, maleic acid, adipic acid, sebacic acid, dodecanoic diacid, glutaric acid, suberic acid, tartaric acid, oxalic acid, malonic acid, and the like), and particularly preferably a divalent carboxylic acid having 3 to 20 carbon atoms. Further, acid anhydride (for example, anhydrous succinic acid, anhydrous glutaric acid, and the like), which are equivalent to these divalent carboxylic acids, may also be used.

The divalent carboxylic acid and the dihydric alcohol are preferably fed at a molar ratio of 1:1. Thereby, it is possible to introduce a carboxylic acid at an end.

The polycondensation at a time of production of a polyester is preferably carried out with the addition of a catalyst. The catalyst is preferably a catalyst which functions as a Lewis acid, and examples thereof include a Ti compound (for example, Ti(OBu)₄, Ti(O—Pr)₄, and the like), an Sn compound (for example, tin octylate, dibutyltin oxide, dibutyltin laurate, monobutyltin hydroxybutyl oxide, stannic chloride, butyltin dioxide, and the like), protonic acid (for example, sulfuric acid, paratoluenesulfonic acid, and the like), and the like. The amount of the catalyst is preferably from 0.01 to 10% by mole, and most preferably from 0.1 to 5% by mole, with respect to the moles of the total monomers. The reaction temperature is preferably from 80 to 250° C., and most preferably from 100 to 180° C. The reaction time depends on the reaction condition, but it is usually from 1 to 24 hours.

The number average molecular weight of the polyester can be measured by a GPC method using a polystyrene as a standard substance. The number average molecular weight of the polyester is from 500 to 1,000,000, preferably from 2,000 to 100,000, and most preferably from 3,000 to 50,000. The molecular weight within this range allows the compatibility of dispersibility/developability.

The polyester partial structure forming a polymer chain in Y is preferably a polyester, obtained by particularly the polycondensation (IV-1) of a carboxylic acid and a lactone, and the polycondensation (IV-2) of hydroxy group-containing carboxylic acid, from the viewpoint of easy production.

The specific embodiments [(A-1) to (A-60)] of the specific resin of the present invention and the specific structures of the repeating units contained in the resin are described below in the combinations, but the present invention is not intended to be limited thereto. In the following formulae, k, l, m, and n each represent the polymerization molar ratio of the repeating unit, k represents 1 to 80, l represents 10 to 90, m represents 0 to 80, n represents 0 to 70, and k+l+m+n=100. p and q represent the number of the linking portions of the polyester chain, and each independently represent 5 to 100,000. R' represents a hydrogen atom or an alkoxycarbonyl group.

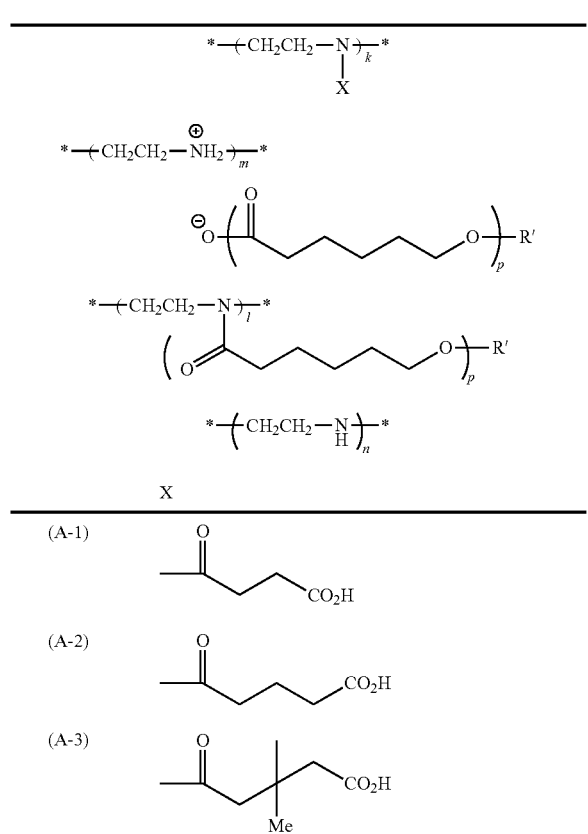

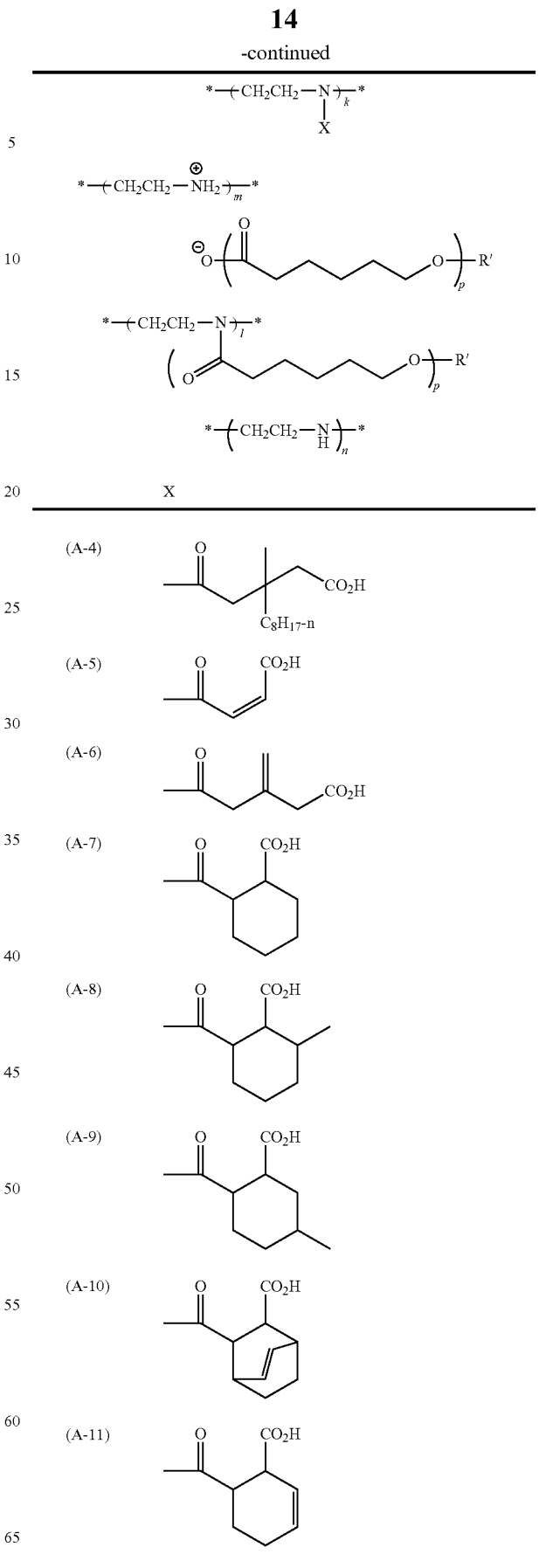

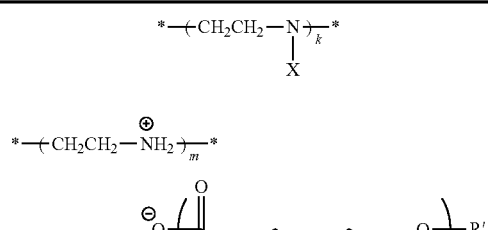
| X | |
|---|---|
| (A-12) | 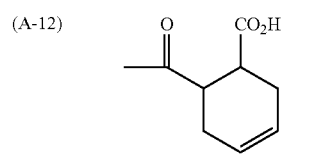 |
| (A-13) | 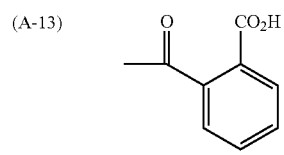 |
| (A-14) | 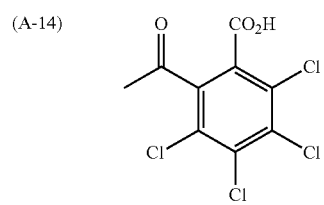 |
| (A-15) | 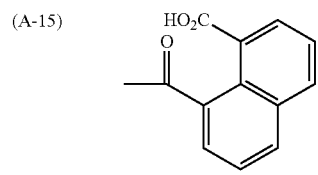 |
| (A-16) | 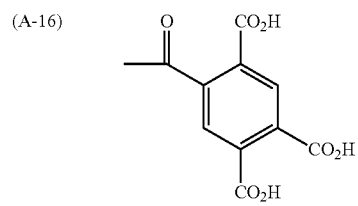 |
| (A-17) | 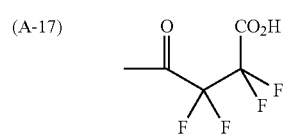 |
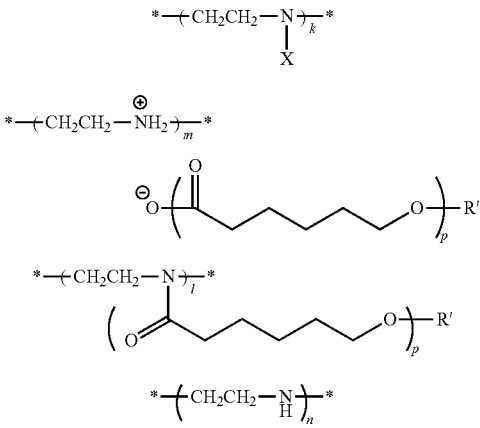
| X | |
|---|---|
| (A-18) | 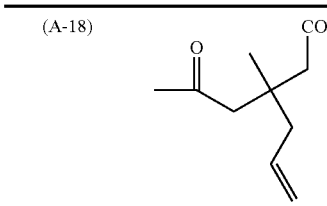 |
| (A-19) | 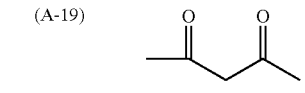 |
| (A-20) | 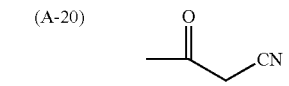 |
| (A-21) | 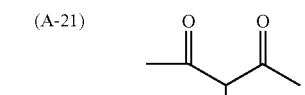 |
| (A-22) | 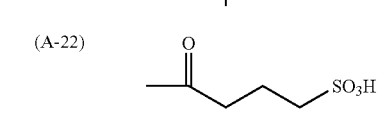 |
| (A-23) | 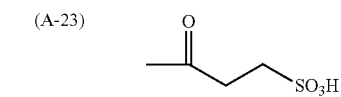 |
| (A-24) | 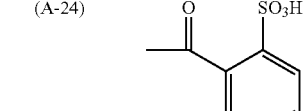 |
| (A-25) | —CH$_2$CO$_2$H |
| (A-26) | —CH$_2$CH$_2$CO$_2$H |
| (A-27) | 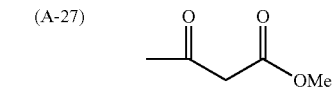 |
| (A-28) | 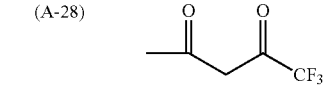 |

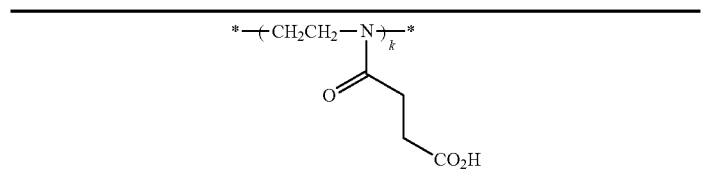
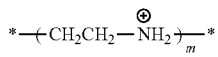
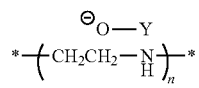
Y
(A-29) 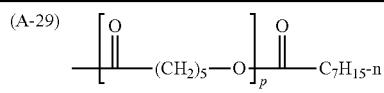
(A-30) 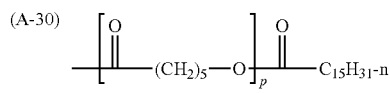
(A-31) 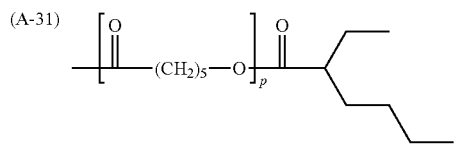
(A-32) 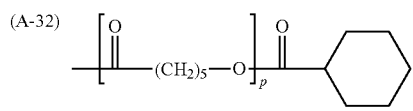
(A-33) 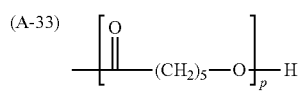
(A-34) 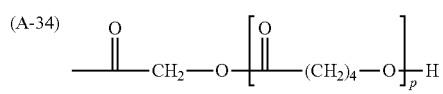
(A-35) 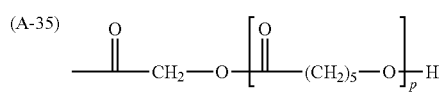
(A-36) 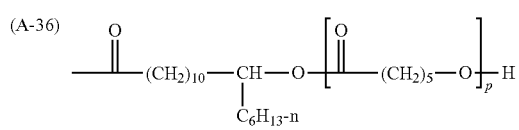
(A-37) 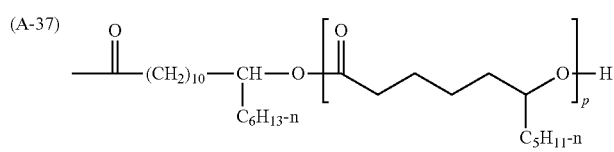
(A-38) 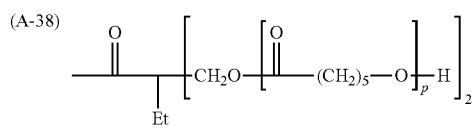

-continued
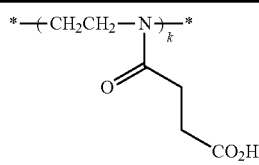
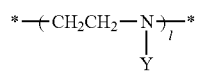
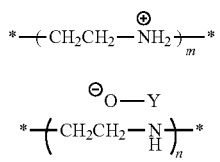
Y
(A-39) 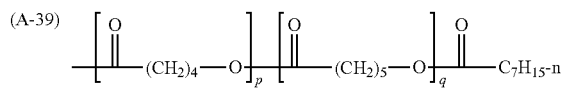
(A-40) 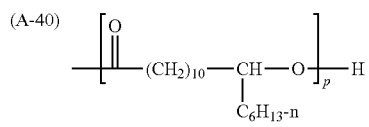
(A-41) 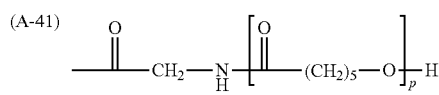
(A-42) 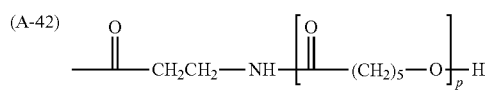
(A-43) 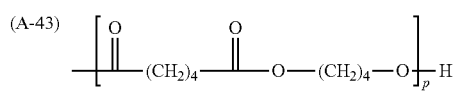
(A-44) 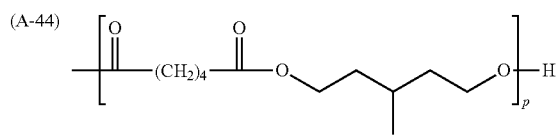
(A-45) 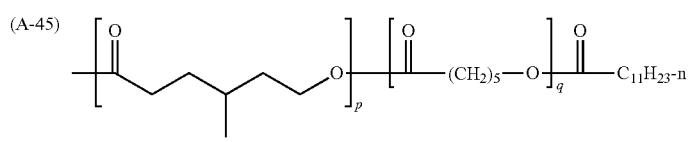
(A-46) 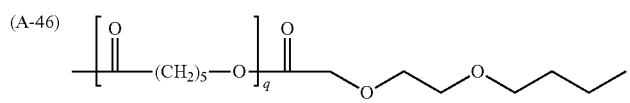

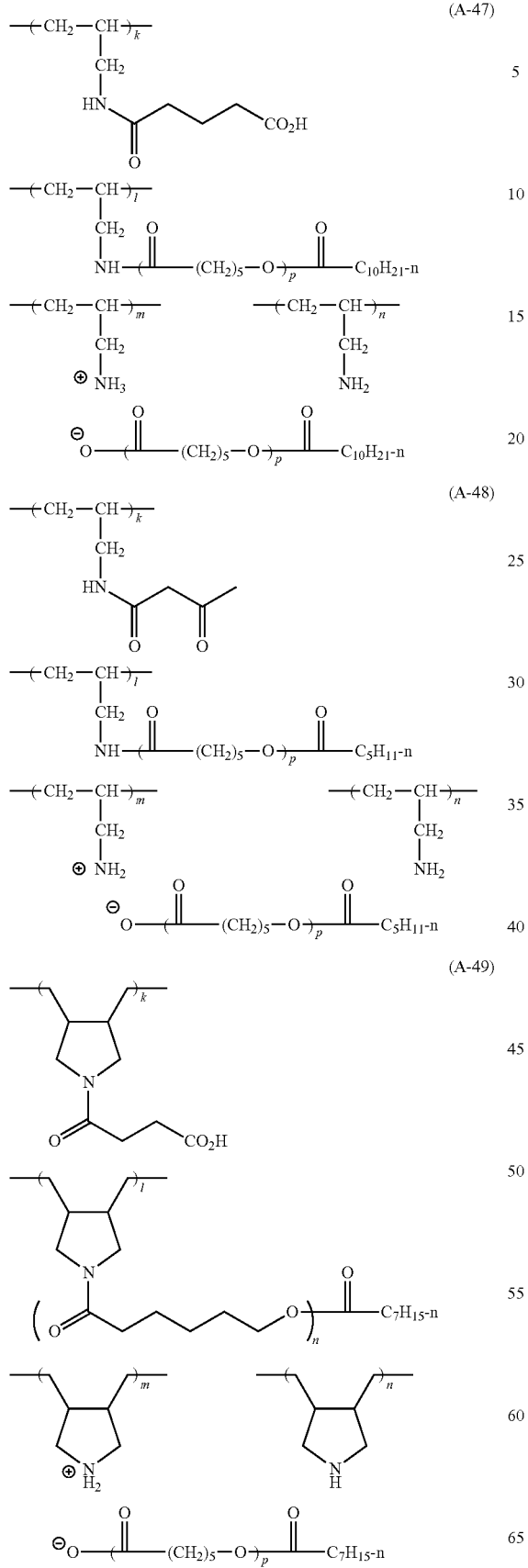
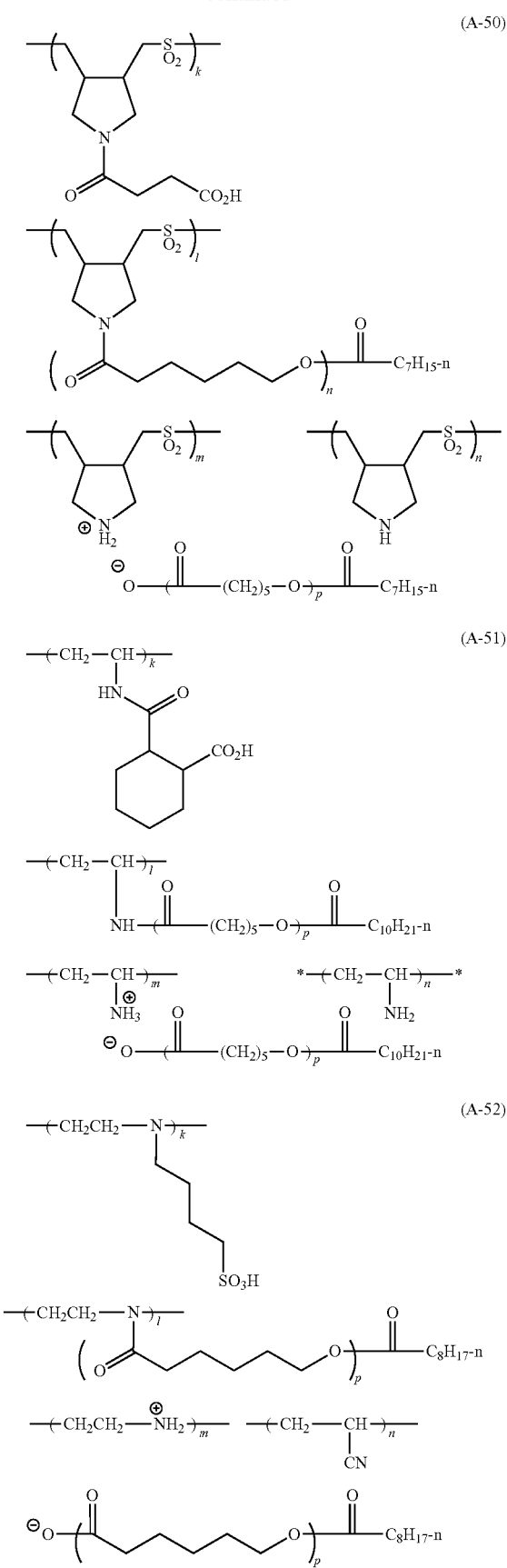

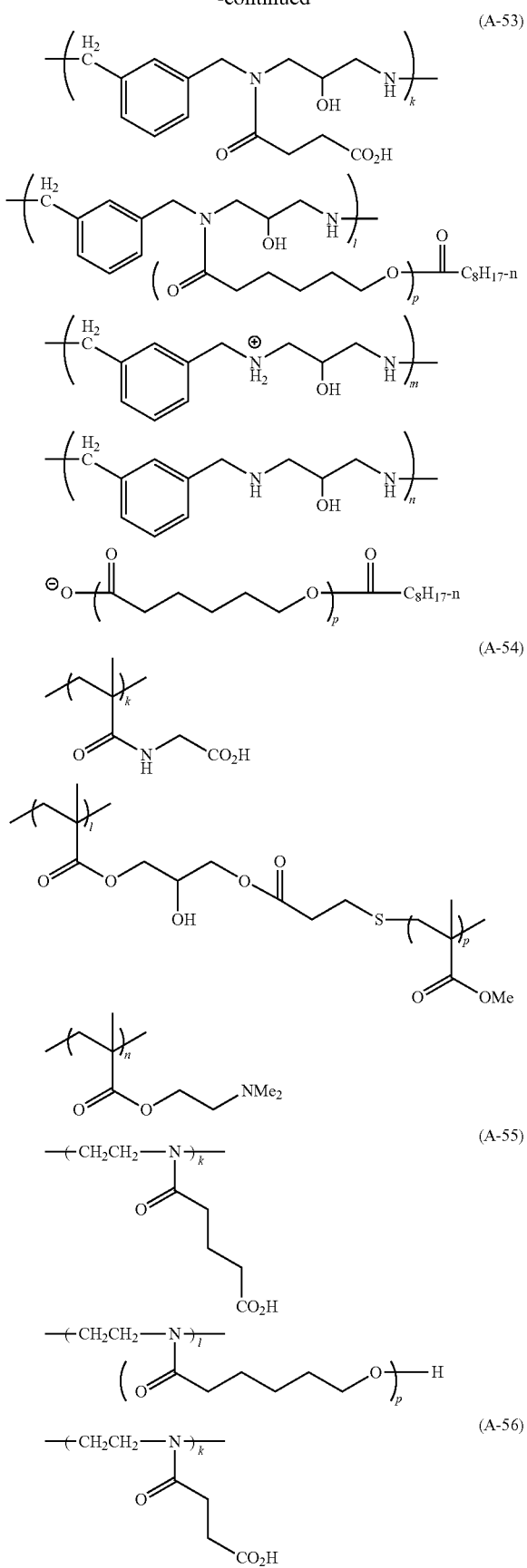

-continued

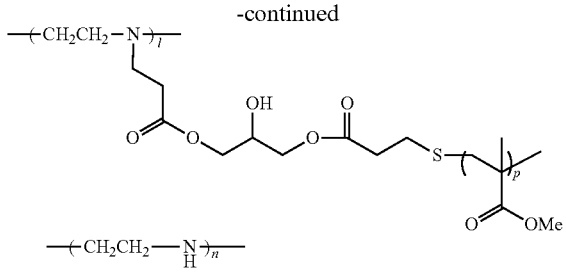

For the synthesis of the specific resin of the present invention, the specific resin can be produced by (1) a method in which a resin having a primary or secondary amino group, a precursor x of X, and a precursor y of Y are reacted with each other, or (2) a method in which a monomer containing a nitrogen atom, a monomer containing X, and a macromonomer containing Y are polymerized, and it is preferably produced by first synthesizing a resin having a primary or secondary amino group in the main chain, and then allowing the resin to undergo a reaction with the precursor x of X and the precursor y of Y to introduce them to a nitrogen atom present in the main chain by a polymer reaction.

Hereinafter, the (1) method in which the resin having a primary or secondary amino group, the precursor y of X, and the precursor y of Y are reacted will be described.

Examples of the resin having a primary or secondary amino group include an oligomer or polymer containing a primary or secondary amino group, which constitutes the main chain portion containing a nitrogen atom, such as a poly(lower alkylene imine), a polyallylamine, a polydiallylamine, a met-axylenediamine-epichlorohydrin polycondensate, a polyvinylamine, and the like. Among these, an oligomer or polymer consisting of a poly(lower alkylene imine) or a polyallylamine is preferable.

The precursor x of the group X having a functional group having a pKa of 14 or less represents a compound which can react with the resin having a primary or secondary amino group and introduce X into the main chain.

Examples of x include a cyclic carboxylic anhydride (a cyclic carboxylic anhydride having 4 to 30 carbon atoms is preferable), such as succinic anhydride, glutaric anhydride, itaconic anhydride, maleic anhydride, allyl succinic anhydride, butyl succinic anhydride, n-octyl succinic anhydride, n-decyl succinic anhydride, n-dodecyl succinic anhydride, n-tetradecyl succinic anhydride, n-docosenyl succinic anhydride, (2-hexen-1-yl)succinic anhydride, (2-methylpropen-1-yl)succinic anhydride, (2-dodecen-1-yl)succinic anhydride, n-octenyl succinic anhydride, (2,7-octanedien-1-yl)succinic anhydride, acetyl malic anhydride, diacetyl tartaric anhydride, het anhydride, cyclohexane-1,2-dicarboxylic anhydride, 3 or 4-methyl cyclohexane-1,2-dicarboxylic anhydride, tetrafluoro succinic anhydride, 3 or 4-cyclohexene-1,2-dicarboxylic anhydride, 4-methyl-4-cyclohexene-1,2-dicarboxylic anhydride, phthalic anhydride, tetrachlorophthalic anhydride, naphthalic anhydride, naphthalic anhydride, bicyclo[2.2.2]octo-7-ene-2,3,5,6-tetracarboxylic dianhydride, pyromellitic dianhydride, meso-butane-1,2,3,4-tetracarboxylic dianhydride, 1,2,3,4-cyclopentane carboxylic dianhydride, and the like), a halogen atom-containing carboxylic acid (for example, chloroacetic acid, bromo acetic acid, iodoacetic acid, 4-chloro-n-butyric acid, and the like), sultone (for example, propanesultone, 1,4-butanesultone, and the like), diketene, cyclic sulfocarboxylic anhydride (for example, 2-sulfobenzoic anhydride and the like), a —COCH$_2$COCl-containing compound (for example, ethylmalonyl chloride and the like), or a cyano acetic acid chloride, and the like, and particularly preferably a cyclic carboxylic anhydride, sultone, and diketene from the viewpoint of productivity.

The precursor y of the oligomer chain or polymer chain Y having a number average molecular weight of 500 to 1,000,000 represents a compound which can react with resin having a primary or secondary amino group and introduce the Y.

The y is preferably an oligomer or polymer having a number average molecular weight of 500 to 1,000,000 and having a terminal group that can be covalently or ionically bonded to a nitrogen atom of the specific resin, but particularly an oligomer or polymer having a number average molecular weight of 500 to 1,000,000 and having a free carboxyl group at one end is most preferable.

Examples of y include a polyester represented by general formula (IV), which has a free carboxyl group at one end, a polyamide which has a free carboxyl group at one end, a poly(meth)acrylic acid-based resin which has a free carboxyl group at one end, and the like, but particularly a polyester represented by general formula (IV), which has a free carboxyl group at one end, is most preferable.

y can be synthesized by a known method, and for example, a method of producing a polyester containing a free carboxyl group at one end represented by general formula (IV) by the polycondensation (IV-1) of a carboxylic acid and a lactone, the polycondensation (IV-2) of hydroxy group-containing carboxylic acid or the polycondensation (IV-3) of a dihydric alcohol and a divalent carboxylic acid (or a cyclic acid anhydride) as described above can be exemplified. The polyamide containing a free carboxyl group at one end can be produced by self-condensation of an amino group-containing carboxylic acid (for example, glycine, alanine, β-alanine, 2-amino butyric acid, and the like), and the like. The poly(meth)acrylic acid ester containing a free carboxyl group at one end can be produced by radical polymerization of (meth)acrylic acid-based monomers in the presence of a carboxyl group-containing chain transfer agent (for example, 3-mercaptopropionic acid and the like).

The specific resin of the present invention can be produced by (a) a method in which a resin having a primary or secondary amino group, x, and y are simultaneously reacted with each other, (b) a method in which a resin having a primary or secondary amino group is first reacted with x, and then reacted with y, or (c) a method in which a resin having a primary or secondary amino group is first reacted with y, and then reacted with x. Particularly, (c) a method in which a resin having a primary or secondary amino group is first reacted with y, and then reacted with x is preferable.

The reaction temperature can be suitably selected according to the conditions, but it is preferably from 20 to 200° C., and most preferably from 40 to 150° C. The reaction time is preferably from 1 to 48 hours, and more preferably from 1 to 24 hours from the viewpoint of productivity.

The reaction may be carried out in the presence of a solvent. Examples of the solvent include water, a sulfoxide compound (for example, dimethylsulfoxide, and the like), a ketone compound (for example, acetone, methyl ethyl ketone, cyclohexanone, and the like), an ester compound (for example, ethyl acetate, butyl acetate, ethyl propionate, propylene glycol 1-monomethyl ether 2-acetate, and the like), an ether compound (for example, diethyl ether, dibutyl ether, tetrahydrofuran, and the like), an aliphatic hydrocarbon compound (for example, pentane, hexane, and the like), an aromatic hydrocarbon compound (for example, toluene, xylene, mesitylene, and the like), a nitrile compound (for example, acetonitrile, propionitrile, and the like), an amide compound (for example, N,N-dimethyl formamide, N,N-dimethylacetamide, N-methylpyrrolidone, and the like), a carboxylic acid compound (for example, acetic acid, propionic acid, and the like), an alcohol compound (for example, methanol, ethanol, isopropanol, n-butanol, 3-methyl butanol, 1-methoxy-2-propanol, and the like), and a halogen solvent (for example, chloroform, 1,2-dichloroethane, and the like).

In the case of using a solvent, the solvent is preferably used at 0.1 to 100 times by weight, and most preferably 0.5 to 10 times by weight, with respect to the substrate.

The specific resin of the present invention may be purified by a reprecipitation method. When the specific resin obtained by removing low molecular weight components in the reprecipitation method is used as a pigment dispersant, the dispersibility is improved.

For the reprecipitation method, a hydrocarbon solvent such as hexane and an alcohol solvent such as methanol are preferably used.

Next, the (2) method in which a monomer containing a nitrogen atom, a monomer containing X, and a macromonomer containing Y are polymerized will be described.

As the monomer containing a nitrogen atom which is used in this method, a known monomer can be selected, and examples thereof include 2-dialkylaminoethyl(meth)acrylate, 3-dialkylaminopropyl(meth)acrylamide, vinyl pyridine, N-vinyl imidazole, and the like, particularly preferably a monomer containing a tertiary amino group, and most preferably 2-dialkylaminoethyl(meth)acrylate and 3-dialkylaminopropyl(meth)acrylamide.

As the monomer containing X, (meth)acrylic acid amide containing X is preferable, and for example, an amino acid containing a (meth)acryloyl group, such as N-(meth)acryloyl glycine, N-(meth)acryloyl alanine, and the like is preferable.

Examples of the macromonomer containing Y include known macromonomers, and preferably macromonomers which have a polymerizable group at one end of a poly(meth)acrylic acid ester, a polystyrene, or a polyester. For example, a macromonomer AA-6 manufactured by Toagosei Co., Ltd. (a polymethyl methacrylate having a terminal methacryloyl group), AS-6 (a polystyrene having a terminal methacryloyl group), AN-6S (a copolymer of styrene and acrylonitrile, having a terminal methacryloyl group), AB-6 (a polybutyl acrylate having a terminal methacryloyl group), PLACCEL FM5 manufactured by Daicel Chemical Industries (5-mol equivalent ε-caprolactone addition product of 2-hydroxy-ethyl methacrylate), FA 10L (10-mol equivalent ε-caprolactone addition product of 2-hydroxyethyl acrylate), and a polyester-based macromer as described in Japanese Patent Application Laid-Open No. 2-272009 are preferable.

The polymerization is preferably carried out using a radical polymerization initiator under a nitrogen atmosphere. As the radical polymerization initiator, a known radical polymerization initiator can be used, but azobisisobutyronitrile and methyl 2,2'-azobisisobutyrate are preferable from the viewpoint of adjustment of molecular weights and handling.

The radical polymerization initiator is preferably used at 0.01% by mole to 10% by mole, and most preferably 0.1% by mole to 5% by mole, with respect to the moles of the total monomers.

A chain transfer agent may be added to adjust the molecular weight. As the chain transfer agent, a thiol compound is particularly preferable, and an alkane thiol having 5 to 20 carbon atoms, 2-mercaptoethanol, and 2-mercaptopropionic acid are preferable.

The chain transfer agent is preferably used at 0.01% by mole to 10% by mole, and most preferably at 0.1% by mole to 5% by mole with respect to the moles of the total monomers.

The reaction temperature is preferably from 60 to 100° C., and most preferably from 70 to 90° C.

Examples of the reaction solvent include the solvents exemplified as for the (1) method in which a resin having a primary or secondary amino group, a precursor x of X, and a precursor y of Y are reacted with each other.

The novel resin of the present invention obtained as above preferably has a weight average molecular weight of 3,000 to 100,000, and more preferably 5,000 to 50,000, as measured by a GPC method. The molecular weight in the above-described range is advantageous in that high developability/high storage stability can be accomplished. Further, the presence of a nitrogen atom in the (i) main chain portion in the specific resin of the present invention can be confirmed by a method such as an acid titration method and the like, and the presence of the (ii) functional group having a pKa of 14 or less and the bonding of the functional group to a nitrogen atom present in the main chain portion can be confirmed by a method such as base titration/nuclear magnetic resonance spectroscopy/infrared spectroscopy and the like. Further, it can be confirmed by a method such as a nuclear magnetic resonance spectroscopy/GPC method that the (iii) oligomer chain or polymer chain Y having a number average molecular weight of 500 to 1,000,000 is contained in the side chain.

Hereinbelow, specific examples of the specific resin of the present invention will be described together with their molecular weights.

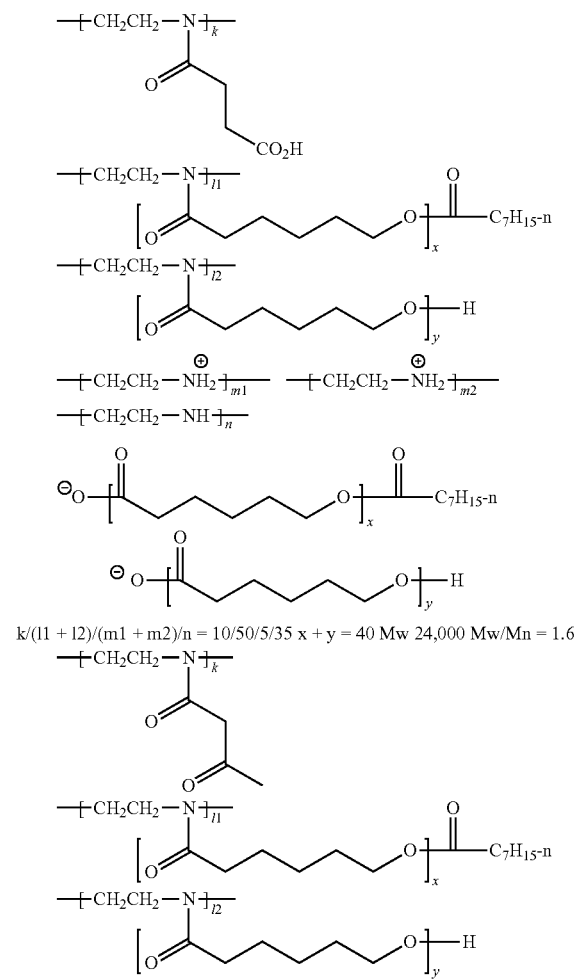

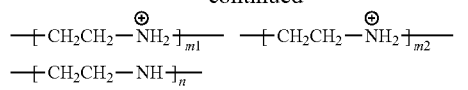
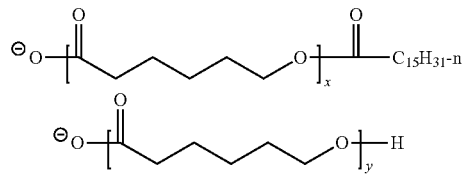
k/(l1 + l2)/(m1 + m2)/n = 20/40/5/35 x + y = 60 Mw 18,000
Mw/Mn = 1.6
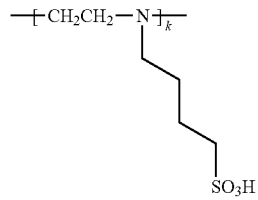
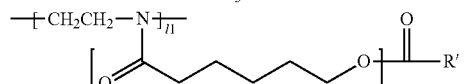
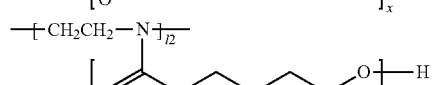
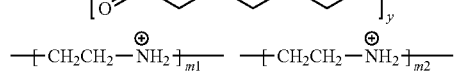
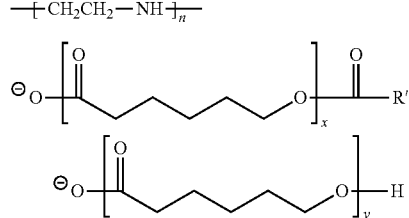
k/(l1 + l2)/(m1 + m2)/n = 5/60/10/25 x + y = 20 Mw 12,000
Mw/Mn = 1.6
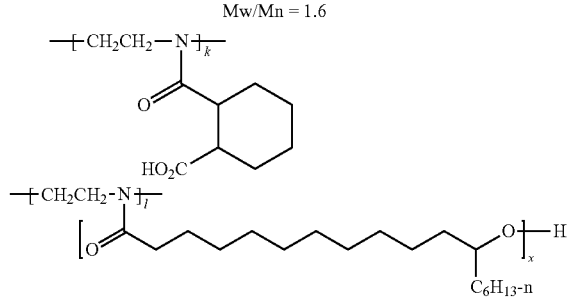
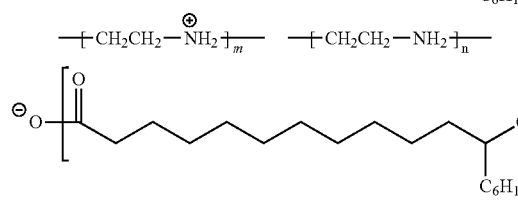
k/l/m/n = 5/30/7/58 Mw 15,000 Mw/Mn = 2.2
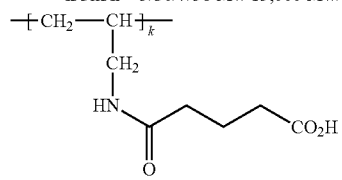
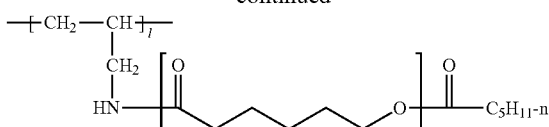
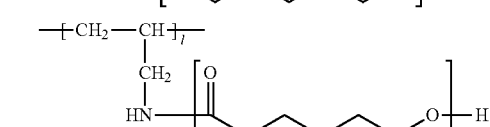
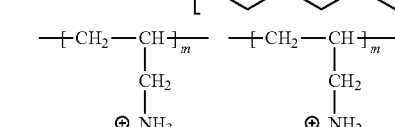
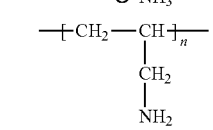
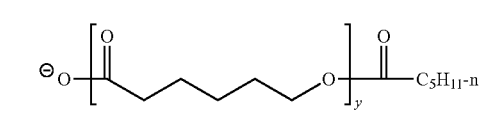
k/(l1 + l2)/(m1 + m2)/n = 30/60/5/5 Mw 40,000
Mw/Mn = 2.5
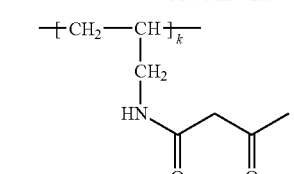
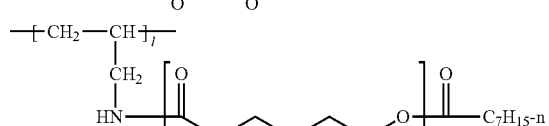
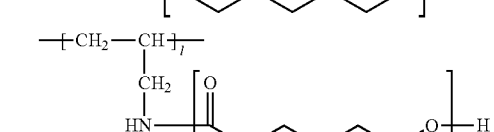
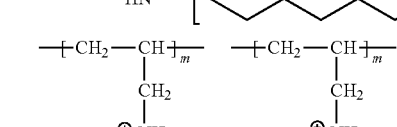
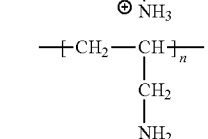
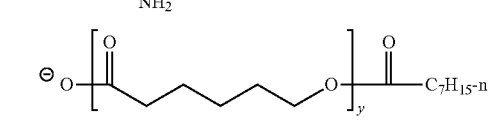
k/(l1 + l2)/(m1 + m2)/n = 20/70/5/5 Mw 42,000
Mw/Mn = 2.5

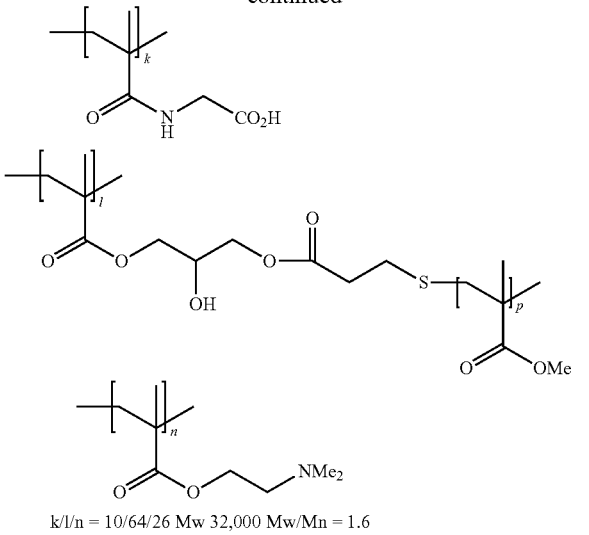

k/l/n = 10/64/26 Mw 32,000 Mw/Mn = 1.6

[Pigment Dispersion]

The specific resin of the present invention particularly exhibits an excellent function as a pigment dispersant. Hereinafter, a pigment dispersion containing the specific resin of the present invention (A), the pigment (B), and the solvent (C) will be described in detail.

The pigment dispersion of the present invention may contain only one kind or two or more kinds of the specific resin of the present invention (A).

In the pigment dispersion, the specific resin (A) may be contained at a ratio in a range from 1 part by mass to 200 parts by mass, preferably from 5 parts by mass to 100 parts by mass, and more preferably from 5 parts by mass to 60 parts by mass, with respect to 100 parts by mass of the pigment (B) to be described later.

<Pigment (B)>

As the pigment contained in the pigment dispersion of the present invention, various conventionally known inorganic pigments or organic pigments can be used. Further, considering that inorganic pigments and organic pigments having a high transmittance are preferred, use of a pigment having a particle size which is as small as possible is preferable. Also, considering handling properties, the average particle diameter of the pigment is preferably from 0.005 μm to 0.1 μm, and more preferably from 0.005 μm to 0.05 p.m.

Further, examples of the inorganic pigments include metal compounds such as metal oxides and metal complexes. Specific examples thereof include oxides of metals such as iron, cobalt, aluminum, cadmium, lead, copper, titanium, magnesium, chromium, zinc, antimony, and the like, and complex oxides of these metals.

Examples of the organic pigment which can be used in the pigment dispersion of the present invention include:

C. I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208;

C. I. Pigment Orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, 79;

C. I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276;

C. I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, 50;

C. I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79;

C. I. Pigment Green 1, 2, 4, 7, 8, 10, 13, 14, 15, 17, 18, 19, 26, 36, 45, 48, 50, 51, 54, 55, 58;

C. I. Pigment Brown 23, 25, 26; and

C. I. Pigment Black 1, 7.

Examples of the pigments include carbon black, acetylene black, lamp black, bone black, graphite, iron black, aniline black, cyanine black, titanium black, and the like.

In the present invention, ones having a basic N atom in the structural formula of the pigment can be particularly preferably used. These pigments having a basic N atom exhibit good dispersibility in the composition of the present invention. The reason has not been sufficiently clarified, but it is presumed that good affinity between the photosensitive polymerization component and the pigment give the effect.

Examples of the pigments which can be preferably used in the present invention include the followings. However, the present invention is not intended to be limited thereto.

C. I. Pigment Yellow 11, 24, 108, 109, 110, 138, 139, 150, 151, 154, 167, 180, 185, C. I. Pigment Orange 36, 71, C. I. Pigment Red 122, 150, 171, 175, 177, 209, 224, 242, 254, 255, 264, C. I. Pigment Violet 19, 23, 32, C. I. Pigment Blue 15:1, 15:3, 15:6, 16, 22, 60, 66, C. I. Pigment Green 7, 36, 37, 58;

C. I. Pigment Black 1.

These organic pigments may be used singly or in various combinations of two or more to improve color purity. Specific examples of the combinations are as follows. For example, a red pigment selected from an anthraquinone pigment, a perylene pigment, and a diketopyrrolopyrrole pigment may be used singly, or at least one of these red pigments may be used in combination with a disazo yellow pigment, an isoindoline yellow pigment, a quinophthalone yellow pigment or a perylene red pigment. For example, the anthraquinone pigment may be C. I. Pigment Red 177, the perylene pigment may be C. I. Pigment Red 155 or C. I. Pigment Red 224, and the diketopyrrolopyrrole pigment may be C. I. Pigment Red 254, and in view of color resolution, a mixture with C. I. Pigment Yellow 139 is preferably used. Further, the mass ratio of a red pigment to a yellow pigment is preferably from 100:5 to 100:50. When the mass ratio is 100:4 or less, it may be difficult to suppress the transmittance of light from 400 nm to 500 nm, and when the mass ratio is 100:51 or larger, it may not be possible to improve the color resolution since the main wavelength is shifted to a shorter wavelength. The optimal mass ratio is particularly within a range from 100:10 to 100:

30. In addition, when a red pigment is combined with another red pigment, the mass ratio thereof may be adjusted in accordance with a desired spectrum.

Further, as a green pigment, a halogenated Phthalocyanine-based pigment may be used singly, or in a mixture with a disazo-based yellow pigment, a quinophthalone-based yellow pigment, an azomethine-based yellow pigment, or an isoindoline-based yellow pigment. Preferable examples of such a mixture include a mixture of C. I. Pigment Green 7, 36, or 37 with C. I. Pigment Yellow 83, C. I. Pigment Yellow 138, C. I. Pigment Yellow 139, C. I. Pigment Yellow 150, C. I. Pigment Yellow 180, or C. I. Pigment Yellow 185. The mass ratio of the green pigment to the yellow pigment is preferably from 100:5 to 100:150. The mass ratio of the green pigment to the yellow pigment is particularly preferably in a range from 100:30 to 100:120.

As a blue pigment, a Phthalocyanine-based pigment may be used singly or in a mixture with a dioxazine-based violet pigment. A preferable example is a combination of C. I. Pigment Blue 15:6 with C. I. Pigment Violet 23. The mass ratio of the blue pigment to the violet pigment is preferably from 100:0 to 100:100, and more preferably 100:10 or less.

Further, as a pigment for a black matrix, carbon, titanium black, iron oxide, and titanium oxide may be used singly, or in a mixture thereof, and a combination of carbon and titanium black is preferable. Also, the mass ratio of the carbon to the titanium black is preferably in a range from 100:0 to 100:60.

As the pigment which is used in the present invention, a preliminarily finely pulverized pigment is preferably used. As the finely pulverizing of the primary particles of the pigment, a method of mechanically kneading i) a pigment, ii) a water-soluble inorganic salt, iii) a water-soluble organic solvent that does not substantially dissolve the inorganic salt, using a kneader or the like (a "salt milling" method) is well-known. In this process, iv) a polymeric compound for coating a pigment, and the like may be simultaneously used.

i) Pigment

Examples of the pigment include the same pigments as described above.

ii) Water-Soluble Inorganic Salt

The inorganic salt is not particularly limited as long as it dissolves in water, and sodium chloride, barium chloride, potassium chloride, sodium sulfate, or the like can be used, but from a standpoint of cost, sodium chloride or sodium sulfate is preferably used. The amount of the inorganic salt used in the salt milling is preferably from 1 to 30 times by mass of the organic pigment, and particularly from 5 to 25 times by mass, from standpoints of both treatment efficiency and production efficiency. This is because the amount of the pigment per one treatment becomes small although a higher amount ratio of the inorganic salt relative to the organic pigment gives a higher efficiency in pulverization.

iii) Small Amount of Water-Soluble Organic Solvent that Substantially Does not Dissolve ii)

The water-soluble organic solvent functions to make the organic pigment and the inorganic salt wet, and it is not particularly limited as long as it is dissolved in (miscible with) water and does not substantially dissolve the inorganic salt. However, since a temperature is elevated in the salt milling and the solvent is thus brought into the state where a solvent is easily evaporated, a high boiling point solvent having a boiling point of 120° C. or higher is preferable from a viewpoint of safety. As the water-soluble organic solvent, for example, 2-methoxyethanol, 2-butoxyethanol, 2-(isopentyloxy)ethanol, 2-(hexyloxy)ethanol, ethylene glycol, diethylene glycol, diethylene glycol monoethyl ether, diethylene glycol monoethyl ether acetate, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, liquid polypropylene glycol, or the like is used.

An addition amount of the water-soluble organic solvent is preferably 5% by weight to 50% by weight with respect to the inorganic salt, more preferably 10% by weight to 40% by weight with respect to the inorganic salt, and optimally 15% by weight to 35% by weight with respect to the inorganic salt. When the addition amount is less than 5% by weight, uniform kneading becomes difficult and distribution of a particle size of the pigment becomes too large in some cases. When the addition amount is 50% by weight or more, since a kneaded composition becomes too soft, and it becomes difficult to impart shear to the kneaded composition, the sufficient miniaturization effect cannot be obtained.

The water-soluble organic solvent may be added at once at an initial stage of salt milling, or may be added by dividing it. The water-soluble organic solvent may be used singly or in combination of two or more kinds thereof.

iv) Polymeric Compound for Coating Pigment

The polymeric compound for coating the pigment which may be added is preferably one which is solid at room temperature and water-insoluble, and needs to be at least partially soluble in a water-soluble organic solvent used as a wetting agent at the salt milling, and a natural resin, a modified natural resin, a synthetic resin, a synthetic resin modified with a natural resin, or the like is used. When a dried processed pigment is used, the compound to be used is preferably solid at room temperature. As the natural resin, rosin is representative, and examples of the modified natural resin include a rosin derivative, a cellulose derivative, a rubber derivative, a protein derivative, and an oligomer thereof. Examples of the synthetic resin include an epoxy resin, an acrylic resin, a maleic resin, a butyral resin, a polyester resin, a melamine resin, a phenol resin, a polyurethane resin, and the like. Examples of the synthetic resin modified with a natural resin include a rosin modified maleic resin, a rosin modified phenol resin, and the like.

Examples of the synthetic resin include a polyamidoamine and a salt thereof, a polycarboxylic acid and a salt thereof, a high molecular unsaturated acid ester, a polyurethane, a polyester, a poly(meth)acrylate, a (meth)acryl-based copolymer, and a naphthalenesulfonic acid formalin condensate.

For the timing for adding the resin, the resin may be added at once at an initial stage of salt milling, or may be added by dividing it.

In the case where the coloring composition of the present invention is used for a color filter, the primary particle diameter of the pigment is preferably from 5 to 100 nm, more preferably from 5 to 70 nm, further preferably from 5 to 50 nm, and most preferably from 5 to 40 nm, from the viewpoint of color unevenness or contrast. The specific resin of the present invention can exhibit the effect particularly in a range from 5 to 40 nm.

The primary particle diameter of the pigment can be measured by a known method such as electron microscopy.

Inter alia, the pigment is preferably a pigment selected from an anthraquinone-based pigment, an azomethine-based pigment, a benzylidene-based pigment, a cyanine-based pigment, a diketopyrrolopyrrole-based pigment, and a phthalocyanine-based pigment.

The content of the pigment in the pigment dispersion of the present invention is preferably 30% by mass or more, more preferably from 35% by mass to 80% by mass, and most preferably from 40% by mass to 70% by mass, with respect to the total solid content in the pigment dispersion. In the case where the specific resin of the present invention is used as a pigment dispersant, it can be said that the effect thereof is particularly remarkable under the condition of high pigment content of 40% by mass or more, under which condition it is difficult to obtain a stable and uniform dispersion with a conventional dispersant.

(C) Solvent

The pigment dispersion of the present invention has at least one kind of solvent (C). Examples of the solvent (C) include liquids selected from the organic solvents to be described below, and the solvent is not particularly limited as long as it is chosen by taking solubility of each component contained in the pigment dispersion, coating properties when applied to the curable composition, and the like into consideration and satisfies the desired physical properties. However, it is preferably chosen while taking into account safety.

Specific examples of the solvent preferably include esters, for example, ethyl acetate, n-butyl acetate, isobutyl acetate, amyl formate, isoamyl acetate, butyl propionate, isopropyl butyrate, ethyl butyrate, butyl butyrate, methyl oxyacetate, ethyl oxyacetate, butyl oxyacetate, methyl methoxyacetate, ethyl methoxyacetate, butyl methoxyacetate, methyl ethoxyacetate, ethyl ethoxyacetate, methyl 3-oxypropoinate, ethyl 3-oxypropionate, methyl 3-methoxypropionate, ethyl 3-methoxypropionate, methyl 3-ethoxypropionate, ethyl 3-ethoxypropionate, methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, ethyl 2-oxobutanoate, and the like;

ethers, for example, diethylene glycol dimethyl ether, tetrahydrofuran, ethylene glycol monomethyl ether, ethylene glycol monoethyl ether, methyl cellosolve acetate (ethylene glycol monomethyl ether acetate), ethyl cellosolve acetate (ethylene glycol monoethyl ether acetate), diethylene glycol monomethyl ether, diethylene glycol monoethyl ether, diethylene glycol monobutyl ether, diethylene glycol monoethyl ether acetate, diethylene glycol monobutyl ether acetate, propylene glycol methyl ether, propylene glycol monomethyl ether acetate, propylene glycol ethyl ether acetate, propylene glycol propyl ether acetate, and the like; ketones, for example, methyl ethyl ketone, cyclohexanone, 2-heptanone, 3-heptanone, and the like; and aromatic hydrocarbons, for example, toluene, xylene, and the like.

Among these, methyl 3-ethoxypropionate, ethyl 3-ethoxypropionate, ethyl cellosolve acetate, ethyl lactate, diethylene glycol dimethyl ether, butyl acetate, methyl 3-methoxypropionate, 2-heptanone, cyclohexanone, diethylene glycol monoethyl ether acetate, diethylene glycol monobutyl ether acetate, propylene glycol methyl ether, propylene glycol monomethyl ether acetate (PGMEA), and the like are more preferable.

The content of the solvent (C) in the pigment dispersion of the present invention is preferably from 50 to 90% by mass, more preferably from 60 to 95% by mass, and most preferably from 70 to 90% by mass. When the content of the solvent is in the above-described range, generation of foreign materials is inhibited, which is thus advantageous.

(Other Components)

The pigment dispersion of the present invention may further contain other components according to the purposes such as the applications of the pigment dispersion and the like, in addition to the essential components (A) to (C) above, as long as the effect of the present invention is not impaired.

The pigment dispersion of the present invention preferably further contains a pigment derivative. Particularly, by incorporating a pigment derivative containing an acidic group, the dispersibility/dispersion stability is drastically improved.

As the pigment derivative, a structure in which a part of an organic pigment, an anthraquinone, or an acridone is substituted with an acidic group, a basic group, or a phthalimidemethyl group is preferable. Examples of the organic pigment constituting the pigment derivative include a diketopyrrolopyrrole-based pigment, azo-based pigments such as azo, disazo, polyazo, and the like, phthalocyanine-based pigments such as copper phthalocyanine, halogenated copper phthalocyanine, non-metal phthalocyanine, and the like, anthraquinone-based pigments such as aminoanthraquinone, diaminodianthraquinone, anthrapyrimidine, flavanthrone, anthanthrone, indanthrone, pyranthrone, violanthrone, and the like, quinacridone-based pigments, dioxazine-based pigments, perinone-based pigments, perylene-based pigments, thioindigo-based pigments, isoindoline-based pigments, isoindolinone-based pigments, quinophthalone-based pigments, threne-based pigments, metal complex-based pigments, and the like.

As the acidic group contained in the pigment derivative, sulfonic acid, carboxylic acid, and a quaternary ammonium salt thereof are preferable. Further, as the basic group contained in the pigment derivative, an amino group is preferable.

The amount of the pigment derivative to be used is not particularly limited, but is preferably from 5 to 50% by mass, and more preferably from 10 to 30% by mass, with respect to the pigment.

The pigment dispersion of the present invention preferably further contains a (G) graft copolymer which contains a monomer containing a heterocycle and a polymerizable oligomer having an ethylenically unsaturated bond as copolymer units (hereinafter, simply referred to as the graft copolymer (G)). Thereby, the dispersibility is further improved. As the monomer containing a heterocycle, the monomers represented by general formula (VI-1) and general formula (VI-2) are preferable.

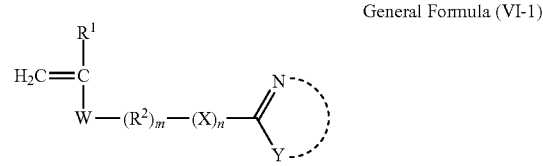

General Formula (VI-1)

In general formula (VI-1), $R^1$ represents a hydrogen atom, or a substituted or unsubstituted alkyl group. $R^2$ represents an alkylene group. W represents a —CO—, —C(=O)O—, —CONH—, —OC(=O)—, or phenylene group. X represents any one selected from —O—, —S—, —C(=O)O—, —CONH—, —C(=O)S—, —NHCONH—, —NHC(=O)O—, —NHC(=O)S—, —OC(=O)—, —OCONH—, —NHCO—. Y represents any one selected from $NR^3$, O, and S, and $R^3$ represents a hydrogen atom, an alkyl group, or an aryl group. In the formula (VI-1), N and Y are bonded to each other to form a cyclic structure. m and n are each independently 0 or 1.

In the formula (VI-1), $R^1$ represents a hydrogen atom, or a substituted or unsubstituted alkyl group. The alkyl group is preferably an alkyl group having 1 to 12 carbon atoms, more preferably an alkyl group having 1 to 8 carbon atoms, and particularly preferably an alkyl group having 1 to 4 carbon atoms. Examples of the preferable alkyl group include a methyl group, an ethyl group, a propyl group, an n-butyl group, an i-butyl group, a t-butyl group, an n-hexyl group, a cyclohexyl group, a 2-hydroxyethyl group, a 3-hydroxypropyl group, a 2-hydroxypropyl group, a 2-methoxyethyl group, and the like. $R^2$ represents an alkylene group, preferably an alkylene group having 1 to 12 carbon atoms, more preferably an alkylene group having 1 to 8 carbon atoms, and particularly preferably an alkylene group having 1 to 4 carbon atoms. Examples of the preferable alkylene group include a methylene group, an ethylene group, a propylene group, a trimethylene group, and a tetramethylene group. Y represents any one selected from $NR^3$, O, and S, and $R^3$ represents a hydrogen atom, an alkyl group, or an aryl group. Y is particularly preferably S or NH. X represents any one selected from —O—, —S—, —C(=O)O—, —CONH—, —C(=O)S—, —NHCONH—, —NHC(=O)O—, —NHC(=O)S—, —OC(=O)—, —OCONH—, and —NHCO—, and particularly preferably from —O—, —S—, —CONH—, —NHCONH—, and —NHC(=O)S—.

In the formula (VI-1), N and Y are bonded to each other to form a cyclic structure. Examples of the formed cyclic structure include a monocyclic structure such as an imidazole ring, a pyrimidine ring, a triazole ring, a tetrazole ring, a thiazole ring, and an oxazole ring, and a condensed ring structure such as a benzimidazole ring, a benzothiazole ring, a benzoxazole ring, a purine ring, a quinazoline ring or a perimidine ring, and the like, and in the present invention, a condensed ring structure is preferable. Among these, a benzimidazole ring, a benzothiazole ring, and a benzoxazole ring are particularly preferred.

In the pigment dispersant of the present invention, specific preferred examples of the monomer represented by general formula (VI-1) (M-1 to M-18) are shown below, but the present invention is not intended to be limited thereto.

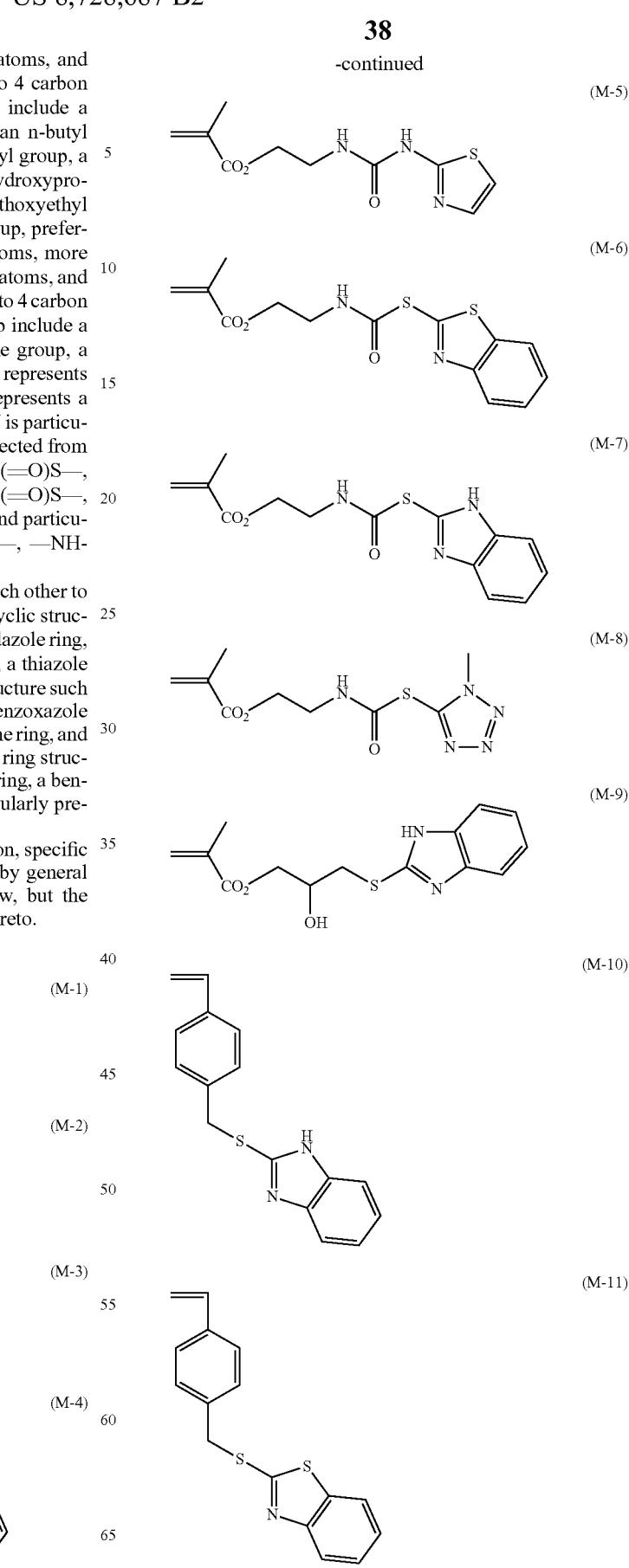

(M-12)

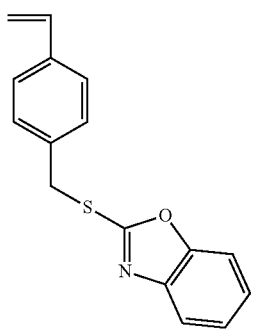

(M-13)

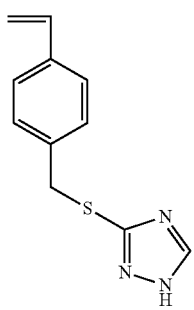

(M-14)

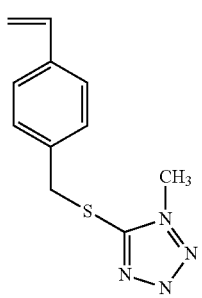

(M-15)

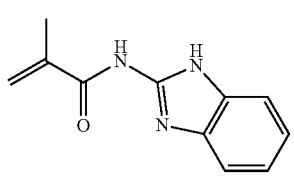

(M-16)

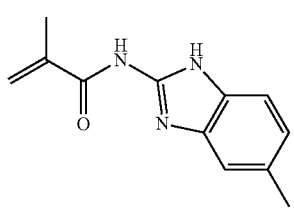

(M-17)

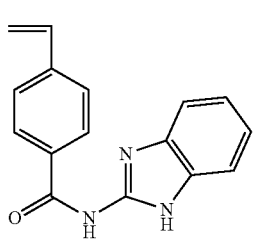

(M-18)

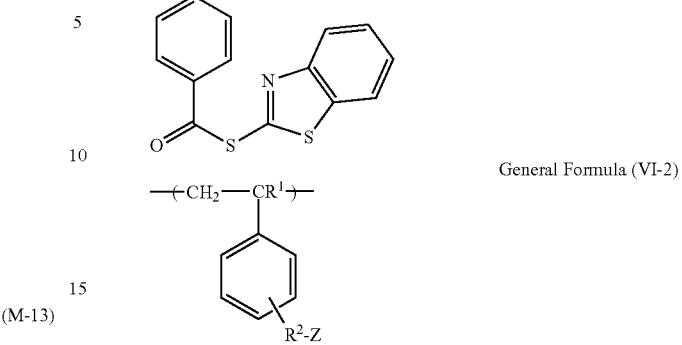

General Formula (VI-2)

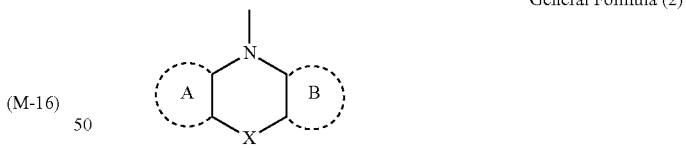

In general formula (VI-2), $R^1$ represents a hydrogen atom or a methyl group, $R^2$ represents an alkylene group, and Z represents a nitrogen-containing heterocyclic structure.

Examples of the alkylene group represented by $R^2$ include a methylene group, an ethylene group, a trimethylene group, a tetramethylene group, a hexamethylene group, a 2-hydroxypropylene group, a methyleneoxy group, an ethyleneoxy group, a methyleneoxycarbonyl group, a methylenethio group, and the like, and preferably a methylene group, a methyleneoxy group, a methyleneoxycarbonyl group and a methylenethio group.

In general formula (VI-2), Z represents a nitrogen-containing heterocyclic structure, and specific examples thereof include those having a pyridine ring, a pyrazine ring, a pyrimidine ring, a pyrrole ring, an imidazole ring, a triazole ring, a tetrazole ring, an indole ring, a quinoline ring, an acridine ring, a phenothiazine ring, a phenoxazine ring, an acridone ring, an anthraquinone ring, a benzimidazole structure, a benztriazole structure, a benzthiazole structure, a cyclic amide structure, a cyclic urea structure, and a cyclic imide structure.

Among these, a heterocyclic structure represented by Z is preferably a structure represented by the following formula (2) or (3).

General Formula (2)

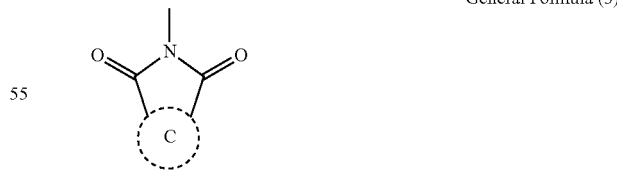

General Formula (3)

In general formula (2), X is any one selected from the group consisting of a single bond, an alkylene group (for example, a methylene group, an ethylene group, a propylene group, a trimethylene group, a tetramethylene group, and the like), —O—, —S—, —NR—, and —C(=O)—. In addition, here, R represents a hydrogen atom or an alkyl group, and if R represents an alkyl group, examples of the alkyl group include a methyl group, an ethyl group, an n-propyl group, an i-propyl group, an n-butyl group, a t-butyl group, an n-hexyl group, an n-octyl group, a 2-ethylhexyl group, an n-octadecyl group, and the like.

Among these, X is preferably a single bond, a methylene group, —O—, or —C(=O)—, and particularly preferably —C(=O)—.

In general formula (2) and general formula (3), Ring A, Ring B, and Ring C each independently represent an aromatic ring. Examples of the aromatic ring include a benzene ring, a naphthalene ring, an indene ring, an azulene ring, a fluorene ring, an anthracene ring, a pyridine ring, a pyrazine ring, a pyrimidine ring, a pyrrole ring, an imidazole ring, an indole ring, a quinoline ring, an acridine ring, a phenothiazine ring, a phenoxazine ring, an acridone ring, an anthraquinone ring, and the like. Among them, a benzene ring, a naphthalene ring, an anthracene ring, a pyridine ring, a phenoxazine ring, an acridine ring, a phenothiazine ring, a phenoxazine ring, an acridone ring, and an anthraquinone ring are preferred, and a benzene ring, a naphthalene ring, and a pyridine ring are particularly preferred.

Specific preferable examples of the structural unit represented by general formula (VI-2) include the followings, but the present invention is not intended to be limited thereto.

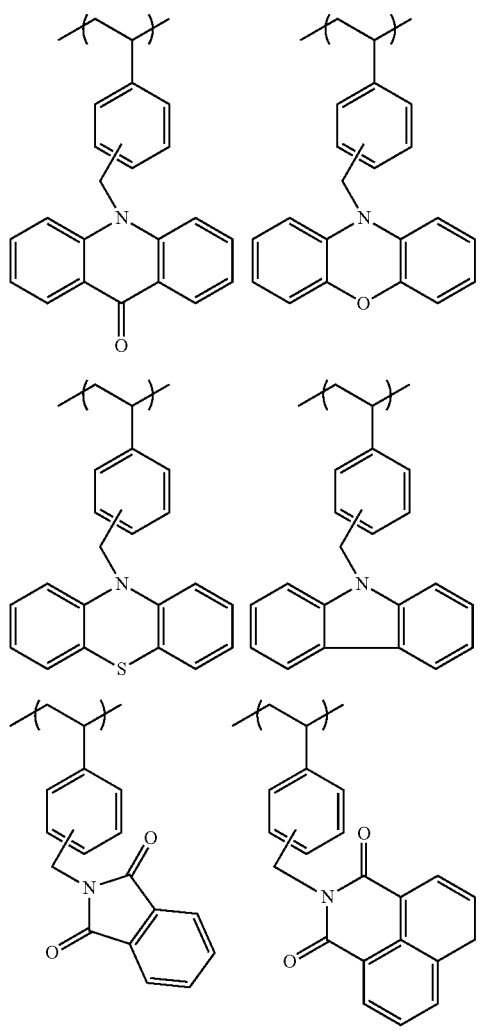

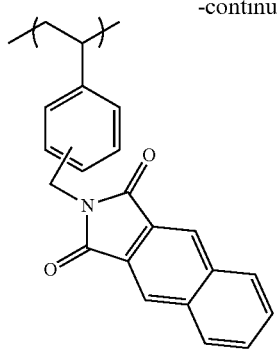

Preferred examples of the polymerizable oligomer(macromonomer) which can be used for synthesis of the graft copolymer (G) include polymethyl(meth)acrylate, poly-n-butyl(meth)acrylate, and poly-i-butyl(meth)acrylate, and a polymer in which a (meth)acryloyl group is bonded to one end of the molecule of polystyrene. Examples of such polymerizable oligomers that are commercially available include a polystyrene oligomer having a methacryloyl group at one end (Mn=6000, trade name: AS-6, manufactured by Toagosei Co., Ltd.), a polymethyl methacrylate oligomer having a methacryloyl group at one end (Mn=6000, trade name: AA-6, manufactured by Toagosei Co., Ltd.), and poly-n-butyl acrylate oligomer having a methacryloyl group at one end (Mn=6000, trade name: AB-6, manufactured by Toagosei Co., Ltd.).

The (G) graft copolymer preferably further contains a monomer (structural unit) containing an acid group as a copolymerization component.

Examples of the monomer having an acidic group include (meth)acrylic acid, p-vinyl benzoic acid, maleic acid, fumaric acid, itaconic acid, succinic anhydride adduct of 2-hydroxyethyl(meth)acrylate, phthalic anhydride adduct of 2-hydroxyethyl(meth)acrylate, and the like.

In the preferred embodiments of the graft copolymer (G), preferred is the copolymer containing the monomer represented by general formula (IV-1) or (IV-2) in an amount of 2 to 50% by mass, a polymerizable oligomer having an ethylenically unsaturated double bond at an end in an amount of 10 to 90% by mass, and a structural unit having an acid group in an amount of 1 to 30% by mass.

The pigment dispersion of the present invention can further contain other polymeric materials [for example, a polyamidoamine and a salt thereof, a polycarboxylic acid and a salt thereof, a high molecular weight unsaturated acid ester, a modified polyurethane, a modified polyester, a modified poly(meth)acrylate, a (meth)acrylic copolymer, and a naphthalenesulfonic acid-formalin condensate], and a dispersant such as a polyoxyethylene alkyl phosphoric acid ester, a polyoxyethylene alkylamine, an alkanolamine, and the like, from the viewpoint of improvement of dispersion stability, control of developability, and the like.

These other polymeric materials may be further classified, on the basis of the structure, into a linear polymer, a terminal modified polymer, a graft type polymer, and a block type polymer.

A polymeric material which can be used in combination functions to adsorb onto the surface of the pigment and prevent re-aggregation. Thus, a terminal modified polymer, a graft type polymer, and a block type polymer, having an anchor site to the pigment surface, may be mentioned as preferred structures. Specific examples of other polymeric material which can be used in the present invention include "Disperbyk-101 (polyamidoamine phosphate), 107 (carboxylic acid ester), 110 (copolymer containing an acid group), 130 (polyamide), 161, 162, 163, 164, 165, 166, 170 (high molecular weight copolymers), BYK-P104, P105 (high molecular weight unsaturated polycarboxylic acid)", manufactured by BYK Chemie Corp., "EFKA4047, 4050, 4010, 4165 (polyurethanes), EFKA 4330, 4340 (block copolymers), 4400, 4402 (modified polyacrylate), 5010 (polyester amide), 5765 (high molecular weight polycarboxylic acid salt), 6220 (fatty acid polyester), 6745 (phthalocyanine derivative), 6750 (azo pigment derivative)", manufactured by EFKA Additives, Inc., "Ajisper-PB821, PB822" manufactured by Ajinomoto Fine Techno Co., Inc., "Flowlen TG-710 (urethane oligomer)", "Polyflow No. 50E, No. 300 (acrylic copolymers)" manufactured by Kyoeisha Chemical Co., Ltd., "Disperon KS-860, 873SN, 874, #2150 (aliphatic polyvalent carboxylic acids), #7004 (polyether ester), DA-703-50, DA-705, DA-725" manufactured by Kusumoto Chemicals, Ltd., "Demol RN, N (naphthalenesulfonic acid-formalin polycondensates), MS, C, SN-B (aromatic sulfonic acid-formalin polycondensates)", "Homogenol L-18 (high molecular weight polycarboxylic acid)", "Emargen 920, 930, 935, 985 (polyoxyethylene nonylphenyl ether)", "Acetamine 86 (stearylamine acetate)" manufactured by Kao Corp., "Solsperse 5000 (phthalocyanine derivative), 22000 (azo pigment derivative), 13240 (polyesteramine), 3000, 17000, 27000 (polymer having a functional moiety at the end part), 24000, 28000, 32000, 38500 (graft type polymers)" manufactured by Lubrizol Corp., "Nikkol T106 (polyoxyethylene sorbitan monooleate), MYS-IEX (polyoxyethylene monostearate)" manufactured by Nikko Chemical Co., Ltd. (all are trade names), or polymeric compounds described in an alkali-soluble resin (F) below, and the like.

These polymeric materials may be used singly or in combination of two or more kinds thereof. In the case of using the polymeric material in combination, the content of the polymeric material in the present invention is preferably from 1% by mass to 100% by mass, more preferably from 3% by mass to 80% by mass, and further preferably from 5% by mass to 50% by mass, with respect to the specific resin of the present invention.

Since the pigment dispersion of the present invention uses the above-described specific resin of the present invention as a pigment dispersant, dispersibility and dispersion stability of the pigment are excellent even in the case of containing a fine pigment at a high concentration.

[Colored Curable Composition]

By further adding a photopolymerization initiator (D) and a compound containing an ethylenically unsaturated double bond (E) to the pigment dispersion of the present invention, a colored curable composition which is excellent in resolution/color characteristics/coating property/developability can be provided.

<Photopolymerization Initiator (D)>

The curable composition of the present invention contains a photopolymerization initiator (D) to improve sensitivity and pattern forming property. The photopolymerization initiator in the present invention is a compound which is decomposed by light to initiate and accelerate the polymerization of the polymerizable component of the present invention, and preferably absorbs light within a wavelength region from 300 to 500 nm. Further, the photopolymerization initiator can be used singly or in combination of two or more kinds thereof.

Examples of the photopolymerization initiator include an organic halogenated compound, an oxydiazole compound, a carbonyl compound, a ketal compound, a benzoin compound, an acridine compound, an organic peroxide compound, an azo compound, a coumarin compound, an azide compound, a metallocene compound, a hexaaryl biimidazole compound, an organic boric acid compound, a disulfonic acid compound, an oxime ester compound, an onium salt compound, an acyl phosphine (oxide) compound, an alkylamino compound, and the like.

Hereinafter, each of these compounds will be described in detail.

Specific examples of the organic halogenated compound include the compounds described in Wakabayashi, et al., "Bull Chem. Soc. Japan", Vol. 42, 2924 (1969), U.S. Pat. No. 3,905,815, Japanese Patent Application Publication No. 46-4605, Japanese Patent Application Laid-Open Nos. 48-36281, 55-32070, 60-239736, 61-169835, 61-169837, 62-58241, 62-212401, 63-70243, and 63-298339, and M. P. Hutt, "Journal of Heterocyclic Chemistry", 1 (No. 3), (1970), or the like, and particularly oxazole compounds and s-triazine compounds having a trihalomethyl group substituted thereon.

Suitable examples of the s-triazine compound include s-triazine derivatives in which at least one mono-, di- or trihalogen-substituted methyl group is bonded to an s-triazine ring. Specific examples thereof include 2,4,6-tris(monochloromethyl)-s-triazine, 2,4,6-tris(dichloromethyl)-s-triazine, 2,4,6-tris(trichloromethyl)-s-triazine, 2-methyl-4,6-bis(trichloromethyl)-s-triazine, 2-n-propyl-4,6-bis(trichloromethyl)-s-triazine, 2-(α,α,β-trichloroethyl)-4,6-bis(trichloromethyl)-s-triazine, 2-phenyl-4,6-bis(trichloromethyl)-s-triazine, 2-(p-methoxy phenyl)-4,6-bis(trichloromethyl)-s-triazine, 2-(3,4-epoxy phenyl)-4,6-bis(trichloromethyl)-s-triazine, 2-(p-chlorophenyl)-4,6-bis(trichloromethyl)-s-triazine, 2-[1-(p-methoxy phenyl)-2,4-butadienyl]-4,6-bis(trichloromethyl)-s-triazine, 2-styryl 4,6-bis(trichloromethyl)-s-triazine, 2-(p-methoxystyryl)-4,6-bis(trichloromethyl)-s-triazine, 2-(p-1-propyloxystyryl)-4,6-bis(trichloromethyl)-s-triazine, 2-(p-tolyl)-4,6-bis(trichloromethyl)-s-triazine, 2-(4-nathoxynaphtyl)-4,6-bis(trichloromethyl)-s-triazine, 2-phenylthio-4,6-bis(trichloromethyl)-s-triazine, 2-benzylthio-4,6-bis(trichloromethyl)-s-triazine, 2,4,6-tris(dibromomethyl)-s-triazine, 2,4,6-tris(tribromo methyl)-s-triazine, 2-methyl-4,6-bis(tribromo methyl)-s-triazine, 2-methoxy-4,6-bis(tribromo methyl)-s-triazine, and the like.

Examples of the oxodiazole compound include 2-trichloromethyl-5-styryl-1,3,4-oxodiazole, 2-trichloromethyl-5-(cyanostyryl)-1,3,4-oxodiazole, 2-trichloromethyl-5-(naphth-1-yl)-1,3,4-oxodiazole, 2-trichloromethyl-5-(4-styryl)styryl-1,3,4-oxodiazole, and the like.

Examples of the carbonyl compound include benzophenone derivatives such as benzophenone, Michler's ketone, 2-methylbenzophenone, 3-methylbenzophenone, 4-methylbenzophenone, 2-chlorobenzophenone, 4-bromobenzophenone, 2-carboxybenzophenone, and the like; acetophenone derivatives such as 2,2-dimethoxy-2-phenylacetophenone, 2,2-diethoxyacetophenone, 1-hydroxycyclohexylphenyl ketone, α-hydroxy-2-methylphenylpropanone, 1-hydroxy-1-methylethyl-(p-isopropylphenyl) ketone, 1-hydroxy-1-(p-dodecylphenyl)ketone, 2-methyl-(4'-(methylthio)phenyl)-2-morpholino-1-propanone, 1,1,1-trichloromethyl-(p-butylphenyl)ketone, 2-benzyl-2-dimethylamino-4-morpholinobutyrophenone, and the like; thioxanthone derivatives such as thioxanthone, 2-ethylthioxanthone, 2-isopropylthioxanthone, 2-chlorothioxanthone, 2,4-dimethylthioxanthone, 2,4-diethylthioxanthone, 2,4-diisopropylthioxanthone, and the like; benzoic ester derivatives such as ethyl p-dimethylaminobenzoate, ethyl p-diethylaminobenzoate, and the like; etc.

Examples of the ketal compound include benzyl methyl ketal, benzyl-β-methoxyethyl ethyl acetal, and the like.

Examples of the benzoin compound include m-benzoin isopropyl ether, benzoin isobutyl ether, benzoin methyl ether, methyl o-benzoyl benzoate, and the like.

Examples of the acridine compound include 9-phenylacridine, 1,7-bis(9-acridinyl)heptanes, and the like.

Examples of the organic peroxide compound include trimethylcyclohexanone peroxide, acetylacetone peroxide, 1,1-bis(tert-butylperoxy)-3,3,5-trimethylcyclohexane, 1,1-bis(tert-butylperoxy)cyclohexane, 2,2-bis(tert-butylperoxy) butane, tert-butyl hydroperoxide, cumene hydroperoxide, diisopropylbenzene hydroperoxide, 2,5-dimethylhexane-2,5-dihydroperoxide, 1,1,3,3-tetramethylbutyl hydroperoxide, tert-butylcumyl peroxide, dicumyl peroxide, 2,5-dimethyl-2,5-di(tert-butylperoxy)hexane, 2,5-oxanoyl peroxide, succinic acid peroxide, benzoyl peroxide, 2,4-dichlorobenzoyl peroxide, diisopropylperoxy dicarbonate, di-2-ethylhexylperoxy dicarbonate, di-2-ethoxyethylperoxy dicarbonate, dimethoxyisopropylperoxy carbonate, di(3-methyl-3-methoxybutyl)peroxy dicarbonate, tert-butylperoxy acetate, tert-butylperoxy pivalate, tert-butylperoxy neodecanoate, tert-butylperoxy octanoate, tert-butylperoxy laurate, tersyl carbonate, 3,3',4,4'-tetra(t-butylperoxycarbonyl)benzophenone, 3,3',4,4'-tetra(t-hexylperoxycarbonyl)benzophenone, 3,3',4,4'-tetra(p-isopropylcumylperoxycarbonyl)benzophenone, carbonyl di(t-butylperoxydihydrogendiphthalate), carbonyl di(t-hexylperoxydihydrogendiphthalate), and the like.

Examples of the azo compound include azo compounds described in Japanese Patent Application Laid-Open No. 8-108621, and the like.

Examples of the coumarin compound include 3-methyl-5-amino((s-triazin-2-yl)amino)-3-phenylcoumarin, 3-chloro-5-diethylamino((s-triazin-2-yl)amino)-3-phenylcoumarin, 3-butyl-5-dimethylamino((s-triazin-2-yl)amino)-3-phenylcoumarin, and the like.

Examples of the azide compound include organic azide compounds described in U.S. Pat. Nos. 2,848,328, 2,852,379, and 2,940,853, 2,6-bis(4-azidobenzylidene)-4-ethylcyclohexanone (BAC-E), and the like.

Examples of the metallocene compound include various titanocene compounds described in Japanese Patent Application Laid-Open Nos. 59-152396, 61-151197, 63-41484, 2-249, 2-4705, and 5-83588, for example, dicyclopentadienyl-Ti-bisphenyl, dicyclopentadienyl-Ti-bis-2,6-difluorophen-1-yl, dicyclopentadienyl-Ti-bis-2,4-difluorophen-1-yl, dicyclopentadienyl-Ti-bis-2,4,6-trifluorophen-1-yl, dicyclopentadienyl-Ti-bis-2,3,5,6-tetrafluorophen-1-yl, dicyclopentadienyl-Ti-bis-2,3,4,5,6-pentafluorophen-1-yl, dimethylcyclopentadienyl-Ti-bis-2,6-difluorophen-1-yl, dimethylcyclopentadienyl-Ti-bis-2,4,6-trifluorophen-1-yl, dimethylcyclopentadienyl-Ti-bis-2,3,5,6-terafluorophen-1-yl, and dimethylcyclopentadienyl-Ti-bis-2,3,4,5,6-pentafluorophen-1-yl, iron-arene complexes described in Japanese Patent Application Laid-Open Nos. 1-304453 and 1-152109, and the like.

Examples of the hexaaryl biimidazole compound include various compounds described in Japanese Patent Application Publication No. 6-29285 and U.S. Pat. Nos. 3,479,185, 4,311,783, and 4,622,286, and specific examples thereof include 2,2'-bis(o-chlorophenyl)-4,4',5,5'-tetraphenyl biimidazole, 2,2'-bis(o-bromophenyl)-4,4',5,5'-tetraphenyl biimidazole, 2,2'-bis(o,p-dichlorophenyl)-4,4',5,5'-tetraphenyl biimidazole, 2,2'-bis(o-chlorophenyl)-4,4',5,5'-tetra(m-methoxyphenyl)biimidazole, 2,2'-bis(o,o'-dichlorophenyl)-4,4',5,5'-tetraphenyl biimidazole, 2,2'-bis(o-nitrophenyl)-4,4',5,5'-tetraphenyl biimidazole, 2,2'-bis(o-methylphenyl)-4,4',5,5'-tetraphenyl biimidazole, 2,2'-bis(o-trifluorophenyl)-4,4',5,5'-tetraphenyl biimidazole, and the like.

Specific examples of the organic borate compound include organic borates described in Japanese Patent Application Laid-Open Nos. 62-143044, 62-150242, 9-188685, 9-188686, 9-188710, 2000-131837, and 2002-107916, Japanese Patent No. 2764769, Japanese Patent Application No. 2000-310808, and Kunz and Martin, "Rad Tech '98. Proceeding Apr. 19-22, 1998, Chicago", and the like, organoboron sulfonium complexes or organoboron oxosulfonium complexes described in Japanese Patent Application Laid-Open Nos. 6-157623, 6-175564, and 6-175561, organoboron iodonium complexes described in Japanese Patent Application Laid-Open Nos. 6-175554 and 6-175553; organoboron phosphonium complexes described in Japanese Patent Application Laid-Open No. 9-188710; and organoboron transition metal coordination complexes described in Japanese Patent Application Laid-Open Nos. 6-348011, 7-128785, 7-140589, 7-306527, 7-292014, etc., and the like.

Examples of the disulfone compound include compounds described in Japanese Patent Application Laid-Open No. 61-166544, Japanese Patent Application No. 2001-132318, etc., and the like.

Examples of the oxime ester compound include compounds described in J. C. S. Perkin II (1979) 1653-1660, J. C. S. Perkin II (1979) 156-162, Journal of Photopolymer Science and Technology (1995) 202-232, Japanese Patent Application Laid-Open Nos. 2000-66385 and 2000-80068, and JP-A No. 2004-534797, and the like.

Among the oxime-based initiators such as the oxime ester compounds, a compound represented by the following general formula (3) is more preferable in consideration of exposure sensitivity, stability over time, and coloring at the time of post-heating.

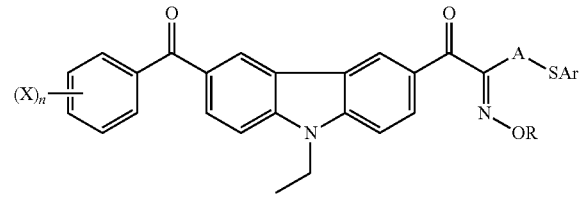

General Formula (3)

In general formula (3), R and X each independently represent a monovalent substituent, A represents a divalent organic group, and Ar represents an aryl group. n is an integer of 0 to 5.

R is preferably an acyl group from the viewpoint of giving high sensitivity, and specifically an acetyl group, a propionyl group, a benzoyl group, and a toluoyl group are preferred.

A is preferably an unsubstituted alkylene group, an alkylene group substituted with an alkyl group (for example, a methyl group, an ethyl group, a tert-butyl group, and a dodecyl group), an alkylene group substituted with an alkenyl group (for example, a vinyl group and an allyl group), an alkylene group substituted with an aryl group (for example, a phenyl group, a p-tolyl group, a xylyl group, a cumenyl group, a naphthyl group, an anthryl group, a phenanthryl group, and a styryl group) from the viewpoint of increasing the sensitivity and inhibiting the coloration over time when heated.

Ar is preferably a substituted or unsubstituted phenyl group from the viewpoint of increasing the sensitivity and inhibiting the coloration over time when heated. In the case of the substituted phenyl group, as the substituent, for example, a halogen group such as a fluorine atom, a chlorine atom, a bromine atom, an iodine atom, and the like is preferred.

As X, an alkyl group which may have a substituent, an aryl group which may have a substituent, an alkenyl group which may have a substituent, an alkynyl group which may have a substituent, an alkoxy group which may have a substituent, an aryloxy group which may have a substituent, an alkylthioxy group which may have a substituent, an arylthioxy group which may have a substituent, and an amino group which may have a substituent are preferred from the viewpoint of improvement of the solubility in a solvent and the absorption efficiency at a long wavelength region.

Further, n in general formula (3) is preferably an integer of 1 to 2.

As the compound represented by general formula (3), the compounds represented by general formula (a) are specifically described in Paragraph Nos. [0089] to [0108] of the specification of Japanese Patent Application No. 2008-251321 filed by the Applicant, and the compound as described therein can also be suitably used in the present invention.

Examples of the onium salt compound include the diazonium salts described in S. I. Schlesinger, Photogr. Sci. Eng., 18, 387 (1974) and T. S. Bal et al., Polymer, 21, 423 (1980), the ammonium salts described in U.S. Pat. No. 4,069,055, Japanese Patent Application Laid-Open No. 4-365049, and the like, the phosphonium salts described in U.S. Pat. Nos. 4,069,055 and 4,069,056, the iodonium salts described in European Patent No. 104,143, U.S. Pat. Nos. 339,049 and 410,201, and Japanese Patent Application Laid-Open Nos. 2-150848 and 2-296514, and the like.

An iodonium salt which can be suitably used in the present invention is a diaryliodonium salt, and from the viewpoint of stability, a diaryliodonium salt substituted with two or more electron-donating groups such as an alkyl group, an alkoxy group, an aryloxy group, and the like is preferred. As another preferred form of the sulfonium salt, an iodonium salt in which one of the substituents of a triarylsulfonium salt has a coumarin or anthraquinone structure, and which has absorption at 300 nm or more, and the like are preferred.

Examples of the sulfonium salt which can be suitably used in the present invention include sulfonium salts described in European Patents Nos. 370,693, 390, 214, 233, 567, 297,443, and 297,442, U.S. Pat. Nos. 4,933,377, 161,811, 410,201, 339,049, 4,760,013, 4,734,444, and 2,833,827, and German Patents Nos. 2,904,626, 3,604,580, and 3,604,581. From the viewpoint of stability and sensitivity, those substituted with an electron withdrawing group are preferable. It is preferable that a Hammett's value of the electron withdrawing group is more than 0. Examples of the preferable electron withdrawing group include a halogen atom, a carboxyl group, and the like.

Furthermore, examples of other preferable sulfonium salts include a sulfonium salt in which one of the substituents of a triarylsulfonium salt has a coumarin or anthraquinone structure, and which has absorption at 300 nm or more. Examples of still other preferable sulfonium salts include a sulfonium salt in which a triarylsulfonium salt is substituted with an aryloxy group or an arylthio group, and which has absorption at 300 nm or more.

Furthermore, examples of the onium salt compound include selenonium salts described in J. V. Crivello, et al., Macromolecules, 10 (6), 1307 (1977) and J. V. Crivello, et al., J. Polymer Sci., Polymer Chem. Ed., 17, 1047 (1979), arsonium salts described in C. S. Wen, et al., Teh. Proc. Conf. Rad. Curing ASIA, p. 478, Tokyo, October (1988).

Examples of the acyl phosphine (oxide) compound include IRGACURE 819, DAROCURE 4265, DAROCURE TPO, and the like, all of which are available from Ciba Specialty Chemicals, and the like.

Examples of the alkylamino compound include the compounds having a dialkylaminophenyl group or the alkylamine compounds described in Paragraph number of Japanese Patent Application Laid-Open No. 9-281698, in Japanese Patent Application Laid-Open Nos. 6-19240 and 6-19249, and the like. Specific examples thereof include the compounds having a dialkylaminophenyl group such as ethyl p-dimethylaminobenzoate and the like, and dialkylaminophenyl carbaldehyde such as p-diethylaminobenzcarbaldehyde, 9-julolidylcarbaldehyde, and the like, and examples of the alkylamine compounds include triethanolamine, diethanolamine, triethylamine, and the like.

From the viewpoint of the exposure sensitivity, the photopolymerization initiator (D) which is used in the present invention is preferably a compound selected from the group consisting of a triazine-based compound, an alkyl amino compound, a benzyl dimethyl ketal compound, an α-hydroxy ketone compound, an α-amino ketone compound, an acyl phosphine-based compound, a phosphine oxide-based compound, a metallocene compound, an oxime-based compound, a biimidazol-based compound, an onium-based compound, a benzothiazol-based compound, a benzophenone-based compound, an acetophenone-based compound and a derivative thereof, a cyclopentadiene-benzene-iron complex and a salt thereof, a halomethyl oxadiazole compound, and a 3-aryl substituted coumarin compound.

It is more preferably a triazine-based compound, an alkyl amino compound, an α-amino ketone compound, an acyl phosphine-based compound, a phosphine oxide-based compound, an oxime-based compound, a biimidazol-based compound, an onium-based compound, a benzophenone-based compound, or an acetophenone-based compound, further preferably at least one kind of the compounds selected from the group consisting of a triazine-based compound, an alkyl amino compound, an oxime based-compound, and a biimidazol-based compound, and most preferably an oxime based-compound and a biimidazol-based compound.

Particularly, in the case where the curable composition of the present invention is used to form a colored pixel in a color filter of a solid-state image pick-up device, the pigment concentration in the curable composition is increased in the formulation, and as a result, the addition amount of the initiator decreases, and the sensitivity is lowered. Further, when exposure is carried out using a stepper, the use of an initiator, such as a triazine-based compound, which generates a halogen-containing compound upon exposure causes corrosion of an equipment, and thus is difficult. Taking these into consideration, the photopolymerization initiator which satisfies sensitivity and various performances is preferably an oxime-based compound, and particularly most preferably an oxime-based compound having absorption at 365 nm.

The content of the photopolymerization initiator (D) is preferably from 0.1% by mass to 50% by mass, more preferably from 0.5% by mass to 30% by mass, and particularly preferably 1% by mass to 20% by mass, with respect to the total solid content of the curable composition of the present invention. Within this range, good sensitivity and pattern forming property can be obtained.

<Compound Containing Ethylenically Unsaturated Double Bond (E)>

The curable composition of the present invention may contain a compound containing an ethylenically unsaturated double bond other than the above-described resin (which may be hereinafter referred to simply as a "compound containing an ethylenically unsaturated double bond" in some cases).

The compound containing an ethylenically unsaturated double bond which can be used in the present invention is selected from addition-polymerizable compounds, other than the above-described resin, which have at least one ethylenically unsaturated double bond, wherein the compounds have at least one, preferably two or more terminal ethylenically unsaturated bonds. Such a compound group is widely known in this industrial field, and thus it can be used without any limitation. They have a chemical form such as a monomer, a prepolymer, that is, a dimer, a trimer or an oligomer, a mixture thereof, and a copolymer thereof. Examples of the monomer and the copolymer thereof include unsaturated carboxylic acids (for example, acrylic acid, methacrylic acid, itaconic acid, crotonic acid, isocrotonic acid, maleic acid, and the like), esters thereof, and amides thereof, and preferably, esters of an unsaturated carboxylic acid and an aliphatic polyhydric alcohol compound, and amides of an unsaturated carboxylic acid and an aliphatic polyvalent amine compound are used. Further, an addition reaction product of unsaturated carboxylic acid esters or amides having a nucleophilic substituent such as a hydroxyl group, an amino group, a mercapto group, and the like, and monofunctional or polyfunctional isocyanates or epoxy compounds, or dehydration condensation reaction products with a monofunctional or polyfunctional carboxylic acid, and the like are also suitably used. Moreover, addition reaction products of unsaturated carboxylic acid esters or amides having an electrophilic substituent such as an isocyanate group, an epoxy group, and the like, and monofunctional or polyfunctional alcohols, amines or thiols, and furthermore, substitution reaction products of unsaturated carboxylic acid esters or amides having an eliminating substituent such as a halogen group, a tosyloxy group, and the like, and monofunctional or polyfunctional alcohols, amines or thiols are also preferable. In addition, as another example, a compound group wherein the above-described unsaturated carboxylic acids are replaced by an unsaturated phosphonic acid, styrene, vinyl ether, or the like can also be used.

Specific examples of the monomer of an ester of an aliphatic polyhydric alcohol compound and an unsaturated carboxylic acid include acrylic acid esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyl oxy propyl) ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, polyester acrylate oligomer, isocyanuric acid EO-modified triacrylate, and the like.

Example of the methacrylic acid ester include tetramethyleneglycol dimethacrylate, triethylene glycol dimethacrylate, neopentylglycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, bis-[p-(methacryloxyethoxy)phenyl]dimethylmethane, and the like.

Example of the itaconic acid ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate. There are crotonic acid esters such as ethylene glycol dicrotonate, tetramethylene glycol dicrotonate, pentaerythritol dicrotonate, and sorbitol tetradicrotonate. There are isocrotonic acid esters such as ethylene glycol diisocrotonate, pentaerythritol diisocrotonate, and sorbitol tetraisocrotonate. There are maleic acid esters such as ethylene glycol dimaleate, triethylene glycol dimaleate, pentaerythritol dimaleate, sorbitol tetramaleate, and the like.

As an example of other esters, for example, aliphatic alcohol-based esters described in Japanese Patent Application Publication No. 51-47334 and Japanese Patent Application Laid-Open No. 57-196231, esters having an aromatic skeleton described in Japanese Patent Application Laid-Open No. 59-5240, Japanese Patent Application Laid-Open No. 59-5241, and Japanese Patent Application Laid-Open No. 2-226149, esters containing an amino group described in Japanese Patent Application Laid-Open No. 1-165613, and the like are also suitably used. In addition, the afore-mentioned ester monomers can also be used as a mixture.

Furthermore, a monomer containing an acid group can also be used, and examples thereof include (meth)acrylic acid, pentaerythritol triacrylate succinic acid monoester, dipentaerythritol pentaacrylate succinic acid monoester, pentaerythritol triacrylate maleic acid monoester, dipentaerythritol pentaacrylate maleic acid monoester, pentaerythritol triacrylate phthalic acid monoester, dipentaerythritol pentaacrylate phthalic acid monoester, pentaerythritol triacrylate tetrahydrophthalic acid monoester, dipentaerythritol pentaacrylate tetrahydrophthalic acid monoester, and the like. Among these, pentaerythritol triacrylate succinic acid monoester and the like may be mentioned.

In addition, specific examples of the monomer of amide of an aliphatic poly amine compound and an unsaturated carboxylic acid include methylene bis-acrylamide, methylene bis-methacrylamide, 1,6-hexamethylene bis-acrylamide, 1,6-hexamethylene bis-methacrylamide, diethylenetriamine trisacrylamide, xylylene bisacrylamide, xylylene bis-methacrylamide, and the like. Examples of other preferable amide-based monomers include monomers having a cyclohexylene structure described in Japanese Patent Application Publication No. 54-21726.

Moreover, an urethane-based addition-polymerizable compound produced using the addition reaction of an isocyanate and a hydroxyl group is also suitable. Specific examples thereof include the vinyl urethane compounds containing two or more polymerizable vinyl groups in a molecule, which are obtained by adding a vinyl monomer containing a hydroxyl group represented by the following general formula to a polyisocyanate compound having two or more isocyanate groups in a molecule, as described in Japanese Patent Application Publication No. 48-41708, and the like.

$$CH_2=C(R^{10})COOCH_2CH(R^{11})OH \qquad \text{General Formula}$$

(wherein $R^{10}$ and $R^{11}$ represent H or $CH_3$)

In addition, urethane acrylates as described in Japanese Patent Application Laid-Open No. 51-37193, Japanese Patent Application Publication No. 2-32293, and Japanese Patent Application Publication No. 2-16765, and urethane compounds having an ethylene oxide-based skeleton described in Japanese Patent Application Publication No. 58-49860, Japanese Patent Application Publication No. 56-17654, Japanese Patent Application Publication No. 62-39417, and Japanese Patent Application Publication No. 62-39418 are also suitable. Furthermore, by using addition-polymerizable compounds having an amino structure or a sulfide structure in a molecule, described in Japanese Patent Application Laid-Open No. 63-277653, Japanese Patent Application Laid-Open No. 63-260909, and Japanese Patent Application Laid-Open No. 1-105238, a photopolymerizable composition which is very excellent in a photosensitive speed can be obtained.

Other examples include polyfunctional acrylates and methacrylates such as polyester acrylates, epoxy acrylates obtained by reaction of an epoxy resin and (meth)acrylic acid, and the like, as described in Japanese Patent Application Laid-Open No. 48-64183, Japanese Patent Application Publication No. 49-43191, and Japanese Patent Application Publication No. 52-30490. In addition, examples include specified unsaturated compounds described in Japanese Patent Application Publication No. 46-43946, Japanese Patent Application Publication No. 1-40337, and Japanese Patent Application Publication No. 1-40336, vinylphosphonic acid-based compounds described in Japanese Patent Application Laid-Open No. 2-25493, and the like. Further, in some cases, a structure containing a perfluoroalkyl group described in Japanese Patent Application Laid-Open No. 61-22048 is preferably used. Furthermore, those which are introduced as a photocurable monomer and oligomer in Journal of Adhesion Society of Japan, vol. 20, No. 7, pages 300 to 308 (1984) can also be used.

Details of the structure, use alone or in combination, the addition amount, or the like of these addition-polymerizable compounds may be optionally set according to the performance design of the curable composition. For example, they may be selected from the following viewpoints.

In terms of the sensitivity, a structure with a large amount of the unsaturated group content per molecule is preferable. In many cases, those of bifunctional or more are preferable. Moreover, for improving the strength of the image part, that is, the cured film, those of trifunctional or more are preferable. Furthermore, the method of adjusting both the sensitivity and the strength by using in combination those of different number of functional groups and different polymerizable groups (for example, an acrylic acid ester, a methacrylic acid ester, a styrene-based compound, and a vinyl ether-based compound) is also effective. From the viewpoint of the curing sensitivity, it is preferable to use a compound containing two or more (meth)acrylic acid ester structures, it is more preferable to use a compound containing three or more of them, and it is most preferable to use a compound containing four or more of them. Moreover, from the viewpoint of the curing sensitivity and the developability of the unexposed part, it is preferable to contain an EO-modified product. Moreover, from the viewpoint of the curing sensitivity and the exposed part strength, it is preferable to contain an urethane bond.

Furthermore, also with respect to the compatibility and dispersion property with the other components (for example, a resin, a photopolymerization initiator, and a pigment) in the curable composition, the selection and usage of the addition polymerizable compound is an important factor. For example, use of a low purity compound or use of two or more kinds in combination may improve the compatibility. Moreover, for the purpose of improvement of the adhesion property with the substrate, or the like, a specific structure may be selected.

From the above-described viewpoints, bisphenol A diacrylate, bisphenol A diacrylate EO-modified product, trimethylol propane triacrylate, trimethylol propane tri(acryloyloxy propyl)ether, trimethylol ethane triacrylate, tetraethylene glycol diacrylate, pentaerythritol diacrylate, pentaerythritol triacrylate, pentaerythritol tetraacrylate, dipentaerythritol tetraacrylate, dipentaerythritol pentaacrylate, dipentaerythritol hexaacrylate, sorbitol triacrylate, sorbitol tetraacrylate, sorbitol pentaacrylate, sorbitol hexaacrylate, tri(acryloyloxyethyl) isocyanurate, pentaerythritol tetraacrylate EO-modified product, dipentaerythritol hexaacrylate EO-modified product, or the like may be presented as preferable examples. Moreover, as to the commercially available products, urethane oligomer UAS-10, UAB-140 (manufactured by Sanyo Kokusaku Pulp Corp.), DPHA-40H (manufactured by Nippon Kayaku Co., Ltd.), UA-306H, UA-306T, UA-306I, AH-600, T-600, AI-600 (manufactured by Kyoeisha Chemical Co., Ltd.), and UA-7200 (manufactured by Shin-Nakamura Chemical. Co., Ltd.) are preferable.

Among these, EO-modified bisphenol A diacrylate, pentaerythritol triacrylate, pentaerythritol tetraacrylate, dipentaerythritol pentaacrylate, dipentaerythritol hexaacrylate, tri (acryloyloxyethyl)isocyanurate, EO-modified pentaerythritol tetraacrylate, EO-modified dipentaerythritol hexaacrylate, and the like, and also as a commercially available product, DPHA-40H (manufactured by Nippon Kayaku Co., Ltd.), UA-306H, UA-306T, UA-306I, AH-600, 1-600, and AI-600 (manufactured by Kyoeisha Chemical Co., LTd.) are more preferable.

The content of the compound containing the ethylenically unsaturated double bond (E) in the present invention is preferably from 1% by mass to 90% by mass, more preferably from 5% by mass to 80% by mass, and further preferably from 10% by mass to 70% by mass, in the solid content of the curable composition of the present invention.

In particular, in the case of using the curable composition of the present invention for formation of a colored pattern of a color filter, the content of the compound containing the ethylenically unsaturated double bond (E) is preferably from 5% by mass to 50% by mass, more preferably from 7% by mass to 40% by mass, and further preferably from 10% by mass to 35% by mass in the above-described range.

The colored curable composition of the present invention preferably contains an alkali-soluble resin (F). By incorporating the alkali-soluble resin, the developability/pattern forming property is improved.

<Alkali-Soluble Resin (F)>

The alkali-soluble resin which can be used in the present invention may be a linear organic polymeric polymer which may be suitably selected from alkali-soluble resins having at least one group for promoting alkali solubility (for example, a carboxyl group, a phosphoric acid group, a sulfonic acid group, a hydroxyl group, and the like) in a molecule (preferably, a molecule having an acryl-based copolymer or a styrene-based copolymer as a main chain).

Examples of the more preferable alkali-soluble resin include polymers having a carboxylic acid in the side chain thereof, such as acryl-based copolymers including a methacrylic acid copolymer, an acrylic acid copolymer, an itaconic acid copolymer, a crotonic acid copolymer, a maleic acid copolymer, a partially esterified maleic acid copolymer, and the like as those described in Japanese Patent Application Laid-Open No. 59-44615, Japanese Patent Application Publication No. 54-34327, 58-12577 or 54-25957, Japanese Patent Application Laid-Open No. 59-53836, or 59-71048, acidic cellulose derivatives having carboxylic acid on the side chain thereof, products obtained by adding an acid anhydride to a polymer having a hydroxyl group, and the like.

The acid value is preferably in a range of 20 to 200 mg KOH/g, preferably 30 to 150 mg KOH/g, and more preferably 35 to 120 mg KOH/g.

As a specific constituting unit of the alkali-soluble resin, a copolymer of a (meth)acrylic acid and another monomer which is copolymerizable therewith is particularly preferable. Examples of the monomer which is copolymerizable with (meth)acrylic acid include, alkyl(meth)acrylate, aryl(meth)acrylate, a vinyl compound, and the like. Here, a hydrogen atom of the alkyl group and the aryl group may be substituted with a substituent.

Examples of the alkyl(meth)acrylate and the aryl(meth)acrylate include $CH_2=C(R^1)(COOR^3)$ [wherein $R^1$ represents a hydrogen atom or an alkyl group having 1 to 5 carbon atoms, $R^2$ represents an aromatic hydrocarbon ring having 6 to 10 carbon atoms, and $R^3$ represents an alkyl group having 1 to 8 carbon atoms or an aralkyl group having 6 to 12 carbon atoms], and specifically methyl(meth)acrylate, ethyl(meth)acrylate, propyl(meth)acrylate, butyl(meth)acrylate, isobutyl(meth)acrylate, pentyl(meth)acrylate, hexyl(meth)acrylate, octyl(meth)acrylate, phenyl(meth)acrylate, benzyl(meth)acrylate, tolyl(meth)acrylate, naphthyl(meth)acrylate, cyclohexyl(meth)acrylate, hydroxyalkyl(meth)acrylate (alkyl is an alkyl group having 1 to 8 carbon atoms), hydroxyglycidyl methacrylate, tetrahydro furfuryl methacrylate, and the like.

A resin having a polyalkylene oxide chain in the side chain of a molecule is also preferred. Examples of the polyalkylene oxide chain includes a polyethylene oxide chain, a polypropylene oxide chain, a polytetramethylene glycol chain, or a combination thereof, and its terminal is a hydrogen atom or a linear or branched alkyl group.

The number of the repeating unit of the polyethylene oxide chain and the polypropylene oxide chain is preferably from 1 to 20, and more preferably from 2 to 12. Examples of the acryl-based copolymer having a polyalkylene oxide chain in the side chain include acryl-based copolymers having 2-hydroxyethyl(meth)acrylate, hydroxypropyl(meth)acrylate, polyethylene glycol mono(meth)acrylate, polypropylene glycol mono(meth)acrylate, poly(ethylene glycol-propylene glycol)mono(meth)acrylate, and the like, and compounds having the terminal OH group blocked with alkyl, for example, methoxy polyethylene glycol mono(meth)acrylate, ethoxy polypropylene glycol mono(meth)acrylate, methoxy poly(ethylene glycol-propylene glycol)mono(meth)acrylate, and the like as a copolymerization component.

Further, examples of the vinyl compound include $CH_2=CR^1R^2$ [wherein $R^1$ represents a hydrogen atom or an alkyl group having 1 to 5 carbon atoms, $R^2$ represents an aromatic hydrocarbon ring having 6 to 10 carbon atoms, and $R^3$ represents an alkyl group having 1 to 8 carbon atoms or an aralkyl group having 6 to 12 carbon atoms], and specifically styrene, α-methyl styrene, vinyl toluene, acrylonitrile, vinyl acetate, N-vinyl pyrrolidone, polystyrene macromonomer, polymethyl methacrylate macromonomer, and the like.

These copolymerizable other monomers can be used singly or in combination of two or more kinds thereof. Examples of the preferred copolymerizable other monomers include alkyl (meth)acrylate (alkyl is an alkyl group having 2 to 4 carbon atoms), phenyl(meth)acrylate, benzyl(meth)acrylate, and styrene.

Among these, multi-component copolymers such as a benzyl(meth)acrylate/(meth)acrylic acid copolymer or a benzyl (meth)acrylate/(meth)acrylic acid/another monomer are particularly preferable.

The acryl-based resin has an acid value in a range of 20 to 200 mg KOH/g as described above. If the acid value is more than 200, the acryl-based resin has too high alkali solubility, and thus, the development appropriate range (development latitude) is narrowed. On the other hand, if the acid value is less than 20 and too small, the alkali solubility is low, and accordingly, it takes too much time for development, which is thus not preferable.

Further, the mass average molecular weight Mw (a value measured by means of a GPC method using a polystyrene as a standard) of acryl-based resin is preferably from 2,000 to 100,000, and more preferably from 3,000 to 50,000 in order to realize a viscosity range which is easily employed in the process such as color resist coating, and the like and to ensure film strength.

The acid value of the acryl-based resin in the above-specified range can be easily carried out by appropriately adjusting the copolymerization ratio of each monomer. Also, the range of the mass average molecular weight in the above-described range can be easily carried out by using an appropriate amount of a chain transfer agent corresponding to the polymerization method upon copolymerization of the monomers.

The acryl-based resin can be produced, for example, by a known radical polymerization method. The polymerization conditions of the temperature, the pressure, the kind and amount of the radical initiator, the kind of the solvent, and the like at the time of production of an acryl-based resin by a radical polymerization can be easily set by an ordinary skilled person in the art, and thus the conditions can be set.

When adding the alkali-soluble resin to the curable composition of the present invention, the addition amount thereof is preferably from 5 to 90% by mass, and more preferably from 10 to 60% by mass, with respect to the total solid content of the composition. If the amount of the alkali-soluble resin is less than 5% by mass, the film strength is reduced. If the amount is more than 90% by mass, the amount of the acid components is increased, and as a result, it becomes difficult to control the solubility, and the amount of the pigment is relatively decreased, and thus, a sufficient image density cannot be obtained. Particularly, for a slit coating which is suitable for coating on a substrate having a large width and a large area, a good coating film having a high yield can be obtained.

Further, in order to improve the crosslinking efficiency of the photocurable coloring composition in the present invention, a resin having a polymerizable group in an alkali-soluble resin may be used singly or in combination with an alkali-soluble resin having no polymerizable group, and polymers having an aryl group, a (meth)acryl group, an aryloxy alkyl group, and the like at the side chain, and the like are useful.

The alkali-soluble resin having a polymerizable double bond is one capable of developing with an alkali developing liquid and further having photocurability and thermocurability.

Examples of the polymers containing polymerizable groups are given below, but not limited to these, provided that an alkali-soluble group, such as a COOH group, an OH group, and the like, and a carbon-carbon unsaturated bond, are included therein.

(1) an urethane-modified acryl resin containing a polymerizable double bond, which is obtained by reacting an isocyanate group with an OH group in advance to leave one unreacted isocyanate group, and reacting a compound having at least one (meth)acryloyl group with an acryl resin containing a carboxyl group, (2) an acryl resin containing an unsaturated group, which is obtained by reacting an acryl resin containing a carboxyl group with a compound having both of an epoxy group and a polymerizable double bond in the molecule, (3) an acid pendant-type epoxy acrylate resin, (4) an acryl resin containing a polymerizable double bond, which is obtained by reacting an acryl resin containing an OH group with a dibasic acid anhydride having a polymerizable double bond.

Among those, the resins (1) and (2) are particularly preferred.

The acid value of the alkali-soluble resin having a polymerizable double bond in the present invention is preferably from 30 to 150 mg KOH/g, and more preferably from 35 to 120 mg KOH/g, and further, the mass average molecular weight Mw is preferably from 2,000 to 50,000, and more preferably from 3,000 to 30,000.

As a specific example, a compound which is obtained by reacting a compound having an epoxy ring, which has a reactivity with OH group, and a carbon-carbon unsaturated bond group (for example, compounds such as glycidyl acrylate and the like) with a copolymer which is composed of a monomer having OH group, such as 2-hydroxyethylacrylate, a monomer having COOH group, such as methacrylic acid, and a monomer which is copolymerizable with these, such as an acryl-based compound, a vinyl-based compound, and the like, can be used. As the compound having a reactivity with an OH group, a compound having an anhydride group, an isocyanate group, or an acryloyl group in place of the epoxy ring can also be used. Further, a reaction product which is obtained by reacting a saturated or unsaturated polybasic acid anhydride with a compound obtained by reacting a compound having an epoxy ring with an unsaturated carboxylic acid such as acrylic acid, as described in Japanese Patent Application Laid-Open Nos. 6-102669 and 6-1938 can also be used. Examples of the compound which has both an alkali-soluble group, such as a COOH group, and a carbon-carbon unsaturated group include DIANAL NR series (manufactured by Mitsubishi Rayon Co., Ltd.); PHOTOMER 6173 (a COOH group-containing polyurethane acrylic oligomer, manufactured by Diamond Shamrock Co, Ltd.); VISCOAT R-264 and KS RESIST 106 (both manufactured by Osaka Organic Chemical Industry Ltd.); CYCLOMER P series and PRAXEL CF200 series (both manufactured by Daicel Chemical Industries, Ltd.); EBECRYL 3800 (manufactured by Daicel-UCB Co., Ltd.), and the like.

The curable composition of the present invention may further contain the components to be described in detail below, if desired.

<Sensitizing Agent>

The curable composition of the present invention may contain a sensitizing agent for the plupose of the improvement of the radical generating efficiency of the polymerization initiator, and achievement of a longer photosensitive wavelength. As the sensitizing agent which can be used in the present invention, those capable of sensitizing the above-described photopolymerization initiators by the electron transfer mechanism or the energy transfer mechanism are preferable. Examples of the sensitizing agent which can be used in the present invention include those belonging to the compounds listed below, and having the absorption wavelength in a region of 300 nm to 450 nm wavelength range.

Examples of the preferable sensitizing agent include those belonging to the following compounds, and having the absorption wavelength in a region of 330 nm to 450 nm.

For example, polynuclear aromatic compounds (such as phenanthrene, anthracene, pyrene, perylene, triphenylene, and 9,10-dialkoxy anthracene), xanthenes (for example, fluorescein, eosin, erythrosine, rhodamine B, and rose bengal), thioxanthones (isopropyl thioxanthone, diethylthioxanthone, chlorothioxanthone), cyanines (for example, thiacarbocyanine, and oxacarbocyanine), merocyanines (for example, merocyanine, carbomerocyanine), phthalocyanines, thiazines (for example, thionine, methylene blue, and toluidine blue), acridines (for example, acridine orange, chloroflavin, and acriflavin), anthraquinones (for example, anthraquinone), squaryliums (for example, squarylium), acridine orange, coumarins (for example, 7-diethyl amino-4-methyl coumarin), ketocoumarin, phenothiazines, phenazines, styryl benzenes, azo compounds, diphenyl methane, triphenyl methane, distyryl benzenes, carbazoles, porphyrin, Spiro compounds, quinacridones, indigo, styryl, pyrylium compounds, pyrromethene compounds, pyrazorotriazole compounds, benzothiazole compounds, barbituric acid derivative, thiobarbituric acid derivative, acetophenone, benzophenone, thioxanthone, aromatic ketone compounds such as Michler's ketone and the like, hetero cyclic compounds such as N-aryl oxazolidinone and the like, etc. may be presented.

Furthermore, the compounds described in European Patent No. 568,993, U.S. Pat. Nos. 4,508,811 and 5,227,227, Japanese Patent Application Laid-Open Nos. 2001-125255 and 11-271969, or the like may be mentioned.

<Polymerization Inhibitor>

In the present invention, it is preferable to add a small amount of a thermal polymerization inhibitor in order to inhibit the unnecessary thermal polymerization of a compound having a polymerizable ethylenically unsaturated double bond during the production or the storage of the curable composition.

Examples of the thermal polymerization inhibitor which can be used in the present invention include hydroquinone, p-methoxyphenol, di-t-butyl-p-cresol, pyrogallol, t-butyl catechol, benzoquinone, 4,4'-thiobis(3-methyl-6-t-butyl phenol), 2,2'-methylene bis(4-methyl-6-t-butyl phenol), an N-nitrosophenyl hydroxy amine cerium salt, and the like.

The addition amount of the polymerization inhibitor is preferably from about 0.01% by mass to about 5% by mass with respect to the mass of the total composition. Further, if desired, in order to prevent polymerization inhibition due to oxygen, a higher fatty acid derivative such as behenic acid and behenic acid amide, or the like may be added, to be unevenly distributed on a surface of a photosensitive layer during a drying process after coating. The addition amount of the higher fatty acid derivative is preferably about 0.5% by mass to about 10% by mass of a total composition.

<Other Additives>

Moreover, in the present invention, known additives such as an inorganic filler for improving the physical properties of the cured coating film, a plasticizing agent, a lipophilic agent for improving the ink receiving property of the photosensitive layer surface, and a substrate adhesion agent for improving the substrate adhesion property may be added.

Examples of the plasticizing agent include dioctyl phthalate, didodecyl phthalate, triethylene glycol dicaprylate, dimethyl glycol phthalate, tricresyl phosphate, dioctyl adipate, dibutyl sebacate, triacetyl glycerol, and the like. In the case where a binder is used, it may be added in an amount of 10% by mass or less with respect to the total mass of the compound having an ethylenically unsaturated double bond and the binder.

In the case of applying the curable composition of the present invention on the hard material surface such as a substrate and the like, an additive for improving the adhesion property to the hard material surface (hereafter, referred to as a "substrate adhesion agent") may be added.

As the substrate adhesion agent, known materials may be used, but in particular, it is preferable to use a silane-based coupling agent, a titanate-based coupling agent, or an aluminum-based coupling agent.

Examples of the silane-based coupling agent include γ-(2-amino ethyl)amino propyl trimethoxy silane, γ-(2-amino ethyl)amino propyl dimethoxy silane, β-(3,4-epoxy cyclohexyl)ethyl trimethoxy silane, γ-amino propyl trimethoxy silane, γ-amino propyl triethoxy silane, γ-methacryloxy propyl trimethoxy silane, γ-methacryloxy propyl triethoxy silane, γ-acryloxy propyl trimethoxy silane, γ-acryloxy propyl triethoxy silane, γ-isocyanate propyl trimethoxy silane, γ-isocyanate propyl triethoxy silane, N-β-(N-vinyl benzyl amino ethyl)-γ-amino propyl trimethoxy silane hydrochloride, γ-glycidoxy propyl trimethoxy silane, γ-glycidoxy propyl triethoxy silane, amino silane, γ-mercapto propyl trimethoxy silane, γ-mercapto propyl triethoxy silane, methyl trimethoxy silane, methyl triethoxy silane, vinyl triacetoxy silane, γ-chloropropyl trimethoxy silane, hexamethyl disilazane, γ-anilino propyl trimethoxy silane, vinyl trimethoxy silane, vinyl triethoxy silane, vinyl tris(β-methoxyethoxy) silane, octadecyl dimethyl[3-(trimethoxy silyl)propyl]ammonium chloride, γ-chloropropyl methyl dimethoxy silane, γ-mercapto propyl methyl dimethoxy silane, methyl trichlorosilane, dimethyl dichlorosilane, trimethyl chlorosilane, 2-(3,4-epoxy cyclohexyl)ethyl trimethoxy silane, bisallyl trimethoxy silane, tetraethoxy silane, bis(trimethoxy silyl)hexane, phenyl trimethoxy silane, N-(3-acryloxy-2-hydroxy propyl)-3-amino propyl triethoxy silane, N-(3-methacryloxy-2-hydroxy propyl)-3-amino propyl triethoxy silane, (methacryloxymethyl)methyl diethoxy silane, (acryloxymethyl)methyl dimethoxy silane, and the like.

Among these, γ-methacryloxy propyl trimethoxy silane, γ-methacryloxy propyl triethoxy silane, γ-acryloxy propyl trimethoxy silane, γ-acryloxy propyl triethoxy silane, γ-mercapto propyl trimethoxy silane, γ-amino propyl triethoxy silane, and phenyl trimethoxy silane are preferable, and γ-methacryloxy propyl trimethoxy silane is most preferable.

Examples of the titanate-based coupling agents include isopropyl triisostearoyl titanate, isopropyltridecylbenzenesulfonyl titanate, isopropyltris(dioctylpyrophosphate) titanate, tetraisopropylbis(dioctylphosphite) titanate, tetraoctylbis(ditridecylphosphite) titanate, tetra(2,2-diallyloxymethyl) bis(ditridecyl)phosphite titanate, bis(dioctylpyrophosphate) oxyacetate titanate, bis(dioctylpyrophosphate)ethylene titanate, isopropyltrioctanoyl titanate, isopropyldimethacrylisostearoyl titanate, isopropylisostearoyldiacryl titanate, triisopropyltri(dioctylphosphate) titanate, isopropyltricumylphenyl titanate, isopropyltri(N-amidoethyl-aminoethyl) titanate, dicumylphenyloxyacetate titanate, diisostearoylethylene titanate, and the like.

Examples of the aluminum-based coupling agents include acetoalkoxyaluminum diisopropylate and the like.

From the viewpoint of preventing residue remaining in the unexposed part of the curable composition, the content of the substrate adhesion agent is preferably 0.1% by mass to 30% by mass, it is more preferably 0.5% by mass to 20% by mass, and it is particularly preferably from 1% by mass to 10% by mass, with respect to the total solid content of the curable composition of the present invention.

The colored curable composition of the present invention is cured with high sensitivity and has good storage stability. Further, it exhibits high adhesion property to the surface of a hard material such as a substrate and the like to which the curable composition is applied. Therefore, the curable composition of the present invention can be preferably used in the field of the image forming materials such as three-dimensional photolithography, holography, and color filter, or an ink, a paint, an adhesive, a coating agent, or the like.

Further, the colored curable composition of the present invention is excellent in pigment dispersion stability and developability even when it contains a fine pigment at a high concentration, and it can form a good colored region with high precision and color characteristics. Therefore, in the case of production of a color filter of a solid-state image pick-up device, in particular, formation of a pixel having a film thickness in a range of 0.8 μm or less, and preferably from 0.1 to 0.5 it can be said that the effect is remarkable particularly by the use of the pigment-containing colored curable composition of the present invention.

[Color Filter and Production Method of the Same]

Next, the color filter of the present invention and a method for producing the same will be described.

The color filter of the present invention is characterized in that it has a colored pattern formed using the curable composition of the present invention on a support.

Hereinbelow, the color filter of the present invention will be described in detail with reference to a method for producing the same (the method for producing the color filter of the present invention).

The method for producing the color filter of the present invention is characterized in that it includes a colored layer forming step of forming a colored layer made of the curable composition by applying the curable composition of the present invention on a support, an exposing step of exposing the above-described colored layer via a mask, and a developing step of forming a colored pattern by developing the colored layer after the exposure.

Hereinafter, each step in the production method of the present invention will be described.

<Colored Layer Forming Step>

In the colored layer forming step, a colored layer made of the curable composition is formed by applying a curable composition of the present invention on a support.

Examples of the support which can be used in the present step include a soda glass, a Pyrex (registered trademark) glass, a quartz glass, and those glasses with a transparent conduction film attached thereto, which are used in a liquid crystal display device or the like, a photoelectric conversion element substrate used in an image pickup device or the like, for example, a silicon substrate, a complementary metal oxide film semiconductor (CMOS), and the like. On these substrates, a black stripe, which isolates each pixel, may be formed in some cases.

Further, if necessary, on these supports, an undercoating layer may be provided for improving adhesion with an upper layer, preventing diffusion of a substance, and flattening a substrate surface.

As the coating method for the curable composition of the present invention onto the support, various coating methods such as a slit coating method, an ink jet coating method, a rotation coating method, a cast coating method, a roll coating method, a screen printing method may be used.

From the viewpoint of the film thickness evenness of the coating film and the drying easiness of the coating solvent, the film thickness of the curable composition immediately after coating is preferably from 0.1 to 10 μm, more preferably from 0.2 to 5 μm, and further preferably from 0.2 to 3 μm.

The colored layer (curable composition layer) applied on the substrate may be dried (prebaked) with a hot plate, an oven, or the like at 50° C. to 140° C. for 10 to 300 seconds.

The coating film thickness after drying of the curable composition (hereafter, appropriately referred to as the "dry film thickness") is preferably 0.1 μm or more and less than 2.0 μm, more preferably 0.2 μm or more and 1.8 μm or less, and particularly preferably 0.3 μm or more and 1.75 μm or less for use as a color filter for an LCD in view of compatibility with a thin LCD and ensuring the color density.

Moreover, for use as a color filter for IS, in view of ensuring the color density and reduction of problems such as a notable difference in the light collection ratio between the end part and the center part of a device due to the diagonal light not reaching to the light receiving unit, the thickness is preferably 0.05 μm or more and less than 1.0 μm, more preferably 0.1 μm or more and 0.8 μm or less, and particularly preferably 0.2 μm or more and 0.7 μm or less.

<Exposing Step>

In the exposing step, the colored layer (curable composition layer) formed in the above-described colored layer forming step is exposed via a mask having a predetermined mask pattern.

According to the exposure in this step, the pattern exposure of the coating film may be carried out by the exposure via a predetermined mask pattern for curing only the coating film portion irradiated with light. As the radiation to be used at the time of the exposure, ultraviolet rays such as a g-ray, an i-ray, and the like may preferably be used. The irradiation amount is preferably from 5 to 1,500 mJ/cm$^2$, more preferably from 10 to 1,000 mJ/cm$^2$, and most preferably 10 to 500 mJ/cm$^2$.

In the case where the color filter of the present invention is for a liquid crystal display device, among the above-described range, it is preferably from 5 to 200 mJ/cm$^2$, more preferably from 10 to 150 mJ/cm$^2$, and most preferably from 10 to 100 mJ/cm$^2$. Moreover, in the case where the color filter of the present invention is for a solid-state image pick-up device, among the above-described range, it is preferably from 30 to 1,500 mJ/cm$^2$, more preferably from 50 to 1,000 mJ/cm$^2$, and most preferably from 80 to 500 mJ/cm$^2$.

<Developing Step>

Subsequently, by carrying out the alkaline developing process (developing step), the unirradiated portion is eluted to the alkaline aqueous solution, so that only the cured portion remains. A patterned coating film with respective color pixels (3 or 4 colors) may be formed by development with a developing liquid. As the developing liquid, an organic alkaline developing liquid without damaging a lower layer circuit or the like is preferable. The developing temperature is usually from 20° C. to 30° C., and the developing time is from 20 to 90 seconds.

Examples of the alkaline agent which is used in the developing liquid include organic alkaline compounds such as aqueous ammonia, ethylamine, diethylamine, dimethyl ethanol amine, tetramethyl ammonium hydroxide, tetraethyl ammonium hydroxide, choline, pyrrole, piperidine, 1,8-diazabicyclo-[5,4,0]-7-undecene, and the like, and inorganic compounds such as sodium hydroxide, potassium hydroxide, sodium hydrogen carbonate, potassium hydrogen carbonate, and the like. An alkaline aqueous solution obtained by diluting these alkaline agents in pure water so as to have the concentration of 0.001% by mass to 10% by mass, and preferably 0.01% by mass to 1% by mass may be preferably used as a developing liquid. In the case of using a developing liquid of such an alkaline aqueous solution, it is in general washed (rinsed) with pure water after the development.

Then, it is dried after washing for removing the excessive developing liquid.

In the case of using the curable composition of the present invention, since the specific resin of the present invention which is used as a pigment dispersant is excellent in dispersibility and dispersion stability of the pigment, and has a functional group having a pKa of 14 or less in the molecule and excellent in developability, a remaining film of an uncured part is hardly formed even in the case where a fine pattern is formed. Thus, it is suitable for formation of a colored pattern of a color filter for a CCD which requires formation of a fine pattern.

Furthermore, the production method of the present invention may, if necessary, include a curing step of curing the formed colored pattern by heating (postbaking) and/or exposure after carrying out the colored layer forming step, the exposing step and the developing step as described above.

The postbaking is heat treatment after development for completing the curing, and the heat curing treatment at 100° C. to 240° C. is usually carried out. When a substrate is a glass substrate or a silicon substrate, a temperature of 200° C. to 240° C. is preferable in the above temperature range.

This postbaking treatment can be performed continuously or in a batch manner using a heater such as a hot plate, a convection oven (hot air circulating dryer), a high frequency heating machine so that the coated film after development is placed under the above condition.

By repeating the above-explained colored layer forming step, exposing step, and developing step (furthermore, if necessary, the curing step) for the desired number of the hues, a color filter having the desired hues is manufactured.

As regards the application of the curable composition of the present invention, this has principally been described with respect to application to the pixels of a color filter, but it may obviously also be applied to the black matrix provided between the pixels of a color filter. The black matrix may be formed in the same manner as in the above-described method for manufacturing the pixels by pattern exposure and alkaline development, and in addition thereafter, postbaking to promote curing of the film, except that a coloring agent including a black pigment such as carbon black, titanium black, and the like is used in the curable composition of the present invention.

Since the color filter of the present invention is produced using the curable composition of the present invention with the excellent exposure sensitivity, the cured composition at the exposed portion has the excellent adhesion property to the substrate and development resistance, the formed colored pattern has the high adhesion property to the support substrate, and further, the pattern providing a desired cross-sectional shape has the high resolution.

Moreover, the solid-state image pick-up device of the present invention includes a color filter of the present invention produced by the above-described method for producing the color filter of the present invention.

Therefore, specifically, the color filter of the present invention may be used preferably for a liquid crystal display device and a solid-state image pick-up device such as a CCD, and in particular, it may be used preferably for the high-resolution CCD device, CMOS, or the like with more than 1,000,000 pixels. The color filter of the present invention can be used, for example, as a color filter to be disposed between a light receiving part and a micro lens for light focusing in each pixel included in a CCD device.

EXAMPLES

Hereinafter, the present invention will be described further in detail with reference to Examples, but the present invention is not intended to be limited thereto.

Furthermore, in Examples, the acid value and the amine value were determined by means of a potential difference method (solvent: tetrahydrofuran/water=100/10 (ratio by volume), a titration solution: a 0.01 N aqueous sodium hydroxide solution (acid value), and a 0.01 N hydrochloric acid (amine value)). However, in Example 18 and Example 29, instead of the 0.01 N aqueous sodium hydroxide solution, titration was carried out in the 0.01 N sodium methoxide-dioxane solution system.

Synthesis Example 1

Synthesis of Polyester (i-1)

6.4 g of n-octanoic acid, 200 g of ε-caprolactone, and 5 g of titanium (IV) tetrabutoxide were mixed, followed by heating at 160° C. for 8 hours and then cooling to room temperature, thereby obtaining a polyester (1-1).
The scheme is shown below.

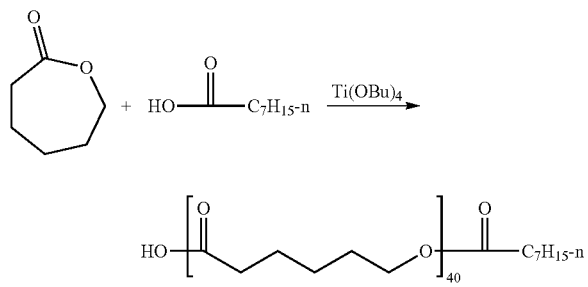

Synthesis Examples 2 to 10

In the same manner as in Synthesis Example 1 except that the amounts as listed in Table 1 were used, the polyesters (i-2) to (i-10) were obtained. The number average molecular weights and the weight average molecular weights of the resins obtained in these Synthesis Examples were measured by means of the above-described GPC method. The results are shown in Table 1 below. Further, the unit number of the lactone repeating units calculated from the ratio of the raw materials is shown in Table 1.

Synthesis Example 11

Synthesis of Polyester (i-11)

Under a nitrogen air flow, 100 g of 12-hydroxystearic acid, 0.1 g of titanium (IV) tetrabutoxide, and 300 g of xylene were mixed and reacted at an outer temperature of 160° C. while removing generated water with a Dean-Stark tube. At a moment when the number average molecular weight reached 8,000 and the weight average molecular weight reached 12,000 in the GPC measurement, heating was stopped to obtain a polyester (i-11).

Synthesis Example 12

Synthesis of Polyester (i-12)

The same experiment as in Synthesis Example 11 was carried out, and at a moment when the number average molecular weight reached 6,000 and the weight average molecular weight reached 11,000 in the GPC measurement, heating was stopped to obtain a polyester (i-12).

Synthesis Example 13

Synthesis of Polyester (i-13)

Under a nitrogen air flow, 307 g of adipic acid, 110 g of neopentyl glycol, 57 g of 1,4-, butanediol, and 26 g of ethylene glycol were reacted at an outer temperature of 160° C. while removing generated water with a Dean-Stark tube. At a moment when the number average molecular weight reached 8,000 and the weight average molecular weight reached 13,000 in the GPC measurement, heating was stopped to obtain a polyester (i-13).

Synthesis Example 14

Synthesis of Macromonomer (i-14)

Under a nitrogen air flow, 50 g (500 mmol) of methyl methacrylate, 100 g of propylene glycol monomethyl ether,

TABLE 1

| | Polyester | Carboxylic acid (Content: g) | Lactone | Weight average molecular weight | Number average molecular weight | Number of lactone repeating unit |
|---|---|---|---|---|---|---|
| Synthesis Example 1 | (i-1) | n-Octanoic acid (6.4) | ε-Caprolactone | 15,000 | 10,000 | 40 |
| Synthesis Example 2 | (i-2) | n-Octanoic acid (12.6) | ε-Caprolactone | 8,000 | 6,000 | 20 |
| Synthesis Example 3 | (i-3) | n-Octanoic acid (5.1) | ε-Caprolactone | 18,000 | 14,000 | 50 |
| Synthesis Example 4 | (i-4) | Palmitic acid (5.6) | ε-Caprolactone | 25,000 | 16,500 | 80 |
| Synthesis Example 5 | (i-5) | Palmitic acid (7.5) | ε-Caprolactone | 23,000 | 19,000 | 60 |
| Synthesis Example 6 | (i-6) | Decanoic acid (15.1) | ε-Caprolactone | 8,000 | 5,500 | 20 |
| Synthesis Example 7 | (i-7) | 12-Hydroxystearic acid (17.5) | ε-Caprolactone | 10,000 | 8,000 | 30 |
| Synthesis Example 8 | (i-8) | 12-Hydroxystearic acid (5.25) | ε-Caprolactone/ δ-Decanolactone (mass ratio 9:1) | 30,000 | 21,000 | 100 |
| Synthesis Example 9 | (i-9) | Ricinoleic acid (10.4) | ε-Caprolactone | 19,000 | 14,000 | 50 |
| Synthesis Example 10 | (i-10) | 2,2-Bis(hydroxymethyl)butyric acid (6.5) | ε-Caprolactone | 15,000 | 12,000 | 20 | and 2.5 g (23.6 mmol) of 2-mercaptopropionic acid were heated at 80° C. Then, 0.1 g of V-601 (manufactured by Wako Pure Chemical Industries, Ltd.) was added thereto, and at 3 hours later, 0.1 g of V-601 was further added thereto, followed by heating for 4 hours. Thereafter, 3.35 g (23.6 mmol) of glycidyl methacrylate and 0.5 g of tetrabutyl ammonium bromide were added thereto, followed by heating at 80° C. for 5 hours. After leaving it to be cooled, a mixed solvent of 200 mL of water and 800 mL of methanol was used for reprecipitation, followed by drying, thereby obtaining 55 g of a macromonomer (i-14).

Synthesis Example 15

Synthesis of Resin (J-1)

10 g of polyethyleneimine (SP-018, number average molecular weight 1,800, manufactured by Nippon Shokubai Co., Ltd.) and 100 g of the polyester (i-1) (Y precursor y) were mixed, followed by heating at 120° C. for 3 hours, thereby obtaining an intermediate (J-1B). Thereafter, after leaving to be cooled to 65° C., 200 g of propylene glycol 1-monomethyl ether 2-acetate (hereinafter, referred to as PGMEA) containing 3.8 g of succinic anhydride (X precursor x) was slowly added thereto, followed by stirring for 2 hours. Then, PGMEA was added thereto to obtain a 10% by weight PGMEA solution of the resin (J-1). The resin (J-1) had a side chain derived from the polyester (i-1) and a group having a functional group having a pKa of 14 or less (carboxyl group) derived from the succinic anhydride.

The synthesis scheme is shown below.

Base titration of an intermediate (J-1B) was carried out, and as a result, it could be confirmed that the acid value was 0.11 mmol/g. Further, base titration and acid titration of the resin (J-1) were carried out and it was found that the acid value was 0.31 mmol/g and the base value was 0.83 mmol/g. That is, the % by mole of the repeating units corresponding to general formula (I-1) can be calculated from the difference between the acid value of the resin (J-1) and the acid value of the intermediate (J-1B), $l_1+l_2$ (the % by mole of the repeating units corresponding to general formula (I-2)) can be calculated from the difference between the base value of the resin (J-1) and the number of nitrogen atoms of the resin before reaction, and $m_1+m_2$ (the % by mole of the repeating units corresponding to general formula (I-3)) can be calculated from the acid value of the intermediate (J-1B), thereby obtaining a result of $k/(l_1+l_2)/(m_1+m_2)/n=10/50/5/35$.

That is, it can be seen that the resin was a resin containing 10% by mole of the repeating units in which X is —COCH$_2$CH$_2$CO$_2$H in the repeating unit represented by general formula (I-1) and 50% by mole of the repeating units in which Y is poly(ε-caprolactone) in the repeating unit represented by general formula (I-2). Further, the weight average molecular weight as determined by a GPC method was 24,000.

Synthesis Examples 16 to 31

Synthesis of Resins (J-2) to (J-17)

Synthesis was carried out in the same manner as in Synthesis Example 15, except that the amino group-containing resins, the X precursors x, and the polyesters obtained in

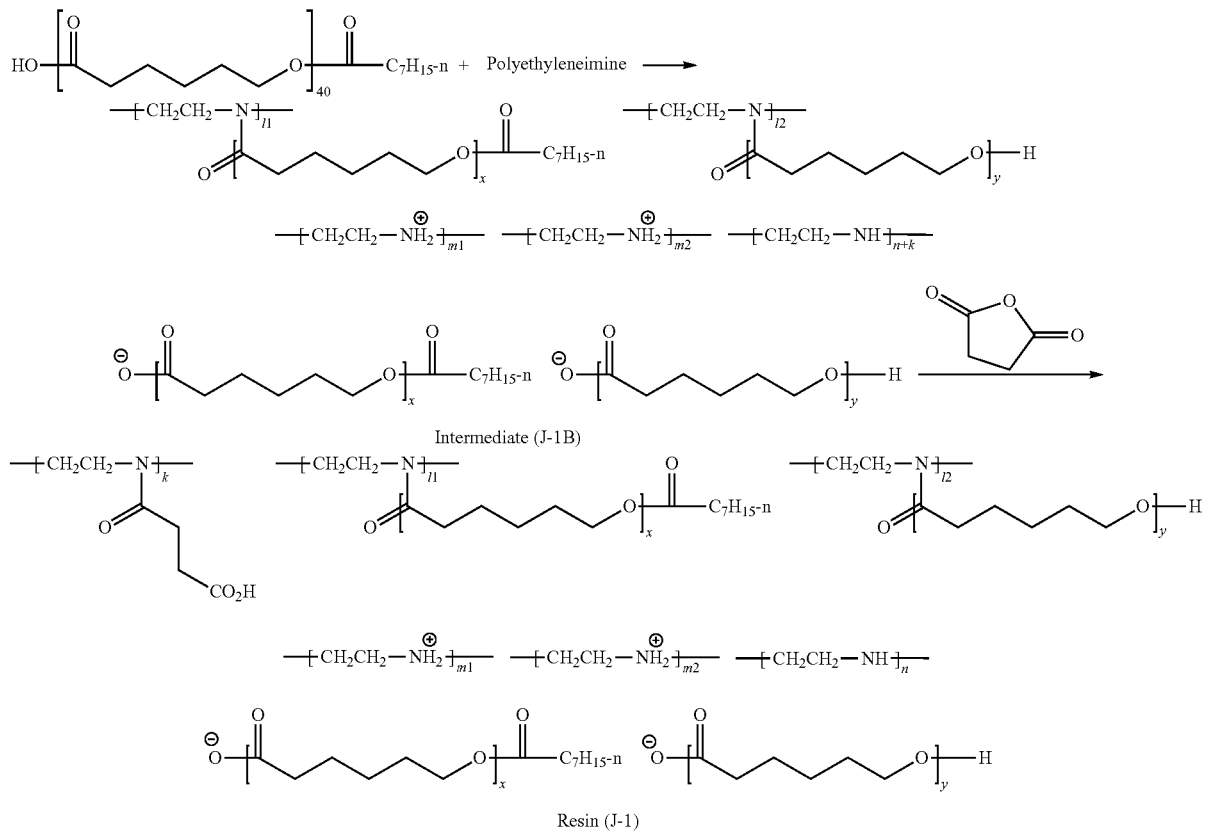

Resin (J-1)

Synthesis Examples 1 to 13 were used as described in Table 2 and Table 3, thereby obtaining 10% by weight PGMEA solutions of the resins (J-2) to (J-17). Further, for the resin (J-13), the reaction solution was reprecipitated with water and dried to prepare a 10% by mass PEGMA solution.

The amino group-containing resin used in the synthesis is shown below.

SP-003 (polyethyleneimine (manufactured by Nippon Shokubai Co., Ltd.), number average molecular weight 300)

SP-006 (polyethyleneimine (manufactured by Nippon Shokubai Co., Ltd.), number average molecular weight 600)

SP-012 (polyethyleneimine (manufactured by Nippon Shokubai Co., Ltd.), number average molecular weight 1,200)

SP-018 (polyethyleneimine (manufactured by Nippon Shokubai Co., Ltd.), number average molecular weight 1,800)

SP-020 (polyethyleneimine (manufactured by Nippon Shokubai Co., Ltd.), number average molecular weight 10,000)

Synthesis Example 32

Synthesis of Resin (J-18)

In a reactor equipped with a Dean-Stark tube, 100 g of an aqueous polyallylamine (PAA-03, weight average molecular weight 3,000, manufactured by Nippon Shokubai Co., Ltd.) solution and 500 g of toluene were subjected to reflux at an outer temperature of 130° C. until the evaporation of moisture stopped, and then toluene was removed by concentrating. Then, 100 g of the polyester (i-1) was mixed therewith, followed by heating at 120° C. for 3 hours. Thereafter, after leaving to be cooled to 65° C., 200 g of propylene glycol 1-monomethyl ether 2-acetate (hereinafter, referred to as PGMEA) containing 3.8 g of succinic anhydride (X precursor x) was slowly added thereto, followed by stirring for 2 hours. Then, PGMEA was added thereto to obtain a 10% by weight PGMEA solution of the resin (J-18).

Synthesis Examples 33 to 40

Synthesis of Resins (J-19) to (J-26)

Synthesis was carried out in the same manner as in Synthesis Example 32, except that the amino group-containing resins, the X precursors x, and the polyesters obtained in Synthesis Examples 1 to 13 were used as described in Table 2 and Table 3, thereby obtaining 10% by weight PGMEA solutions of the resins (J-19) to (J-26).

The amino group-containing resin used in the synthesis is shown below.

PAA-01 (polyallylamine (manufactured by Nitto Boseki Co., Ltd), weight average molecular weight 1,000)

PAA-03 (polyallylamine (manufactured by Nitto Boseki Co., Ltd), weight average molecular weight 3,000)

PAA-05 (polyallylamine (manufactured by Nitto Boseki Co., Ltd), weight average molecular weight 5,000)

PAA-08 (polyallylamine (manufactured by Nitto Boseki Co., Ltd), weight average molecular weight 8,000)

PAA-15 (polyallylamine (manufactured by Nino Boseki Co., Ltd), weight average molecular weight 15,000)

Synthesis Example 41

Synthesis of Resin (J-27)

0.50 g (3.5 mmol) of the monomer (B), 55 g (23 mmol) of the macromonomer (i-14), 1.50 g (9.6 mmol) of 2-(N,N-dimethylaminoethyl)methacrylate, and 0.2 g (1.0 mmol) of dodecane thiol were dissolved in a mixed solvent of 200 g of dimethylsulfoxide and 100 g of N-methylpyrrolidone. After heating at 80° C., 0.1 g of V-601 was added thereto, followed by stirring for 3 hours. Thereafter, 0.1 g of V-601 was added thereto, followed by stirring for 3 hours and then being left to be cooled. The obtained solution was added dropwise to 4000 L of water over 1 hour, and the precipitated resin was collected by filtration. After drying, the collected product was dissolved in 1-methoxy-2-propanol to obtain a 10% by mass solution.

The synthesis scheme is shown below.

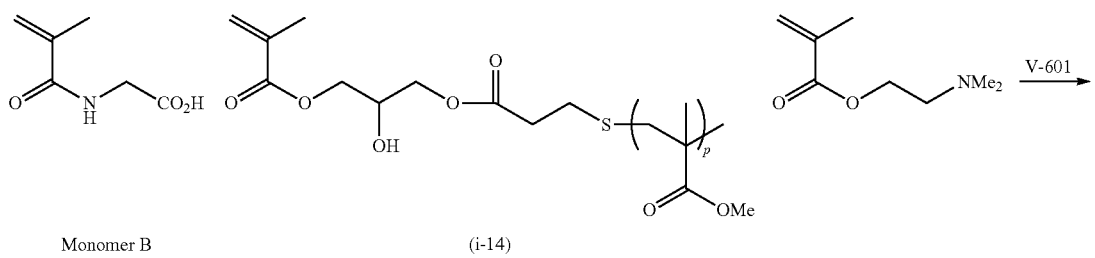

Monomer B          (i-14)

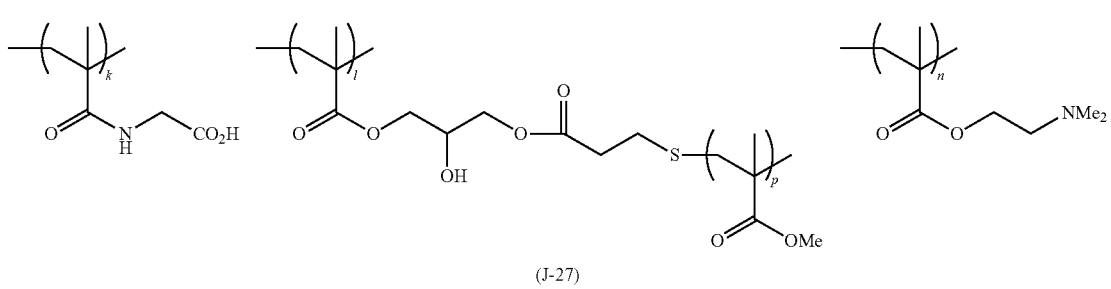

(J-27)

Synthesis Example 42

Synthesis of Comparative Resin (J-28)

0.50 g (5.8 mmol) of methacrylic acid, 55 g (23 mmol) of the macromonomer (i-14), 1.50 g (9.6 mmol) of 2-(N,N-dimethylaminoethyl)methacrylate, and 0.2 g (1.0 mmol) of dodecane thiol were dissolved in a mixed solvent of 132 g of 1-methoxy-2-propanol. After heating at 80° C., 0.1 g of V-601 was added thereto, followed by stirring for 3 hours. Thereafter, 0.1 g of V-601 was added thereto, followed by stirring for 3 hours and then being left to be cooled. 1-Methoxy-2-propanol was added to the obtained solution to obtain a 10% by mass solution.

The synthesis scheme is shown below.

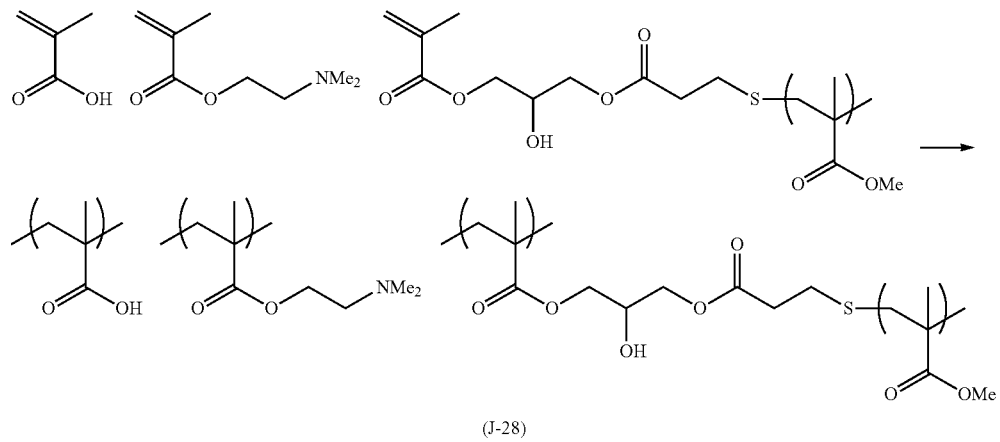

(J-28)

Synthesis Examples 43 to 45

Synthesis of Comparative Resins (J-29) to (J-31)

The same procedure was carried out in the same manner as in Synthesis Examples 15, 34, and 39, except that the X precursor x was not added, thereby obtaining Comparative Resins (J-29) to (J-31).

(Measurement of Acid Value and Amine Value)

The obtained resins (J-1) to (J-27) and the resins (J-28) to (J-31) of Comparative Example were subjected to measurement of the acid value and the amine value by the above-described methods. The results are listed in Table 2 and Table 3.

From these measurement results, it can be confirmed that a functional group having a pKa of 14 or less is present in the side chain in the intermediate acid value and the desired resin acid value.

TABLE 2

| | Resin | Amino acid-containing resin (g) | Polyester | X Precursor x (g) | Acid value of intermediate (mg KOH/g) | Amine value of intermediate | Acid value of desired resin product (mg KOH/g) | Amine value of desired resin (mg KOH/g) | Weight average molecular weight |
|---|---|---|---|---|---|---|---|---|---|
| Synthesis Example 15 | (J-1) | SP-018 (10) | (i-1) | Anhydrous succinic acid (2.3) | 6.2 | 56.7 | 17.7 | 46.6 | 24000 |
| Synthesis Example 16 | (J-2) | SP-006 (10) | (i-2) | Anhydrous glutaric acid (1.2) | 11.8 | 72.9 | 17.1 | 67.3 | 6000 |
| Synthesis Example 17 | (J-3) | SP-012 (15) | (i-3) | Anhydrous succinic acid (0.5) | 6.2 | 85.8 | 8.6 | 84.7 | 18000 |
| Synthesis Example 18 | (J-4) | SP-006 (10) | (i-4) | Diketene (3.8) | 5.0 | 62.8 | 23.8 | 45.4 | 18000 |
| Synthesis Example 19 | (J-5) | SP-200 (5) | (i-5) | Anhydrous succinic acid (3.0) | 6.7 | 38.1 | 22.3 | 23.6 | 152000 |
| Synthesis Example 20 | (J-6) | SP-018 (10) | (i-6) | Butane sultone (1.6) | 11.8 | 49.4 | 17.7 | 41.0 | 12000 |
| Synthesis Example 21 | (J-7) | SP-018 (10) | (i-7) | Anhydrous cyclohexane dicarboxylic acid (1.8) | 8.4 | 87.0 | 17.1 | 76.9 | 15000 |
| Synthesis Example 22 | (J-8) | SP-012 (10) | (i-8) | Anhydrous maleic acid (2.1) | 6.7 | 75.7 | 18.9 | 61.7 | 28000 |
| Synthesis Example 23 | (J-9) | SP-006 (5) | (i-9) | Anhydrous succinic acid (1.5) | 17.4 | 44.9 | 25.3 | 33.7 | 15000 |

TABLE 2-continued

|  | Resin | Amino acid-containing resin (g) | Polyester | X Precursor x (g) | Acid value of intermediate (mg KOH/g) | Amine value of intermediate | Acid value of desired resin product (mg KOH/g) | Amine value of desired resin (mg KOH/g) | Weight average molecular weight |
|---|---|---|---|---|---|---|---|---|---|
| Synthesis Example 24 | (J-10) | SP-003 (8) | (i-10) | Anhydrous succinic acid (2.2) | 2.8 | 70.7 | 14.0 | 61.7 | 8000 |
| Synthesis Example 25 | (J-11) | SP-006 (14) | (i-11) | Anhydrous cyclohexane dicarboxylic acid (1.8) | 11.8 | 87.0 | 23.1 | 76.9 | 5000 |
| Synthesis Example 26 | (J-12) | SP-012 (10) | (i-12) | Acrylic acid (2.1) | 6.2 | 58.2 | 16.7 | 47.7 | 15000 |
| Synthesis Example 27 | (J-13) | SP-006 (10) | (i-13) | Anhydrous succinic acid (2.2) | 11.8 | 55.5 | 27.8 | 37.6 | 10000 |
| Synthesis Example 28 | (J-14) | PAA-08 (15) | (i-1) | Anhydrous glutaric acid (9.0) | 6.2 | 46.0 | 41.9 | 11.8 | 40000 |
| Synthesis Example 29 | (J-15) | PAA-15 (15) | (i-2) | Diketene (4.3) | 6.2 | 34.2 | 26.4 | 12.3 | 142000 |

TABLE 3

|  | Resin | Amino acid-containing resin (g) | Polyester | X Precursor x (g) | Acid value of intermediate (mg KOH/g) | Amine value of intermediate | Acid value of desired resin product (mg KOH/g) | Amine value of desired resin (mg KOH/g) | Weight average molecular weight |
|---|---|---|---|---|---|---|---|---|---|
| Synthesis Example 30 | (J-16) | PAA-15 (10) | (i-3) | Anhydrous succinic acid (3.2) | 8.4 | 43.2 | 24.3 | 28.6 | 150000 |
| Synthesis Example 31 | (J-17) | PAA-01 (12) | (i-4) | Anhydrous succinic acid (1.0) | 2.8 | 53.3 | 7.8 | 47.7 | 6000 |
| Synthesis Example 32 | (J-18) | PAA-03 (10) | (i-5) | Anhydrous succinic acid (1.1) | 5.6 | 57.2 | 11.2 | 53.3 | 17000 |
| Synthesis Example 33 | (J-19) | PAA-05 (10) | (i-6) | Butane sultone (2.5) | 18.0 | 49.4 | 27.1 | 36.5 | 12000 |
| Synthesis Example 34 | (J-20) | PAA-03 (12) | (i-7) | Anhydrous succinic acid (5.1) | 14.0 | 74.1 | 38.5 | 48.8 | 8000 |
| Synthesis Example 35 | (J-21) | PAA-08 (15) | (i-8) | Anhydrous succinic acid (2.2) | 5.6 | 79.7 | 16.1 | 70.1 | 32000 |
| Synthesis Example 36 | (J-22) | PAA-03 (14) | (i-9) | Anhydrous cyclohexane dicarboxylic acid (3.0) | 12.3 | 76.3 | 21.7 | 67.3 | 15000 |
| Synthesis Example 37 | (J-23) | PAA-15 (15) | (i-10) | Anhydrous succinic acid (2.5) | 2.2 | 28.6 | 14.2 | 18.0 | 180000 |
| Synthesis Example 38 | (J-24) | PAA-03 (12) | (i-11) | Anhydrous succinic acid (2.1) | 6.7 | 47.1 | 17.1 | 36.5 | 5000 |
| Synthesis Example 39 | (J-25) | PAA-05 (10) | (i-12) | Acrylic acid (1.2) | 10.1 | 44.2 | 16.2 | 38.1 | 18000 |
| Synthesis Example 40 | (J-26) | PAA-05 (5) | (i-13) | Anhydrous succinic acid (0.5) | 6.7 | 16.3 | 9.4 | 14.0 | 11000 |
| Synthesis Example 41 | (J-27) | — | — | — | — | — | 3.4 | 9.5 | 32000 |
| Synthesis Example 42 (Comparative Example) | (J-28) | — | — | — | — | — | 6.1 | 10.2 | 30000 |
| Synthesis Example 43 (Comparative Example) | (J-29) | SP-018 (10) | (i-1) | — | — | — | 6.2 | 58.9 | 24000 |
| Synthesis Example 44 (Comparative Example) | (J-30) | PAA-03 (12) | (i-7) | — | — | — | 14.0 | 74.1 | 8000 |
| Synthesis Example 45 (Comparative Example) | (J-31) | PAA-05 (10) | (i-12) | — | — | — | 10.1 | 44.2 | 18000 |

Here, the solubility in a solvent at a low temperature of a resin having a polycaprolactone chain was evaluated.

The resins (J-1) to (J-6), (J-14) to (J-19), (J-29), and (J-30) (all were 10 wt % propylene glycol monomethyl ether acetate solutions) were left to stand at 5° C. for 2 days, and it was confirmed with the naked eye whether a solid was precipitated or not from the solution. The results are shown in Table 4 below.

As clearly shown in Table 4 below, it was found that the resin of the present invention has excellent solubility in a solvent at low temperature although it has a polycaprolactone chain.

TABLE 4

| Resin | Solubility in Solvent (5° C.) |
|---|---|
| J-1 | Not precipitated |
| J-2 | Not precipitated |
| J-3 | Not precipitated |
| J-4 | Not precipitated |
| J-5 | Not precipitated |
| J-6 | Not precipitated |
| J-14 | Not precipitated |
| J-15 | Not precipitated |
| J-16 | Not precipitated |
| J-17 | Not precipitated |
| J-18 | Not precipitated |
| J-19 | Not precipitated |
| J-29 | Precipitated |
| J-30 | Precipitated |

Examples 1 to 27 and Comparative Examples 1 to 4

A 1. Preparation of Curable Composition

Here, an example of preparation of a curable composition containing a pigment for forming a color filter for a liquid crystal display device application will be described.

A1-1. Preparation of Pigment Dispersion
Preparation of Pigment Dispersion

A pigment dispersion was prepared by mixing and dispersing a mixed liquid of 40 parts by mass (average particle diameter of 60 nm) of C. I. Pigment Green 36 (PG36) as a pigment and 200 parts by mass (20 parts by mass in terms of solid) of a resin (J-1) solution for 3 hours with a bead mill (zirconia bead 0.3 mm). For the pigment dispersion, the average particle size of the pigment was measured by a dynamic light scattering method (measured using Microtrac Nanotrac UPA-EX150 (manufactured by Nikkiso Co., Ltd.) without further diluting P1), and as a result, it was 25 nm.

A1-1-1. Evaluation of Pigment Dispersibility and Dispersion Stability of Pigment Dispersion
Preparation of Pigment Dispersion A pigment dispersion was prepared by mixing and dispersing a mixed liquid obtained by adding PGMEA to 40 parts by mass (average particle diameter of 60 nm) of the pigment described in Table 5 and 180 parts by mass (18 parts by mass in terms of solid) of a 10% by weight PGMEA solution of the resins (J-1) to (J-31) so as to be 230 Parts by mass for 3 hours with a bead mill (zirconia bead 0.3 mm). For the pigment dispersion, the average particle size of the pigment was measured by a dynamic light scattering method (measured using Microtrac Nanotrac UPA-EX150 (manufactured by Nikkiso Co., Ltd.) without further diluting P1), and the results are shown in Table 5.

TABLE 5

| | Resin | Pigment | Viscosity at 1st day (mPa·s) | Viscosity at 4th day (mPa·s) | Viscosity at 7th day (mPa·s) |
|---|---|---|---|---|---|
| Example 1 | (J-1) | PG36 (25 nm) | 8.1 | 8.5 | 9.1 |
| Example 2 | (J-2) | PG36 (25 nm) | 8.2 | 8.6 | 8.8 |
| Example 3 | (J-3) | PG36 (26 nm) | 7.1 | 7.8 | 7.9 |
| Example 4 | (J-4) | PG36 (25 nm) | 8.2 | 8.1 | 8.1 |
| Example 5 | (J-5) | PG36 (25 nm) | 8.1 | 9.2 | 9.9 |
| Example 6 | (J-6) | PG36 (26 nm) | 8.5 | 8.5 | 8.9 |
| Example 7 | (J-7) | PG36 (25 nm) | 8.8 | 8.8 | 9.1 |
| Example 8 | (J-8) | PR254/PY139 (mass ratio 8/2) (25 nm) | 8.2 | 8.2 | 8.3 |
| Example 9 | (J-9) | PR254/PY139 (mass ratio 8/2) (25 nm) | 8.1 | 8.5 | 8.5 |
| Example 10 | (J-10) | PR254/PY139 (mass ratio 8/2) (25 nm) | 8.6 | 8.8 | 8.8 |
| Example 11 | (J-11) | PR254/PY139 (mass ratio 8/2) (25 nm) | 8.2 | 8.3 | 8.4 |
| Example 12 | (J-12) | PR254/PY139 (mass ratio 8/2) (25 nm) | 8.4 | 8.5 | 8.9 |
| Example 13 | (J-13) | PR254/PY139 (mass ratio 8/2) (25 nm) | 8.7 | 8.8 | 9.1 |
| Example 14 | (J-14) | PB15:6 (25 nm) | 9.2 | 10.1 | 11.1 |
| Example 15 | (J-15) | PB15:6 (25 nm) | 9.5 | 10.8 | 11.0 |
| Example 16 | (J-16) | PB15:6 (25 nm) | 9.8 | 10.9 | 11.0 |
| Example 17 | (J-17) | Py138 (25 nm) | 10.1 | 11.2 | 11.5 |
| Example 18 | (J-18) | Py138 (25 nm) | 10.5 | 11.8 | 12.1 |
| Example 19 | (J-19) | PY138 (25 nm) | 9.8 | 11.9 | 12.3 |
| Example 20 | (J-20) | PY138 (25 nm) | 10.2 | 11.8 | 12.1 |
| Example 21 | (J-21) | PR254 (25 nm) | 11.1 | 12.1 | 12.3 |
| Example 22 | (J-22) | PR254 (25 nm) | 10.5 | 10.9 | 11.5 |
| Example 23 | (J-23) | PR254 (25 nm) | 10.8 | 12.2 | 12.8 |
| Example 24 | (J-24) | PR254 (25 nm) | 10.6 | 12.9 | 13.2 |
| Example 25 | (J-25) | PG36/PY150 (mass ratio 3/7) (25 nm) | 10.2 | 12.1 | 12.4 |

TABLE 5-continued

|  | Resin | Pigment | Viscosity at 1st day (mPa·s) | Viscosity at 4th day (mPa·s) | Viscosity at 7th day (mPa·s) |
|---|---|---|---|---|---|
| Example 26 | (J-26) | PG36/PY150 (mass ratio 3/7) (25 nm) | 10.1 | 11.8 | 12.1 |
| Example 27 | (J-27) | PG36/PY150 (mass ratio 3/7) (26 nm) | 13.1 | 16.6 | 17.8 |
| Comparative Example 1 | (J-28) | PR254 (28 nm) | 30.1 | 62.2 | Not measurable |
| Comparative Example 2 | (J-29) | PG36 (35 nm) | 25.1 | 51.2 | Not measurable |
| Comparative Example 3 | (J-30) | PG36 (35 nm) | 22.2 | 58.6 | Not measurable |
| Comparative Example 4 | (J-31) | PG36 (35 nm) | 23.5 | 60.2 | Not measurable |

From Table 5, it is apparent that in the case where the resin of the present invention was used as a dispersant for a highly fine pigment, dispersibility and dispersion stability were excellent.

A1-2. Preparation of Curable Composition (Coating Liquid)

A curable composition solution was prepared by stirring and mixing, using the above-described pigment dispersion treated by the dispersion process, so as to have the following composition ratio.

| | |
|---|---|
| Above-mentioned pigment dispersion | 600 parts by mass |
| Photopolymerization initiator (2,2'-bis(2-chlorophenyl)-4,4',5,5'-tetraphenyl-1,2'-biimidazole) | 30 parts by mass |
| Pentaerythritol tetraacrylate | 50 parts by mass |
| Alkali-soluble resin (benzyl methacrylate/methacrylic acid/hydroxyethyl methacrylate copolymer, molar ratio: 80/10/10, Mw: 10000) | 5 parts by mass |
| Solvent: propylene glycol 1-monomethyl ether-2-acetate | 900 parts by mass |
| Substrate adhesion agent (3-methacryloxypropyltrimethoxysilane) | 1 part by mass |
| Sensitizing agent (F) (the compound α below) | 15 parts by mass |
| Cosensitizing agent (G) (2-mercaptobenzimidazole) | 15 parts by mass |

Chemical Formula α

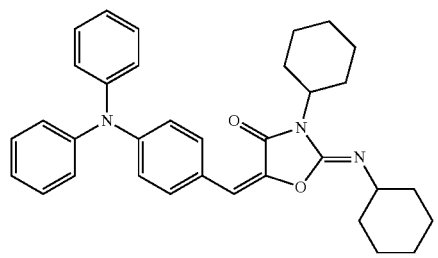 [SMILES: O=C1/C(=C\c2ccc(N(c3ccccc3)c3ccccc3)cc2)O/C(=N\C2CCCCC2)N1C1CCCCC1]

[A2. Preparation of Color Filter]

A2-1. Formation of Curable Composition Layer

A curable composition coating film (curable composition layer) was formed by applying a curable composition containing the above-described pigment as a resist solution by slit coating with the following conditions onto a 550 mm×650 mm glass substrate, then leaving it for 10 minutes, and performing vacuum drying and prebaking (100° C. for 80 seconds).

(Slit Coating Conditions)

Gap of the opening part at the coating head end: 50 μm
Coating rate: 100 mm/second
Clearance between the substrate and the coating head: 150 μm
Dry film thickness: 1.75 μm
Coating temperature: 23° C.

A2-2. Exposure and Development

Thereafter, the curable composition coating film was pattern exposed using a photomask having a line width of 20 μm for a test using a 2.5 kW ultra high pressure mercury lamp. After the exposure, the whole surface of the coating film was covered with a 10% aqueous solution of an organic developing liquid (trade name: CD, manufactured by FUJIFILM Electronic Materials Co., Ltd.) and it was left still for 60 seconds.

A2-3. Heat Treatment

After being left still, the developing liquid was washed out by jetting pure water like a shower, and the coating film to which the exposing (photocuring) process and the developing process had been applied was heated in a 220° C. oven for 1 hour (postbaking). Thereby, a color filter with a curable composition coating film (colored layer) formed on a glass substrate was obtained.

Examples 28 to 54 and Comparative Examples 5 to 8

A3. Performance Evaluation

The storage stability of the coating liquid made of the curable composition prepared as described above, and the contrast, the developability, and the pattern cross-sectional shape of the curable composition coating film (colored layer)

formed on a glass substrate using the curable composition were evaluated as follows. The results are shown in Table 6.

A3-1. Storage Stability of Curable Composition

After storing the curable composition (coating liquid) prepared as described above for 1 month at room temperature, the viscosity of the liquid was measured and evaluated in accordance with the following criteria.

—Evaluation Criteria—

○: No viscosity rise was confirmed.

Δ: Viscosity rise of 5% or more and less than 10% was confirmed.

x: Viscosity rise of 10% or more was confirmed.

A3-2. Contrast of Curable Composition Coating Film (Colored Layer)

The color filter was disposed between two polarizing films, and a luminance of transmitted light when the polarizing axes of the polarizing films were parallel and a luminance of transmitted light when the polarizing axes of the polarizing films were orthogonal were measured with a color luminance meter, thereby determining a contrast ratio. A higher contrast ratio indicates better performance as a color filter for a liquid crystal display.

A3-3. Developability, Pattern Cross-Sectional Shape, and Substrate Adhesion Property By observing the substrate surface after postbaking and its cross-sectional shape with an optical microscope and SEM photography observation, the developability, the pattern cross-sectional shape, and the substrate adhesion property were evaluated. Details of the evaluation method/evaluation criteria were as follows.

<Developability>

Existence of the residue in the region without the light irradiation (unexposed part) in the exposing step was observed for evaluation of the developability.

—Evaluation Criteria—

○: No residue was confirmed in the unexposed part.

Δ: Residue was confirmed slightly in the unexposed part to a degree not causing a problem in the practical use.

x: Residue was confirmed remarkably in the unexposed part.

<Substrate Adhesion Property>

The substrate adhesion property was evaluated according to the observation of whether or not the pattern deficiency occurred. These evaluation items were evaluated in accordance with the following criteria.

—Evaluation Criteria—

○: Pattern deficiency was not at all observed.

Δ: Pattern deficiency was scarcely observed, but a partial deficiency was observed.

x: Pattern deficiency was observed remarkably.

<Pattern Cross-Sectional Shape>

The cross-sectional shape of the formed pattern was observed. The pattern cross-sectional shape is most preferably tapered, and next to that, rectangular is preferable. An inversely tapered shape is not preferable.

These evaluation results are shown in Table 6 below.

TABLE 6

|  | Pigment (particle diameter) | Storage stability | Contrast | Developability | Substrate adhesion property | Pattern cross-sectional shape |
|---|---|---|---|---|---|---|
| Example 28 | PG36 (25 nm) | ○ | 25,000 | ○ | ○ | Tapered |
| Example 29 | PG36 (25 nm) | ○ | 25,000 | ○ | ○ | Tapered |
| Example 30 | PG36 (26 nm) | ○ | 24,000 | ○ | ○ | Tapered |
| Example 31 | PG36 (25 nm) | ○ | 26,000 | ○ | ○ | Tapered |
| Example 32 | PG36 (25 nm) | ○ | 25,000 | ○ | ○ | Tapered |
| Example 33 | PG36 (26 nm) | ○ | 26,000 | ○ | ○ | Tapered |
| Example 34 | PG36 (25 nm) | ○ | 25,000 | ○ | ○ | Tapered |
| Example 35 | PR254/PY139 (mass ratio 8/2) (25 nm) | ○ | 20,000 | ○ | ○ | Tapered |
| Example 36 | PR254/PY139 (mass ratio 8/2) (25 nm) | ○ | 26,000 | ○ | ○ | Tapered |
| Example 37 | PR254/PY139 (mass ratio 8/2) (25 nm) | ○ | 25,000 | ○ | ○ | Tapered |
| Example 38 | PR254/PY139 (mass ratio 8/2) (25 nm) | ○ | 26,000 | ○ | ○ | Tapered |
| Example 39 | PR254/PY139 (mass ratio 8/2) (25 nm) | ○ | 24,000 | ○ | ○ | Tapered |
| Example 40 | PR254/PY139 (mass ratio 8/2) (25 nm) | ○ | 25,000 | ○ | ○ | Tapered |
| Example 41 | PB15.6 (25 nm) | ○ | 26,000 | ○ | ○ | Tapered |
| Example 42 | PB15.6 (25 nm) | ○ | 25,000 | ○ | ○ | Tapered |
| Example 43 | PB15.6 (25 nm) | ○ | 25,000 | ○ | ○ | Tapered |
| Example 44 | PY138 (25 nm) | ○ | 26,000 | ○ | ○ | Tapered |
| Example 45 | PY138 (25 nm) | ○ | 25,000 | ○ | ○ | Tapered |
| Example 46 | PY138 (25 nm) | ○ | 26,000 | ○ | ○ | Tapered |
| Example 47 | PY138 (25 nm) | ○ | 24,000 | ○ | ○ | Tapered |
| Example 48 | PR254 (25 nm) | ○ | 25,000 | ○ | ○ | Tapered |
| Example 49 | PR254 (25 nm) | ○ | 26,000 | ○ | ○ | Tapered |
| Example 50 | PR254 (25 nm) | ○ | 25,000 | ○ | ○ | Tapered |
| Example 51 | PR254 (25 nm) | ○ | 25,000 | ○ | ○ | Tapered |
| Example 52 | PG36/PY150 (mass ratio 3/7) (25 nm) | ○ | 26,000 | ○ | ○ | Tapered |
| Example 53 | PG36/PY150 (mass ratio 3/7) (25 nm) | ○ | 25,000 | ○ | ○ | Tapered |
| Example 54 | PG36/PY150 (mass ratio 3/7) (26 nm) | ○ | 15,000 | ○ | ○ | Tapered |
| Comparative Example 5 | PR254 (28 nm) | x | 8,800 | x | x | Inversely tapered |

TABLE 6-continued

|  | Pigment (particle diameter) | Storage stability | Contrast | Developability | Substrate adhesion property | Pattern cross-sectional shape |
|---|---|---|---|---|---|---|
| Comparative Example 6 | PG36 (35 nm) | x | 9,900 | x | x | Rectangular |
| Comparative Example 7 | PG36 (35 nm) | x | 8,500 | x | x | Inversely tapered |
| Comparative Example 8 | PG36 (35 nm) | x | 9,500 | x | x | Inversely tapered |

From the results in Table 6, it was found that the colored curable compositions of Examples 28 to 54 containing the specific resins of the present invention have excellent storage stability in the solution state. Further, it was found that when forming a colored pattern on a support using the curable composition, a color filter having a higher contrast and superior developability, and also having the excellent pattern cross-sectional shape, as compared with those of the respective Comparative Examples which did not use the resins of the present invention, was obtained.

Hereinafter, examples of preparing a colored curable composition for formation of a color filter for a solid-state image pick-up device will be described.

Examples 55 to 81 and Comparative Examples 9 to 12

B1. Preparation of Resist Liquid

A resist liquid was prepared by mixing and dissolving the components of the following composition.
<Composition of Resist Liquid>

| | |
|---|---|
| Propylene glycol monomethyl ether acetate (PGMEA: solvent) | 19.20 parts by mass |
| Ethyl lactate | 36.67 parts by mass |
| Resin (40% PGMEA solution of benzyl methacrylate/methacrylic acid/2-hydroxyethyl methacrylate copolymer (mole ratio = 60/22/18, weight average molecular weight: 15,000, number average molecular weight: 8,000)) | 30.51 parts by mass |
| Ethylenically unsaturated double bond-containing compound (dipentaerythritol hexaacrylate) | 12.20 parts by mass |
| Polymerization inhibitor (p-methoxyphenol) | 0.0061 part by mass |
| Fluorine-based surfactant (F-475, manufactured by DIC Corp.) | 0.83 part by mass |
| Photopolymerization initiator (trihalomethyl triazine-based photopolymerization initiator) (TAZ-107, manufactured by Midori Kagaku Co., Ltd.) | 0.586 part by mass |

B2. Preparation of Silicon Substrate with Undercoat Layer

A 6 inch silicon wafer was subjected to heat treatment in an oven at 200° C. for 30 minutes. Then, the above-described resist liquid was applied onto the silicon wafer so as to have a dry film thickness of 1.5 μM, and further, it was heated and dried in an 220° C. oven for 1 hour to form an undercoat layer, thereby obtaining a silicon wafer substrate with the undercoat layer.

B3. Preparation of Pigment Dispersion

A pigment dispersion was prepared by mixing and dispersing a mixed liquid of 40 parts by mass (average particle diameter of 65 nm) of a mixture of C. I. Pigment Green 36 (PG36) and C. I. Pigment Yellow 139 (PY139) (mass ratio 70:30) as a pigment, and 160 parts by mass (16 parts by mass in terms of solid) of a resin (J-1) solution for 3 hours with a bead mill (zirconia bead, diameter 0.3 mm).

For the pigment dispersion, the average particle size of the pigment was measured by a dynamic light scattering method in the same manner as in Example 1, and it was 30 nm.

B4. Preparation of a Curable Composition (Coating Liquid)

A curable composition solution was prepared by stirring and mixing, using the above-described pigment dispersion treated by the dispersion process, so as to have the following composition ratio.

| | |
|---|---|
| Colorant (above pigment dispersion) | 600 parts by mass |
| Photopolymerization initiator (oxime-based photopolymerization initiator) (CGI-124, manufactured by Chiba Specialty Chemicals, Corp.) | 30 parts by mass |
| TO-1382 (manufactured by Toagosei Co., Ltd.) | 25 parts by mass |
| Dipentaerythritol hexaacrylate | 30 parts by mass |
| Solvent (PGMEA) | 900 parts by mass |
| Substrate adhesion agent (3-methacryloxypropyltrimethoxy silane) | 1 part by mass |

B5. Preparation and Evaluation of Color Filter by Curable Composition

<Pattern Formation>

A colored layer (coating film) was formed by applying the curable composition prepared as described above onto the undercoat layer of the silicon wafer with the undercoat layer obtained in the above-described B2. Then, heat treatment (prebaking) was carried out using a 100° C. hot plate for 120 seconds so as to have a dry film thickness of the coating film of 0.5 μm.

Then, using an i-ray stepper exposing device FPA-3000i5+ (manufactured by Canon Inc.), it was exposed with an exposure amount varying from 50 to 1,200 mJ/cm$^2$ through an Island pattern mask having a 2 μm square pattern by a 365 nm wavelength.

Thereafter, the silicon wafer substrate with the irradiated coating film was placed on a horizontal rotatable table of a spin-shower developing device (DW-30 type, manufactured by Chemitronics Co., Ltd.), and paddle development was carried out at 23° C. for 60 seconds using CD-2000 (manufactured by FUJIFILM Electronic Materials Co., Ltd.), thereby forming a colored pattern on the silicon wafer substrate.

While rotating the silicon wafer substrate at a rotational frequency of 50 r.p.m. by a rotating device where the silicon wafer with the colored pattern was fixed on the above-described horizontal rotatable table by a vacuum chuck system, pure water was supplied from a jet nozzle from above the rotational center like a shower for carrying out the rinsing process, and then spray-drying was carried out.

Thereafter, the size of the colored pattern was measured using a length measuring SEM "S-9260A" (manufactured by Hitachi High Technologies Corp.). The exposure amount to provide a 2 μm pattern line width was evaluated as the exposure sensitivity.

<Developability>

Existence of the residue in the region without the light irradiation (unexposed part) in the exposing step was observed for evaluating the developability.

—Evaluation Criteria—
○: No residue was confirmed at all in the unexposed part.
Δ: Residue was confirmed slightly in the unexposed part to a degree not causing a problem in the practical use.
x: Residue was confirmed remarkably in the unexposed part.

<Substrate Adhesion Property>

For the substrate adhesion property evaluation, whether or not the pattern deficiency occurred was observed. These evaluation items were evaluated in accordance with the following evaluation criteria.

—Evaluation Criteria—
○: Pattern deficiency was not at all observed.
Δ: Pattern deficiency was scarcely observed, however a partial deficiency was observed.
x: Pattern deficiency was observed remarkably.

<Pattern Forming Property>

The cross-sectional shape of the formed pattern was observed. As the pattern cross-sectional shape, a rectangular shape is preferable and an inversely tapered shape is not preferable.

<Storage Stability of the Curable Composition>

After storing the curable composition (coating liquid) prepared in the above-described step B4 for 1 month at room temperature, the viscosity of the liquid was measured and evaluated in accordance with the following criteria.

—Evaluation Criteria—
○: No viscosity rise was observed.
Δ: Viscosity rise of 5% or more and less than 10% was observed.
x: Viscosity rise of 10% or more was observed.

<Color Unevenness>

The luminance distribution was analyzed by the following method, and the color unevenness was evaluated based on the ratio of the pixels whose deviation from the average was within ±5% to the total number of the pixels. The evaluation criteria are as follows.

The method for measuring the luminance distribution will be described. First, the curable composition was applied onto the undercoat layer of the glass plate with an undercoat layer obtained in the same method as the above-described step B2 for forming a colored layer (coating film). Heat treatment (prebaking) was carried out using a 100° C. hot plate for 120 seconds so as to have a dry film thickness of the coating film of 0.7 μm. The image photographed with a microscope MX-50 (manufactured by Olympus Corp.) was analyzed to calculate the luminance distribution of the coated glass plate.

—Evaluation Criteria—
○: Pixels whose deviation from the average was within ±5% were 99% or more of all the pixels.
Δ: Pixels whose deviation from the average was within ±5% were 95% or more and less than 99% of all the pixels.
x: Pixels whose deviation from the average was within ±5% were less than 95% of all the pixels.

These results are shown in Table 7 below.

TABLE 7

| | Resin | Pigment (particle diameter) | Developability | Substrate adhesion property | Pattern forming property | Storage stability | Color unevenness |
|---|---|---|---|---|---|---|---|
| Example 55 | (J-1) | PG36/PY139 (mass ratio 7/3) (25 nm) | ○ | ○ | Rectangular | ○ | ○ |
| Example 56 | (J-2) | PG36/PY139 (mass ratio 7/3) (25 nm) | ○ | ○ | Rectangular | ○ | ○ |
| Example 57 | (J-3) | PG36/PY139 (mass ratio 7/3) (25 nm) | ○ | ○ | Rectangular | ○ | ○ |
| Example 58 | (J-4) | PG36/PY139 (mass ratio 7/3) (25 nm) | ○ | ○ | Rectangular | ○ | ○ |
| Example 59 | (J-5) | PG36/PY139 (mass ratio 7/3) (25 nm) | ○ | ○ | Rectangular | ○ | ○ |
| Example 60 | (J-6) | PG36/PY139 (mass ratio 7/3) (25 nm) | ○ | ○ | Rectangular | ○ | ○ |
| Example 61 | (J-7) | PR254 (25 nm) | ○ | ○ | Rectangular | ○ | ○ |
| Example 62 | (J-8) | PR254 (25 nm) | ○ | ○ | Rectangular | ○ | ○ |
| Example 63 | (J-9) | PR254 (25 nm) | ○ | ○ | Rectangular | ○ | ○ |
| Example 64 | (J-10) | PR254 (25 nm) | ○ | ○ | Rectangular | ○ | ○ |
| Example 65 | (J-11) | PR254/PY139 (mass ratio 8/2) (25 nm) | ○ | ○ | Rectangular | ○ | ○ |
| Example 66 | (J-12) | PR254/PY139 (mass ratio 8/2) (25 nm) | ○ | ○ | Rectangular | ○ | ○ |
| Example 67 | (J-13) | PR254/PY139 (mass ratio 8/2) (25 nm) | ○ | ○ | Rectangular | ○ | ○ |
| Example 68 | (J-14) | PR254/PY139 (mass ratio 8/2) (25 nm) | ○ | ○ | Rectangular | ○ | ○ |
| Example 69 | (J-15) | PY138 (25 nm) | ○ | ○ | Rectangular | ○ | ○ |
| Example 70 | (J-16) | PY138 (25 nm) | ○ | ○ | Rectangular | ○ | ○ |
| Example 71 | (J-17) | PY138 (25 nm) | ○ | ○ | Rectangular | ○ | ○ |
| Example 72 | (J-18) | PB15.6 (30 nm) | ○ | ○ | Rectangular | ○ | ○ |
| Example 73 | (J-19) | PB15.6 (30 nm) | ○ | ○ | Rectangular | ○ | ○ |
| Example 74 | (J-20) | PB15.6 (30 nm) | ○ | ○ | Rectangular | ○ | ○ |
| Example 75 | (J-21) | PB15.6 (30 nm) | ○ | ○ | Rectangular | ○ | ○ |
| Example 76 | (J-22) | PB15.6 (30 nm) | ○ | ○ | Rectangular | ○ | ○ |
| Example 77 | (J-23) | PG36/PY150 (mass ratio 3/7) (30 nm) | ○ | ○ | Rectangular | ○ | ○ |
| Example 78 | (J-24) | PG36/PY150 (mass ratio 3/7) (30 nm) | ○ | ○ | Rectangular | ○ | ○ |
| Example 79 | (J-25) | PG36/PY150 (mass ratio 3/7) (30 nm) | ○ | ○ | Rectangular | ○ | ○ |
| Example 80 | (J-26) | PG36/PY150 (mass ratio 3/7) (31 nm) | ○ | ○ | Rectangular | ○ | ○ |
| Example 81 | (J-27) | PG36/PY150 (mass ratio 3/7) (30 nm) | ○ | ○ | Rectangular | ○ | ○ |

TABLE 7-continued

|  | Resin | Pigment (particle diameter) | Developability | Substrate adhesion property | Pattern forming property | Storage stability | Color unevenness |
|---|---|---|---|---|---|---|---|
| Comparative Example 9 | (J-28) | PG36/PY139 (mass ratio 7/3) (25 nm) | x | x | Inversely tapered | x | x |
| Comparative Example 10 | (J-29) | PG36/PY139 (mass ratio 7/3) (25 nm) | x | x | Inversely tapered | x | x |
| Comparative Example 11 | (J-30) | PG36/PY139 (mass ratio 7/3) (25 nm) | x | x | Inversely tapered | x | x |
| Comparative Example 12 | (J-31) | PG36/PY139 (mass ratio 7/3) (25 nm) | x | x | Inversely tapered | x | x |

From the results in Table 7, it was found that the curable compositions (pigment-based) of Examples 55 to 81 containing the specific resins of the present invention, even when used for formation of a color filter for a solid-state image pick-up device, had excellent storage stability in a solution state. Moreover, it was found that when forming a colored pattern on a support using the curable composition, a color filter having superior developability and also having an excellent pattern cross-sectional shape and color unevenness, as compared to those of the comparative examples that did not use the resins of the present invention, was obtained.

From these results, it could be seen that the curable compositions of the Examples achieved an excellent pattern forming property, not only when preparing a color filter for a liquid crystal display device, but also when preparing a color filter for a solid-state image pick-up device.

Examples 82 to 96 and Comparative Examples 13 to 15

Experiment on Pigment Dispersion at High Pigment Concentration (Preparation of Pigment Dispersion)

A pigment dispersion was prepared by mixing and dispersing a mixed liquid obtained by adding PGMEA to 40 parts by mass (average particle diameter of 60 nm) of pigment described in Table 8 below and 150 parts by mass (15 parts by mass in terms of solid) of the resin (PGMEA) 10% by weight solution so as to be 230 parts by mass for 3 hours with a bead mill (zirconia bead 0.3 mm). For the pigment dispersion, the average particle size of the pigment was measured by a dynamic light scattering method using Microtrac Nanotrac UPA-EX150 (manufactured by Nikkiso Co., Ltd.) without further diluting P1, and the results are shown in Table 8.

TABLE 8

|  | Dispersion | Resin | Pigment | Viscosity at 1st day (mP·s) | Viscosity at 4th day (mP·s) | Viscosity at 7th day (mP·s) |
|---|---|---|---|---|---|---|
| Example 82 | (D-1) | (J-1) | PG36 | 15.1 | 16.6 | 17.1 |
| Example 83 | (D-2) | (J-2) | PG36 | 9.9 | 10 | 10.5 |
| Example 84 | (D-3) | (J-3) | PG36 | 10.1 | 10.2 | 10.8 |
| Example 85 | (D-4) | (J-4) | PG36 | 10.5 | 10.5 | 10.8 |
| Example 86 | (D-5) | (J-5) | PG36 | 20.2 | 21.2 | 24.2 |
| Example 87 | (D-6) | (J-10) | PG36 | 13.1 | 13.1 | 15.1 |
| Example 88 | (D-7) | (J-11) | PG36 | 10.5 | 10.5 | 11.5 |
| Example 89 | (D-8) | (J-12) | PG36 | 10.1 | 10.1 | 10.9 |
| Example 90 | (D-9) | (J-17) | PG36 | 21.2 | 21.2 | 23.4 |
| Example 91 | (D-10) | (J-18) | PG36 | 21.9 | 23.9 | 24.9 |
| Example 92 | (D-11) | (J-19) | PG36 | 24.2 | 26.2 | 27.1 |
| Example 93 | (D-12) | (J-27) | PG36 | 32.1 | 33.6 | 35.2 |
| Example 94 | (D-13) | (J-2) | PR254 | 10.5 | 10.9 | 11.5 |
| Example 95 | (D-14) | (J-2) | PG58 | 11.1 | 11.8 | 12 |
| Example 96 | (D-15) | (J-3) | PY150 | 9.8 | 10.1 | 10.5 |
| Comparative Example 13 | (D-16) | (J-28) | PG36 | 30.1 | 62.2 | Not measurable |
| Comparative Example 14 | (D-17) | (J-29) | PG36 | 80.1 | 100.3 | Not measurable |
| Comparative Example 15 | (D-18) | (J-30) | PG36 | 82.1 | 110.5 | Not measurable |

As clearly shown in Table 8, the resin of the present invention had excellent dispersion stability even at a high pigment concentration.

Particularly, from the viewpoint of viscosity/inhibition of the viscosity rise, particularly (J-1), (J-2), (J-3), (J-4), (J-5), (J-10), (J-11), and (J-12) are preferred, (J-1), (J-2), (J-3), (J-4), (J-10), (J-11), and (J-12) are further preferred, and (J-2), (J-3), (J-4), (J-11), and (J-12) are most preferred. That is, one having a polyethyleneimine as a main chain portion containing a nitrogen atom is preferred, one having a polyethyleneimine having a number average molecular weight of 300 to 1,800 as a main chain portion containing a nitrogen atom is further preferred, and one having a polyethyleneimine having a number average molecular weight of 600 to 1,200 as a main chain portion containing a nitrogen atom is most preferred.

Examples 97 to 118 and Comparative Examples 16 to 19

Color Filter for Liquid Crystal Display Device

Hereinbelow, examples of preparing a curable composition which contains a pigment for forming a color filter for a liquid crystal display device application will be described.

(Preparation of Colored curable Composition)

| | |
|---|---|
| Above pigment dispersion | 600 parts by mass |
| Photopolymerization initiator (described in Table 9) | 20 parts by mass |
| Pentaerythritol tetraacrylate | 25 parts by mass |
| Alkali-soluble resin (described in Table 9) | 20 parts by mass |
| Solvent: propylene glycol 1-monomethyl ether-2-acetate | 900 parts by mass |
| Substrate adhesion agent (3-methacryloxypropyltrimethoxysilane) | 1 part by mass |

The structures of the photopolymerization initiators (Z-1) to (Z-7) to be used herein as described in Table 9 are as follows. Furthermore, the photopolymerization initiator (Z-1) described below is a mixture of (Z-1-a):(Z-1-b)=20:10 (parts by mass).

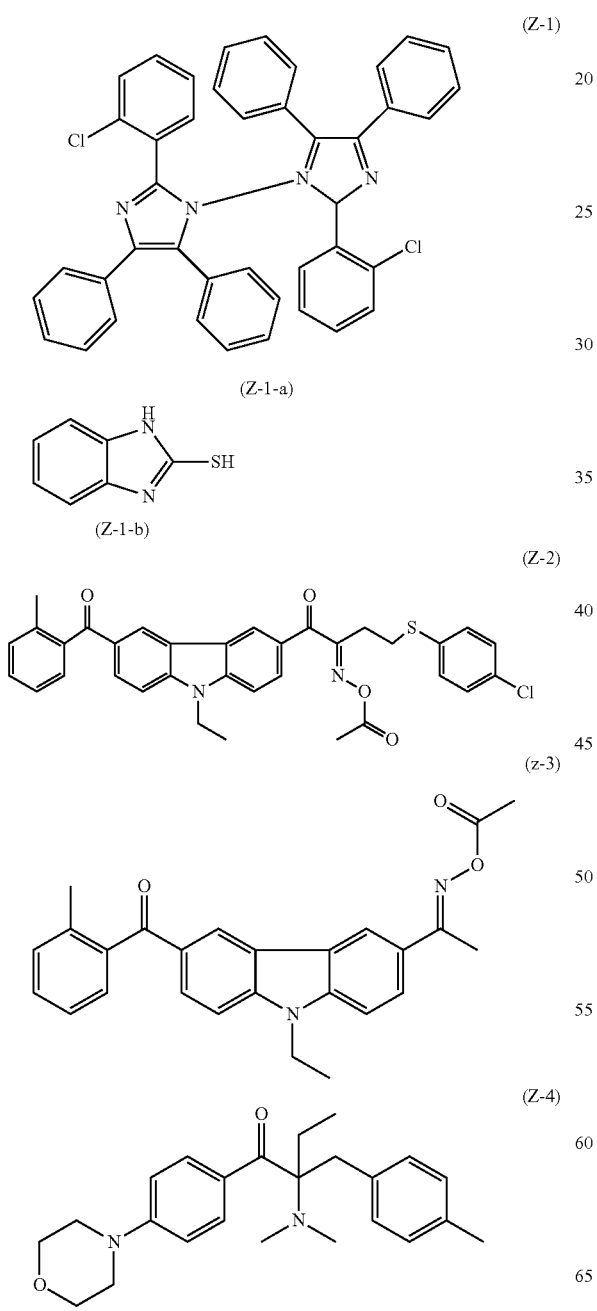

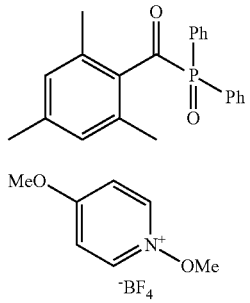

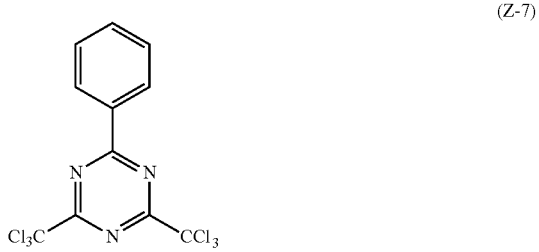

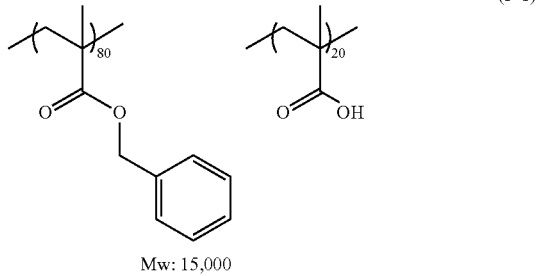

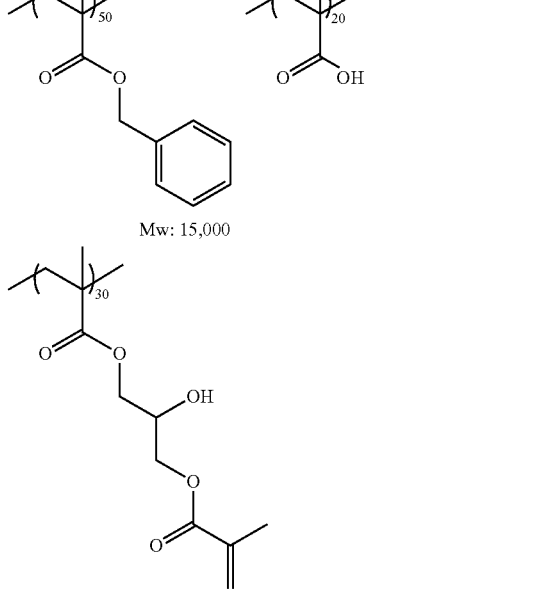

(Formation of Colored Curable Composition Layer)

A coating film of the colored curable composition (curable composition layer) was formed by applying the colored curable composition as a resist liquid by slit coating with the following conditions onto a 550 mm×650 mm glass substrate, and then subjecting the resultant to vacuum drying and pre-baking (100° C. for 80 seconds).

(Slit Coating Conditions)
Gap of the opening part at the coating head end: 50 μm
Coating rate: 100 mm/second
Clearance between the substrate and the coating head: 150 μm
Dry film thickness: 1.75 μm
Coating temperature: 23° C.
(Exposure and Development)
Thereafter, the coating film of the colored curable composition was exposed to form a pattern at 100 mJ/cm$^2$ by LE4000A (manufactured by Hitachi High-Technologies Corporation) using a photomask having a line width of 20 μm and a 2.5 kW ultra high pressure mercury lamp. After the exposure, the whole surface of the coating film was covered with a 1% aqueous solution of an inorganic developing liquid (trade name CDK-1, manufactured by FUJIFILM Electronic Materials Co., Ltd.) and was left still for 60 seconds.
(Heat Treatment)
After being left still, the developing liquid was washed out by jetting pure water like a shower, and the coating film treated by the exposing (photocuring) process and the developing process was heated in a 220° C. oven for 1 hour (postbaking). Thereby, a color filter with the pattern of the colored curable composition (colored layer) formed on a glass substrate was obtained.
(Performance Evaluation)
The storage stability, developability, and exposure sensitivity of the colored curable composition prepared as described above, and the contrast and the pattern cross-sectional shape of the curable composition coating film (colored layer) formed on a glass substrate using the colored curable composition were evaluated as follows. The results are shown in Table 9.

1. Storage Stability

The viscosity one day after the preparation of the colored curable composition obtained as above and the viscosity one month after the preparation were measured respectively. The viscosity was measured using a TV-22 type cone-plate type viscometer (Toki Sangyo Co., Ltd.). The difference between the viscosity one day after the preparation and the viscosity one month after the preparation is shown in Table 9.

A smaller viscosity value indicates better pigment dispersibility, and further, a smaller viscosity and a smaller increase in viscosity over time indicate better pigment dispersion stability.

2. Contrast of Color Filter

The color filter obtained above was disposed between two polarizing plates, and the luminance of transmitted light when the polarization axes of the polarizing plates were parallel and the luminance of transmitted light when the polarization axes of the polarizing plates were vertical were measured using a color luminance meter (Color Luminance meter BM-7, manufactured by Topcon Corp.). Then, the contrast was calculated by dividing the value of the luminance when the polarization axes were parallel by the value of the luminance when the polarization axes were vertical. A larger contrast indicates better performance as a color filter for a liquid crystal display device.

3. Developability

After carrying out development as above, 20 developed parts (unexposed parts) were observed by means of SEM, and the number of residues was counted.

A smaller number of residues indicates better developability.

4. Substrate Adhesion Property

The substrate adhesion property was evaluated according to the observation of whether or not the pattern deficiency occurred. These evaluation items were evaluated in accordance with the following criteria.

—Evaluation Criteria—

○: Pattern deficiency was not at all observed.

Δ: Pattern deficiency was scarcely observed, but a partial deficiency was observed.

x: Pattern deficiency was observed remarkably.

5. Pattern Forming Property

The cross-sectional shape of the formed pattern was observed. As the pattern cross-sectional shape, a rectangular shape is preferable and an inversely tapered shape is not preferable.

6. Exposure Sensitivity

In the exposure step, exposure was carried out at an exposure amount varied in the range of from 10 mJ/cm$^2$ to 500 mJ/cm$^2$. The exposure amount at which the pattern line width after postbaking was 20 μm was evaluated as the exposure sensitivity. A smaller value of exposure sensitivity indicates higher sensitivity.

TABLE 9

| | Dispersion | Photopolymerization initiator | Alkali-soluble resin | Storage stability (mPa·s) | Contrast | Developability | Substrate adhesion property | Pattern cross-sectional shape | Sensitivity (mJ/cm$^2$) |
|---|---|---|---|---|---|---|---|---|---|
| Example 97 | (D-1) | (Z-1) | (F-1) | 1.1 | 21000 | 1 | Δ | Rectangular | 150 |
| Example 98 | (D-1) | (Z-1) | (F-2) | 1.2 | 21000 | 2 | ○ | Tapered | 70 |
| Example 99 | (D-1) | (Z-2) | (F-2) | 1.1 | 21000 | 1 | ○ | Tapered | 50 |
| Example 100 | (D-1) | (Z-3) | (F-2) | 1.1 | 21000 | 2 | ○ | Tapered | 70 |
| Example 101 | (D-1) | (Z-4) | (F-2) | 1.3 | 21000 | 2 | ○ | Tapered | 80 |
| Example 102 | (D-1) | (Z-5) | (F-2) | 1.4 | 21000 | 1 | ○ | Tapered | 90 |
| Example 103 | (D-1) | (Z-6) | (F-2) | 1.5 | 21000 | 2 | ○ | Tapered | 90 |
| Example 104 | (D-1) | (Z-7) | (F-2) | 1.4 | 21000 | 1 | ○ | Tapered | 70 |
| Example 105 | (D-2) | (Z-1) | (F-2) | 0.5 | 23000 | 0 | ○ | Tapered | 70 |
| Example 106 | (D-3) | (Z-2) | (F-2) | 0.6 | 22000 | 0 | ○ | Tapered | 50 |
| Example 107 | (D-4) | (Z-7) | (F-2) | 0.5 | 23000 | 0 | ○ | Tapered | 70 |
| Example 108 | (D-5) | (Z-3) | (F-2) | 2.1 | 19000 | 7 | ○ | Tapered | 80 |
| Example 109 | (D-6) | (Z-1) | (F-2) | 1.3 | 20000 | 5 | ○ | Tapered | 70 |
| Example 110 | (D-7) | (Z-7) | (F-2) | 0.6 | 23000 | 0 | ○ | Tapered | 70 |
| Example 111 | (D-8) | (Z-2) | (F-2) | 0.8 | 23000 | 0 | ○ | Tapered | 60 |
| Example 112 | (D-9) | (Z-3) | (F-2) | 2.1 | 19000 | 6 | ○ | Tapered | 80 |
| Example 113 | (D-10) | (Z-7) | (F-2) | 2.2 | 18000 | 5 | ○ | Tapered | 80 |
| Example 114 | (D-11) | (Z-3) | (F-2) | 2.2 | 18000 | 5 | ○ | Tapered | 70 |

TABLE 9-continued

|  | Dispersion | Photopolymerization initiator | Alkali-soluble resin | Storage stability (mPa·s) | Contrast | Developability | Substrate adhesion property | Pattern cross-sectional shape | Sensitivity (mJ/cm$^2$) |
|---|---|---|---|---|---|---|---|---|---|
| Example 115 | (D-12) | (Z-2) | (F-2) | 2.9 | 14000 | 8 | ○ | Tapered | 50 |
| Example 116 | (D-13) | (Z-2) | (F-2) | 0.6 | 20000 | 0 | ○ | Tapered | 60 |
| Example 117 | (D-14) | (Z-2) | (F-2) | 0.4 | 21000 | 0 | ○ | Tapered | 50 |
| Example 118 | (D-15) | (Z-7) | (F-2) | 0.6 | 20000 | 0 | ○ | Tapered | 80 |
| Comparative Example 16 | (D-16) | (Z-1) | (F-2) | Not measurable | 7000 | 19 | x | Inversely tapered | 130 |
| Comparative Example 17 | (D-17) | (Z-1) | (F-1) | Not measurable | 8000 | 15 | x | Inversely tapered | 120 |
| Comparative Example 18 | (D-18) | (Z-1) | (F-1) | Not measurable | 7000 | 20 | x | Inversely tapered | 140 |

From the results in Table 9, it was found that the colored curable compositions of Examples 98 to 120, which contained the specific resins of the present invention, had excellent storage stability and developability. Further, it was found that when forming a colored pattern on a support using the colored curable composition, the contrast is high, and the substrate adhesion property and the pattern forming property are also good. In Comparative Examples 12 to 13 which did not use the colored curable composition of the present invention, the viscosity increased during storage, the stability over time was bad, residue was generated in development, and the contrast was low.

Further, in each of the Examples, it was found that a color filter also having an excellent pattern cross-sectional shape was obtained.

Examples 119 to 140 and Comparative Examples 20 to 22

Formation of Color Filter for Solid-State Image Pick-up Device

Hereinafter, examples of preparing a colored curable composition for formation of a color filter for a solid-state image pick-up device will be described.

(Preparation of Resist Liquid)
A resist liquid was prepared by mixing and dissolving the components of the following composition.
<Composition of Resist Liquid>

| | |
|---|---|
| Solvent: propylene glycol monomethyl ether acetate | 19.20 parts by mass |
| Solvent: ethyl lactate | 36.67 parts by mass |
| Alkali-soluble resin: 40% PGMEA solution of benzyl methacrylate/methacrylic acid/2-hydroxyethyl methacrylate copolymer (mole ratio = 60/22/18, weight average molecular weight: 15,000, number average molecular weight)) | 30.51 parts by mass |
| Ethylenically unsaturated double bond-containing compound (dipentaerythritol hexaacrylate) | 12.20 parts by mass |
| Polymerization inhibitor: p-methoxyphenol | 0.0061 part by mass |
| Fluorine-based surfactant: F-475, manufactured by DIC Corp. | 0.83 part by mass |
| Photopolymerization initiator: trihalomethyl triazine-based photopolymerization initiator (TAZ-107, manufactured by Midori Kagaku Co., Ltd.) | 0.586 part by mass |

(Preparation of Silicon Substrate with Undercoat Layer)
A 6 inch silicon wafer was subjected to heat treatment in an oven at 200° C. for 30 minutes. Then, the above-described resist liquid was applied onto the silicon wafer so as to have a dry film thickness of 1.5 μm, and further, it was heated and dried in an 220° C. oven for 1 hour to form an undercoat layer, thereby obtaining a silicon wafer substrate with the undercoat layer.

(Preparation of Colored Curable Composition (Coating Liquid))
A colored curable composition was prepared by stirring and mixing the pigment dispersion (D-1) to (D-18) to have the following composition ratio.

| | |
|---|---|
| Above-mentioned pigment dispersion | 600 parts |
| Photopolymerization initiator (described in Table 9) | 20 parts |
| Polymerizable compound: dipentaerythritol hexaacrylate | 25 parts |
| Alkali-soluble resin (described in Table 9) | 20 parts |
| Solvent: PGMEA | 900 parts |

(Preparation and Evaluation of Color Filter by Colored Curable Composition)
<Pattern Formation>
A colored layer (coating film) was formed by applying the colored curable composition prepared as above onto the undercoat layer of the silicon wafer with the undercoat layer obtained as described above. Then, heat treatment (prebaking) was carried out using a 100° C. hot plate for 120 seconds so as to have a dry film thickness of the coating film of 0.5 μm.

Then, using an i-ray stepper exposing device FPA-3000i5+ (manufactured by Canon Inc.), it was exposed with an exposure amount varying from 50 to 1,200 mJ/cm$^2$ through an Island pattern mask having a 1.2 μm square pattern by a 365 nm wavelength.

Thereafter, the silicon wafer substrate with the irradiated coating film was placed on a horizontal rotatable table of a spin-shower developing device (DW-30 type, manufactured by Chemitronics Co., Ltd.), and paddle development was carried out at 23° C. for 60 seconds using CD-2000 (manufactured by FUJIFILM Electronic Materials Co., Ltd.), thereby forming a colored pattern on the silicon wafer substrate.

While rotating the silicon wafer substrate at a rotational frequency of 50 r.p.m. by a rotating device where the silicon wafer with the colored pattern was fixed on the above-described horizontal rotatable table by a vacuum chuck system, pure water was supplied from a jet nozzle from above the rotational center like a shower for carrying out the rinsing process, and then spray-drying was carried out.

Thereafter, the size of the colored pattern was measured using a length measuring SEM "S-9260A" (manufactured by Hitachi High Technologies Corp.). The exposure amount to provide a 1.2 µm pattern size was evaluated as the exposure sensitivity.

(Performance Evaluation)

The dispersibility, dispersion stability, exposure sensitivity, coating property, and developability of the colored curable composition prepared as above were evaluated as above, and the results are shown in Table 10.

Further, the color unevenness of the color filter obtained above was evaluated as follows, and the results are shown in Table 10.

1. Storage Stability

The viscosity one day after the preparation of the obtained colored curable composition and the viscosity one month after the preparation were measured respectively. The viscosity was measured using a TV-22 type cone-plate type viscometer (Toki Sangyo Co., Ltd.). The difference between the viscosity one day after the preparation and the viscosity one month after the preparation is shown in Table 10.

A smaller value of the viscosity indicates excellent dispersibility of the pigment, and further, a smaller viscosity and a smaller increase in viscosity over time indicate better dispersion stability of the pigment.

2. Color Unevenness of Color Filter

The luminance distribution was analyzed by the following method, and the color unevenness of the color filter obtained above was evaluated based on the ratio of the pixels whose deviation from the average was within ±5% to the total number of the pixels. The evaluation criteria are as follows.

The method for measuring the luminance distribution will be described. First, the colored curable composition was applied onto the undercoat layer of the glass plate with an undercoat layer obtained in the same method as above to form a colored layer (coating film).

Heat treatment (prebaking) was carried out using a 100° C. hot plate for 120 seconds so as to have a dry film thickness of the coating film of 0.7 µm.

The luminance distribution of the coated glass plate was determined by analyzing the image photographed with a microscope MX-50 (manufactured by Olympus Corp.) to calculate the ratio (percentage) of the pixels whose deviation from the average was within ±5%. The higher value indicates smaller color unevenness, and favorableness.

3. Developability

After carrying out development as above, 20 developed parts (unexposed parts) were observed by means of SEM, and the number of residues was counted.

4. Substrate Adhesion Property

The substrate adhesion property was evaluated according to the observation of whether or not the pattern deficiency occurred. These evaluation items were evaluated in accordance with the following criteria.

—Evaluation Criteria—

○: Pattern deficiency was not at all observed.
Δ: Pattern deficiency was scarcely observed, but a partial deficiency was observed.
x: Pattern deficiency was observed remarkably.

5. Pattern Forming Property

The cross-sectional shape of the formed pattern was observed. As the pattern cross-sectional shape, a rectangular shape is preferable and an inversely tapered shape is not preferable.

6. Exposure Sensitivity

Exposure was carried out at an exposure amount varied in the range of from 10 mJ/cm$^2$ to 500 mJ/cm$^2$. The exposure amount at which the pattern line width after postbaking was 1.2 µm was evaluated as the exposure sensitivity. A smaller value of exposure sensitivity indicates higher sensitivity.

TABLE 10

| | Dispersion | Photopolymerization initiator | Alkali-soluble resin | Storage stability (mPa · s) | Color unevenness | Developability | Substrate adhesion property | Pattern cross-sectional shape | Sensitivity (mJ/cm$^2$) |
|---|---|---|---|---|---|---|---|---|---|
| Example 119 | (D-1) | (Z-1) | (F-1) | 1.3 | 97 | 1 | Δ | Rectangular | 250 |
| Example 120 | (D-1) | (Z-1) | (F-2) | 1.4 | 97 | 2 | ○ | Rectangular | 140 |
| Example 121 | (D-1) | (Z-2) | (F-2) | 1.2 | 97 | 1 | ○ | Rectangular | 100 |
| Example 122 | (D-1) | (Z-3) | (F-2) | 1.2 | 97 | 2 | ○ | Rectangular | 150 |
| Example 123 | (D-1) | (Z-4) | (F-2) | 1.5 | 97 | 2 | ○ | Rectangular | 210 |
| Example 124 | (D-1) | (Z-5) | (F-2) | 1.7 | 97 | 1 | ○ | Rectangular | 220 |
| Example 125 | (D-1) | (Z-6) | (F-2) | 1.4 | 97 | 2 | ○ | Rectangular | 200 |
| Example 126 | (D-1) | (Z-1) | (F-2) | 1.3 | 97 | 1 | ○ | Rectangular | 150 |
| Example 127 | (D-2) | (Z-1) | (F-2) | 0.4 | 99 | 0 | ○ | Rectangular | 150 |
| Example 128 | (D-3) | (Z-2) | (F-2) | 0.7 | 99 | 0 | ○ | Rectangular | 90 |
| Example 129 | (D-4) | (Z-1) | (F-2) | 0.5 | 99 | 0 | ○ | Rectangular | 150 |
| Example 130 | (D-5) | (Z-3) | (F-2) | 2.2 | 95 | 7 | ○ | Rectangular | 100 |
| Example 131 | (D-6) | (Z-1) | (F-2) | 1.2 | 97 | 5 | ○ | Rectangular | 160 |
| Example 132 | (D-7) | (Z-1) | (F-2) | 0.5 | 99 | 0 | ○ | Rectangular | 140 |
| Example 133 | (D-8) | (Z-2) | (F-2) | 0.9 | 99 | 0 | ○ | Rectangular | 100 |
| Example 134 | (D-9) | (Z-3) | (F-2) | 2.2 | 94 | 6 | ○ | Rectangular | 170 |
| Example 135 | (D-10) | (Z-1) | (F-2) | 2.3 | 94 | 5 | ○ | Rectangular | 160 |
| Example 136 | (D-11) | (Z-3) | (F-2) | 2.1 | 95 | 5 | ○ | Rectangular | 160 |
| Example 137 | (D-12) | (Z-2) | (F-2) | 3.1 | 92 | 8 | ○ | Rectangular | 100 |
| Example 138 | (D-13) | (Z-2) | (F-2) | 0.5 | 99 | 0 | ○ | Rectangular | 90 |
| Example 139 | (D-14) | (Z-2) | (F-2) | 0.3 | 99 | 0 | ○ | Rectangular | 90 |
| Example 140 | (D-15) | (Z-1) | (F-2) | 0.4 | 99 | 0 | ○ | Rectangular | 150 |
| Comparative Example 20 | (D-16) | (Z-1) | (F-2) | Not measurable | 85 | 28 | x | Inversely tapered | 320 |
| Comparative Example 21 | (D-17) | (Z-1) | (F-1) | Not measurable | 88 | 30 | x | Inversely tapered | 300 |
| Comparative Example 22 | (D-18) | (Z-1) | (F-1) | Not measurable | 87 | 35 | x | Inversely tapered | 300 |

From the results in Table 10, it was found that the colored curable compositions of Examples 121 to 143 in the present invention, which were used for forming a color filter for a solid-state image pick-up device, had excellent storage stability. Further, it was found that when forming a colored pattern on a support using the colored curable composition, a color filter having less residues and superior developability, and also being excellent in terms of color unevenness, as compared with Comparative Examples, was obtained.

The invention claimed is:

1. A colored curable composition comprising:
   (A) a resin comprising (i) a main chain portion containing a nitrogen atom, (ii) a group X that has a functional group having a pKa of 14 or less and is bonded to a nitrogen atom present in the main chain portion, and (iii) an oligomer chain or polymer chain Y having a number average molecular weight of from 500 to 1,000,000 in a side chain;
   (B) a pigment;
   (C) a solvent;
   (D) a photopolymerization initiator; and
   (E) a compound containing an ethylenically unsaturated double bond,
   wherein:
   the functional group having a pKa of 14 or less of the resin (A) is a functional group selected from a carboxylic acid, a sulfonic acid, or —COCH$_2$CO—,
   the photopolymerization initiator (D) comprises at least one oxime-based compound,
   the resin (A) includes a repeating unit represented by general formula (I-1), a repeating unit represented by general formula (I-2), and a repeating unit represented by general formula (I-3):

General Formula (I-1)

General Formula (I-2)

wherein in the general formulae (I-1) and (I-2), R$^1$s and R$^2$s each independently represent a hydrogen atom, a halogen atom, or an alkyl group; a's each independently represent an integer of 1 to 5; * represents a linking portion between the repeating units; X represents the group containing a functional group having a pKa of 14 or less selected from a carboxylic acid, a sulfonic acid, or —COCH$_2$CO—; and Y represents the oligomer chain or polymer chain having a number average molecular weight of from 500 to 1,000,000;

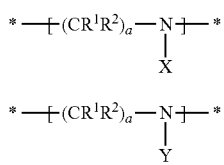

General Formula (I-3)

wherein in general formula (I-3), R$^1$s and R$^2$s each independently represent a hydrogen atom, a halogen atom, or an alkyl group, a's each independently represent an integer of 1 to 5; * represents a linking portion between the repeating units; and (Y')$^-$represents an oligomer chain or polymer chain having an anion group, which has a number average molecular weight of 500 to 1,000,000, and the content of the repeating unit represented by general formula (I-1) is from 3 to 50% by mole, the content of the repeating unit represented by general formula (I-2) is from 30 to 70% by mole, and the content of the repeating unit represented by general formula (I-3) is from 1 to 10% by mole, with respect to the total amount of repeating units contained in the resin (A).

2. The colored curable composition of claim 1, wherein the (iii) oligomer chain or polymer chain Y having a number average molecular weight of 500 to 1,000,000 of the resin is represented by the following general formula (III-1):

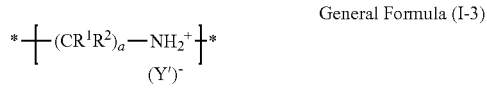

General Formula (III-1)

wherein in the general formula (III-1), Z is a polymer or oligomer having a polyester chain as a partial structure, and represents a residue formed by removal of a carboxyl group from a polyester having a free carboxyl group represented by the following general formula (IV):

$$HO \overset{O}{\underset{\|}{-}} Z$$

General Formula (IV)

wherein in the general formula (IV), Z has the same definition as Z in the general formula (III-1).

3. The colored curable composition of claim 1, wherein the resin is a resin formed by reacting a resin having a primary or secondary amino group in a main chain portion with a precursor x of the group X having a functional group having a pKa of 14 or less selected from a carboxylic acid, a sulfonic acid, or —COCH$_2$CO— and a precursor y of the oligomer chain or polymer chain Y having a number average molecular weight of from 500 to 1,000,000.

4. A method for preparing the colored curable composition of claim 1, comprising the steps of:
   (1) producing (A) the resin of claim 1 by synthesizing a resin having a primary or secondary amino group in a main chain portion, and then reacting the resin with a precursor x of the group X having a functional group having a pKa of 14 or less selected from a carboxylic acid, a sulfonic acid, or —COCH2CO— and a precursor y of the oligomer chain or polymer chain Y having a number average molecular weight of 500 to 1,000,000, and
   (2) combining the resin resulting from step (1) with (B) a pigment, (C) a solvent, (D) a photopolymerization initiator comprising at least one oxime-based compound, and (E) a compound containing an ethylenically unsaturated double bond.

5. The colored curable composition of claim 1, further comprising (F) an alkali-soluble resin.

6. The colored curable composition of claim 5, wherein (F) the alkali-soluble resin is an alkali-soluble resin having a polymerizable double bond.

7. A color filter having a colored pattern formed by the colored curable composition of claim 1 on a support.

8. A method for producing a color filter, comprising applying the colored curable composition of claim 1 on a support to form a colored layer made of the curable composition, pattern-exposing the colored layer via a mask, and developing the colored layer after the exposure to form a colored pattern.

9. The colored curable composition of claim 1, wherein the group X in the resin has a structure represented by general formula (V-1), general formula (V-2), or general formula (V-3):

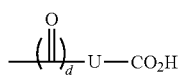

Gerneral Formula (V-1)

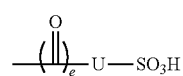

General Formula (V-2)

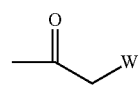

General Formula (V-3)

wherein, in general formulae (V-1), (V-2) and (V-3), U represents a single bond or a divalent linking group; d and e each independently represents 0 or 1; and W represents an acyl group or an alkoxycarbonyl group.

10. The colored curable composition of claim 1, wherein (i) the main chain portion containing a nitrogen atom of the resin includes a polyethylene imine and has a number average molecular weight of from 500 to 1500.

11. The colored curable composition of claim 1, wherein in the general formulae (I-1), (I-2) and (I-3), $R^1$s and $R^2$s represent a hydrogen atom.

12. The colored curable composition of claim 1, wherein the at least one oxime-based compound is selected from the following compounds:

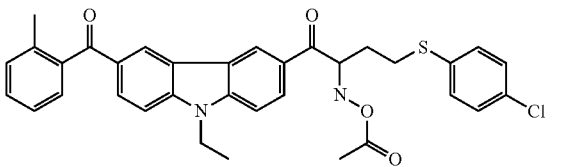

(Z-2)

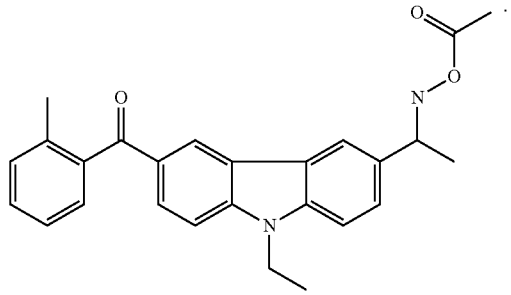

(z-3)

13. The colored curable composition of claim 1, wherein (B) the pigment has a primary particle diameter of from 5 to 40 nm.

\* \* \* \* \*